(12) United States Patent
Furuichi et al.

(10) Patent No.: US 8,086,371 B2
(45) Date of Patent: Dec. 27, 2011

(54) CONTROL DEVICE FOR A WHEEL SUSPENSION SYSTEM

(75) Inventors: Takashi Furuichi, Wako (JP); Daijirou Endou, Wako (JP); Takafumi Kato, Wako (JP); Toshimitsu Kaji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 12/410,859

(22) Filed: Mar. 25, 2009

(65) Prior Publication Data
US 2009/0248247 A1 Oct. 1, 2009

(30) Foreign Application Priority Data

| | | |
|---|---|---|
| Mar. 26, 2008 | (JP) | 2008-080149 |
| Mar. 27, 2008 | (JP) | 2008-083411 |
| Mar. 27, 2008 | (JP) | 2008-084130 |
| Sep. 16, 2008 | (JP) | 2008-235976 |

(51) Int. Cl.
*B60G 17/018* (2006.01)
(52) U.S. Cl. .......................................................... 701/37
(58) Field of Classification Search .................... 701/37; 280/5.507, 5.509, 5.512
See application file for complete search history.

(56) References Cited

U.S. PATENT DOCUMENTS

| | | | | |
|---|---|---|---|---|
| 5,642,899 A * | 7/1997 | Inoue et al. | ................ | 280/5.515 |
| 5,944,763 A * | 8/1999 | Iwasaki | ........................... | 701/37 |
| 7,035,836 B2 * | 4/2006 | Caponetto et al. | .............. | 706/47 |
| 7,770,701 B1 * | 8/2010 | Davis | ........................ | 188/267.1 |
| 7,900,938 B2 * | 3/2011 | Sano | ........................ | 280/5.502 |
| 2006/0064223 A1 * | 3/2006 | Voss | ................................ | 701/52 |
| 2008/0234896 A1 * | 9/2008 | Kato et al. | ...................... | 701/37 |
| 2008/0249690 A1 * | 10/2008 | Matsumoto et al. | ............. | 701/48 |
| 2008/0284118 A1 * | 11/2008 | Venton-Walters et al. | | 280/6.154 |
| 2009/0319114 A1 * | 12/2009 | Takenaka et al. | ............... | 701/29 |

FOREIGN PATENT DOCUMENTS

| | | |
|---|---|---|
| JP | 5-069716 | 3/1993 |
| JP | 8244434 | 9/1996 |
| JP | 2002-127727 | 5/2002 |
| JP | 2006-069527 | 3/2006 |
| JP | 2006-281876 | 10/2006 |

\* cited by examiner

*Primary Examiner* — Faye M Fleming
(74) *Attorney, Agent, or Firm* — Rankin, Hill & Clark LLP

(57) ABSTRACT

In a control device for controlling a variable element of a wheel suspension system, the variable suspension element associated with one of the wheels is controlled at least according to an output of a sensor associated with a different one of the wheels. The output of the sensor may include a sprung mass speed of a vehicle part associated with each wheel. The variable suspension element may include a variable damping force damper or a variable spring constant spring. Thereby, an undesired response of a vehicle body can be avoided even when a vehicle is subjected to an uneven distribution of wheel loads such as when the vehicle is traveling over a slanted road surface or making a turn.

17 Claims, 49 Drawing Sheets

CONTROL DEVICE FOR A WHEEL SUSPENSION SYSTEM

TECHNICAL FIELD

The present invention relates to a control device for a wheel suspension system for a vehicle having a plurality of wheels, and in particular to a control device that controls a variable suspension element of at least one of the wheels such as a damper according to an output of a sensor associated with a different one of the wheels.

BACKGROUND OF THE INVENTION

Various forms of variable dampers have been proposed for use in wheel suspension systems for the purposes of improving the ride quality and achieving a favorable motion stability or driving stability of the vehicle. For instance, when a vehicle makes a turn, the vehicle body undergoes a rolling movement owing to an inertia force (lateral acceleration) resulting from a lateral movement of the vehicle. To control an excessive rolling movement of the vehicle body at such a time, it has been proposed to increase the target damping force of the dampers in dependence on a differential value of the lateral acceleration (roll control). When the vehicle travels over an irregular road surface, the wheels undergo vertical movements, and these movements are transmitted to the vehicle body so that the rider quality of the vehicle may be impaired at such a time. To control the transmission of the vertical movements of the wheels to the vehicle body, and thereby improve the ride quality of the vehicle, it has been proposed to increase the target damping force of each damper in dependence on the sprung mass speed of a vehicle part adjacent to the damper or the wheel associated therewith (skyhook control). See Japanese patent laid open publication (kokai) No. 2006-69527.

According to another proposal based on a skyhook control, the damping force of each damper is varied depending on the input from the road or the condition of the road surface so that the ride quality may be improved. See Japanese patent laid open publication (kokai) No. 05-69716.

However, in conventional skyhook control proposals, because the damper for each wheel is controlled in dependence on the sprung mass speed of a vehicle part associated with the wheel under consideration or, in other words, each wheel suspension system is controlled independently from the conditions of the other wheel suspension systems, certain inconveniences have been known to occur.

For instance, when the vehicle is traveling over a slanted road surface and the wheel loads are thereby unevenly distributed, the behavior of the vehicle such as a vertical movement, rolling movement and pitching movement may not be favorably controlled. More specifically, when a vehicle is traveling a road which is slanted downwardly in a fore-and-aft direction, the wheel load acting on the front wheels increases while the wheel load acting on the rear wheels decreases as compared to the condition where the vehicle is traveling over a horizontal surface. Therefore, the natural frequency of the vertical movement of the front part of the vehicle decreases while the natural frequency of the vertical movement of the rear part of the vehicle increases. As a result, the vertical movements of the front part and rear part of the vehicle are thrown out of synchronism, and this causes a corresponding disagreement between the sprung mass speeds of the front part and rear part of the vehicle. Therefore, as shown in FIG. 49, the skyhook control becomes unable to control the disagreements between the sprung mass speeds of the front part and rear part of the vehicle (as indicated by the difference in the graph of FIG. 49), and this cause an undesirable pitching movement of the vehicle. This creates the need to correct the sprung mass speed of the rear part of the vehicle body to a significant extent with a pitch control (as indicated by the sprung mass speed after correction).

According to the invention disclosed in Japanese patent laid open publication (kokai) No. 2006-69527, the pitch control of the vehicle body is based on the fore-and-aft acceleration of the vehicle. However, because the pitching movement of the vehicle may occur also when the vehicle is traveling over a slanted or sloped road surface even though the vehicle is not accelerating or decelerating, the pitching movement may not be controlled in a desirable manner.

Japanese patent laid open publication (kokai) No. 2006-281876 discloses a technology for determining a target damping force according to the lateral acceleration of the vehicle produced by a turning movement of the vehicle and the lateral acceleration produced by a yawing movement of the vehicle so that the rolling movement of the vehicle may be favorably controlled. In this roll control system, the driving stability of the vehicle can be improved by increasing the gain for the front wheels earlier than increasing the gain for the rear wheels based on the knowledge that the yaw rate is produced earlier on the side of the front wheels that are steered than on the side of the rear wheels that are not steered.

However, according to this prior art, when the vehicle makes a turn, and the damping force for the front side is increased earlier than that for the rear side, because the vertical wheel load of the inner front wheel diminishes while the damping force thereof increases, the overall cornering force of the front side is reduced as compared to that of the rear wheel side so that the turning response or the steer feel of the vehicle may be somewhat impaired. In other cases, the driving stability may be desired to be improved while the turning response is controlled. In short, there is a demand for a technology that enables a desired turning response of a vehicle to be achieved at will.

When the damping force is controlled individually for each wheel, as there is no consideration for the influences from the conditions of the remaining wheels, it was noted that the dampers may interfere with one another, and this could cause the attitude control of the vehicle to be impaired at least in transient situations. Japanese patent laid open publication (kokai) No. 2002-127727 discloses a wheel suspension system using variable hydraulic dampers in which oil chambers of different dampers are communicated with each other via a passage provided with a variable orifice so that the damping forces may be adjusted in dependence on the difference in pressure between the two chambers of the different dampers.

According to this proposal, the damping forces are controlled according to the pressure difference between the chambers of two different dampers and the flow rate of fluid between the two chambers. Therefore, it is not possible to individually increase or decrease the damping forces of the two dampers that are communicated with other, or to individually control the damping forces of the two dampers both when the strokes of the two dampers are in the same phase and when they are different from each other. Therefore, depending on the dynamic state of the vehicle and road conditions, a damper force of an appropriate magnitude may not be provided, and this prevents a favorable attitude control to be achieved.

BRIEF SUMMARY OF THE INVENTION

In view of such problems of the prior art and based on such a recognition by the inventors, a primary object of the present invention is to provide a control device for controlling a variable element of a wheel suspension system that can prevent undesired response of a vehicle body even when a vehicle is subjected to an uneven distribution of wheel loads.

A second object of the present invention is to provide a control device for controlling a variable element of a wheel suspension system such as a variable damping force damper and a variable spring constant spring that can ensure a favorable behavior of a vehicle even when the vehicle is traveling over a slanted road surface, or making a turn.

A third object of the present invention is to provide a control device for controlling a variable element of a wheel suspension system such as a variable damping force damper and a variable spring constant spring that can ensure a favorable steer feel and driving stability under most conditions.

A fourth object of the present invention is to provide a control device for controlling a variable element of a wheel suspension system such as a variable damping force damper and a variable spring constant spring that can favorably control the attitude of a vehicle under most conditions.

According to the present invention, such objects can be accomplished at least partly by providing a control device for controlling a variable element of a wheel suspension system, comprising: a variable suspension element having a variable property interposed between each wheel and an associated part of a vehicle body; a sensor provided in a part of a vehicle body part adjacent to each wheel for detecting a corresponding dynamic state variable of the vehicle body; and a control unit for controlling the variable suspension element associated with one of the wheels at least according to an output of the sensor associated with a different one of the wheels.

According to a certain aspect of the present invention, the dynamic state variable comprises a vertical movement variable of a vehicle body part associated with each wheel, and the control unit controls the variable suspension element in such a manner that a difference between the vertical movement variable of the vehicle body part associated with one of the wheels and the vertical movement variable of the vehicle body part associated with a different one of the wheels may be minimized.

Thereby, the attitude of the vehicle body can be stabilized, and the ride quality of the vehicle can be improved. Typically, the variable suspension element comprises a variable damping force damper that provides a variable damping force.

According to a preferred embodiment of the present invention that enables the above mentioned broad concept of the present invention to be implemented in a simple manner, the device further comprises a base value computing unit that computes a target damping force base value and a correction value computing unit that computes a correction value for a vehicle part corresponding to one of the wheels according to a difference between a vertical speed of the vehicle part corresponding to the one wheel and a vertical speed of the vehicle part corresponding to a different one of the wheels, a target damping force for the vehicle part corresponding to the one wheel being determined from the target damping force base value and the correction value.

According to a more specific aspect of the present invention, the device further comprises a detector for detecting an inclination angle of the vehicle, wherein the sensor further comprises a wheel load sensor for detecting a load acting upon each wheel, and the control unit controls one of the variable suspension elements according to the wheel loads of the corresponding wheel and at least one other wheel.

Thereby, even when the vehicle is traveling over a slanted road surface, and this causes an uneven behavior of the different suspension systems owing to the uneven distribution of the wheel loads, the behavior of the different suspension systems are harmonized, and the changes in the attitude of the vehicle body can be favorably controlled. This can be most readily implemented if the control unit controls at least one of the variable suspension elements according to a control parameter based on a dynamic variable of the vehicle associated with the corresponding wheel, and corrects the control parameter according to the wheel loads of the corresponding wheel and at least one other wheel.

The behavior of each wheel suspension system may be evaluated in terms of the natural frequency thereof. In particular, when the vehicle is slanted owing to the slanting of the road surface or other causes, it causes a shift in the natural frequency of each wheel suspension system owing to the changes in the effective sprung masses associated with different suspension systems. Typically, the natural frequency of each suspension system is designed to be below a range of frequency which is relatively critical for ride quality, and the upward shifting of the natural frequency may cause an increase in the oscillation amplitude of the wheel suspension system in this critical frequency range. Therefore, according to a preferred embodiment of the present invention, the control unit computes a natural frequency of a vehicle part associated with each variable suspension element by taking into account outputs of the wheel load sensors, and controls at least one the suspension elements according to the computed natural frequencies of at least one other wheel.

According to a typical embodiment of the present invention, each variable suspension element comprises a variable damper, and upon detection of an inclination of the vehicle, the control unit controls the variable damper in such a manner that a natural frequency oscillation amplitude of a vehicle part located at a higher elevation than at least one of the remaining wheels is reduced. Additionally or alternatively, the control unit controls the variable damper in such a manner that a natural frequency oscillation amplitude of a vertical movement of a vehicle part located at a lower elevation than at least one of the remaining wheels is increased.

If each suspension element comprises a variable spring such as a variable spring constant spring, the natural frequency of each wheel suspension system can be varied at will. In such a case, upon detection of an inclination of the vehicle, the control unit may control the variable spring in such a manner that a natural frequency of a vertical movement of a vehicle part adjacent to one of the wheels is brought closer to a natural frequency of the vertical movement of the same vehicle part when the vehicle is oriented horizontally.

If the inclination of the vehicle is excessive, controlling the resonant frequency amplitude or the natural frequency itself may prevent a favorable attitude control of the vehicle. In such a case, the control unit may control the suspension element in a different mode or in a more conventional mode.

A similar approach is possible by detecting a turning movement of the vehicle, instead of the slanting of the vehicle.

According to a particularly preferred embodiment of the present invention, each suspension element comprises a variable damper, and the control unit comprises a target damping force setting unit for determining a target damping force of one of the dampers according to an output of the sensor associated with the subject damper, a correction value setting unit for determining a damping force correction value for the damper according to an output of the sensor associated with a damper different from the subject damper, and a target damping force correcting unit for correcting the target damping force with the damping force correction value.

Preferably, the dynamic state variable comprises a vertical speed of a vehicle part adjacent to each wheel, and the target damping force for the subject damper is corrected such that an absolute value of the target damping force is increased when a direction of a vertical movement of at least one of the vehicle parts corresponding to the remaining wheels is opposite to that of the vehicle part corresponding to the subject wheel. Also, the target damping force for each subject damper may be determined according the vertical speed of a vehicle part associated therewith while the damping force correction value for the subject damper is determined according to the vertical speed of at least one of the vehicle parts corresponding to the remaining dampers.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
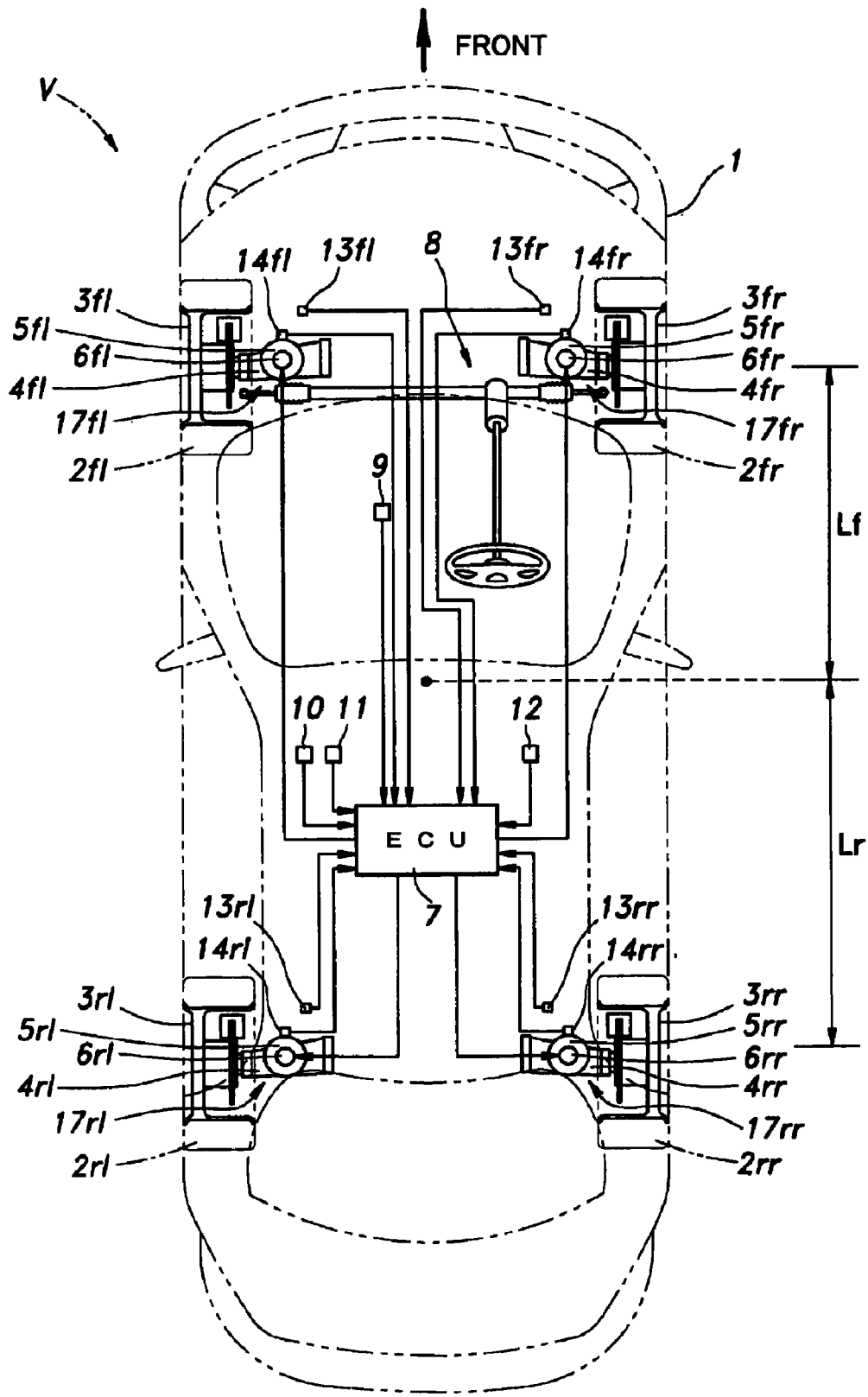
FIG. 1 is a diagram of a four wheel motor vehicle embodying the present invention.
Figure 2:
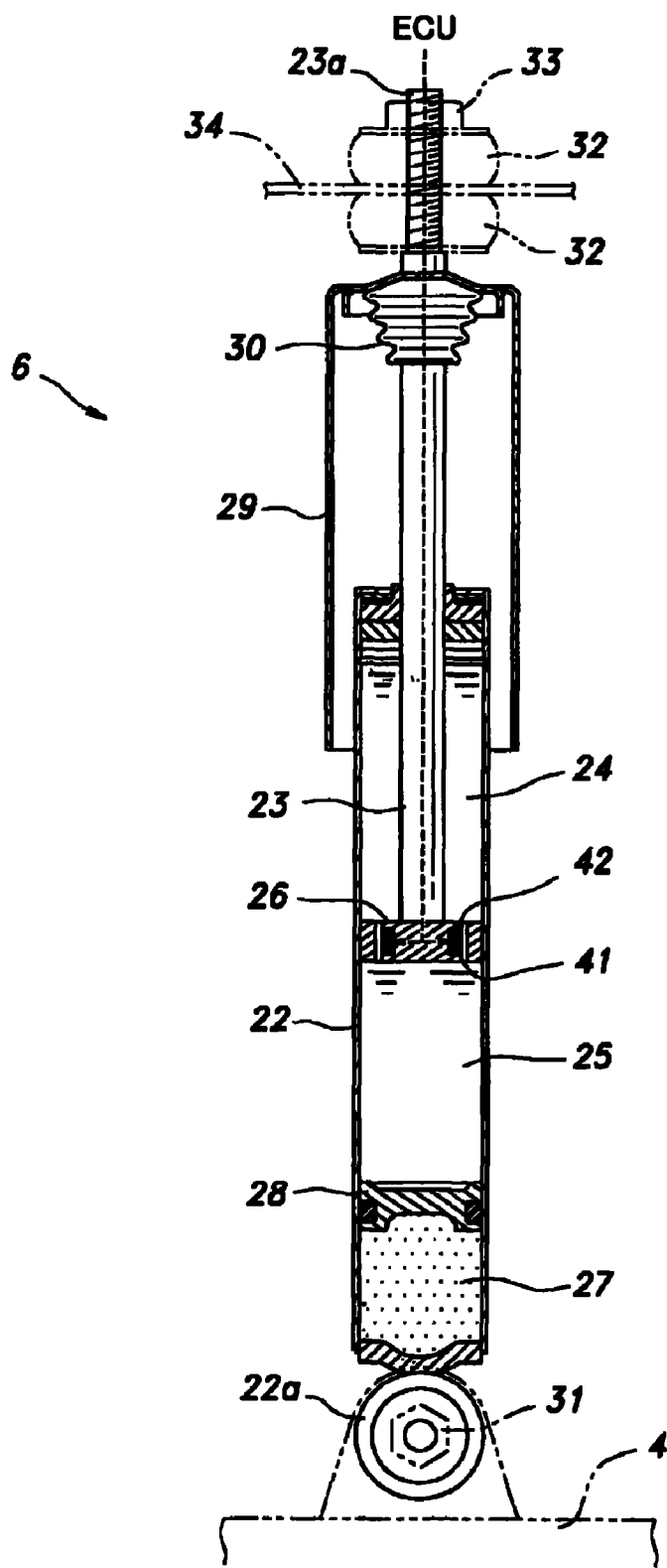
FIG. 2 is a vertical sectional view of a variable damper that can be used in the present invention.
Figure 3:
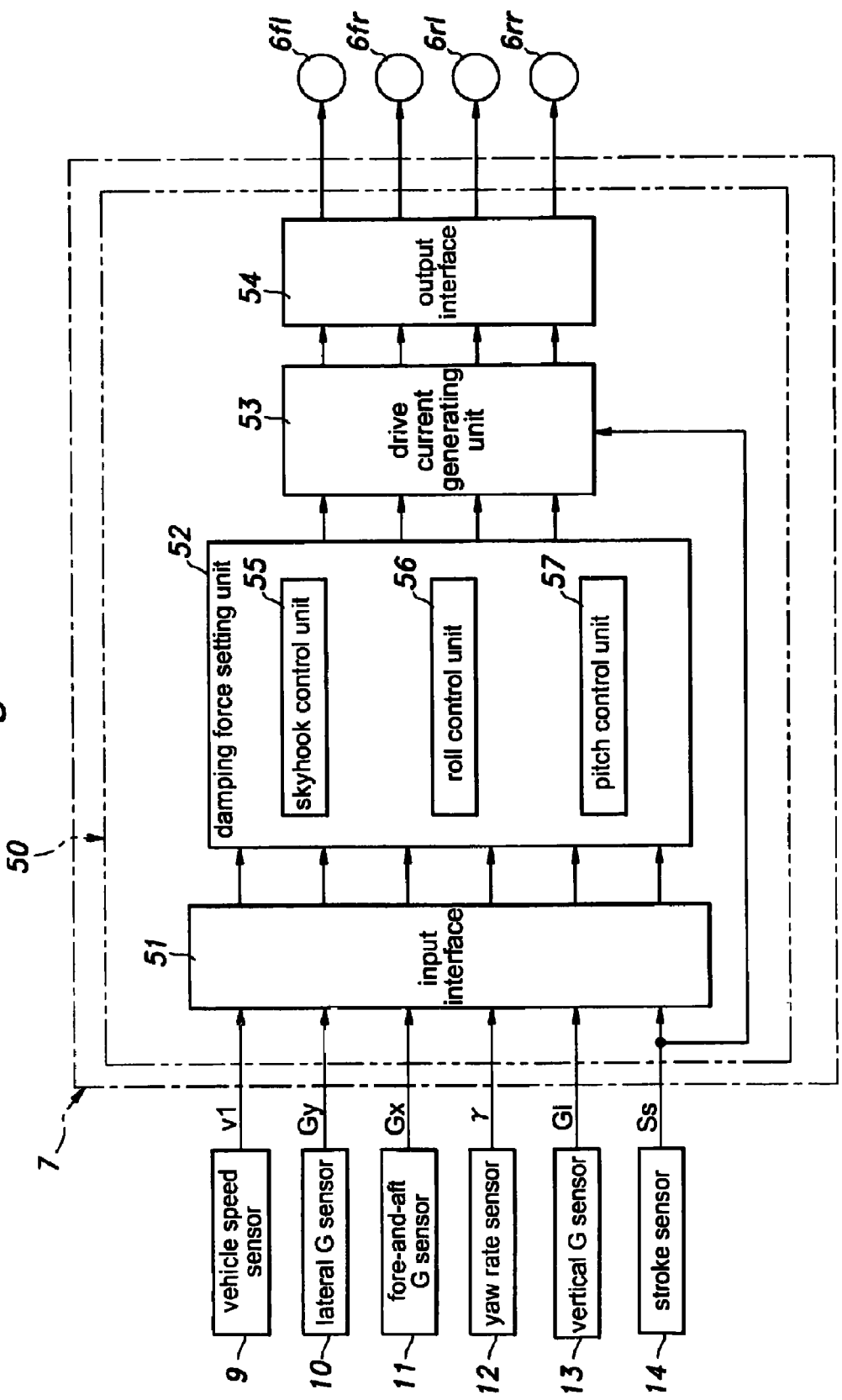
FIG. 3 is a block diagram of a damping force control unit of a first embodiment of the present invention.
Figure 4:
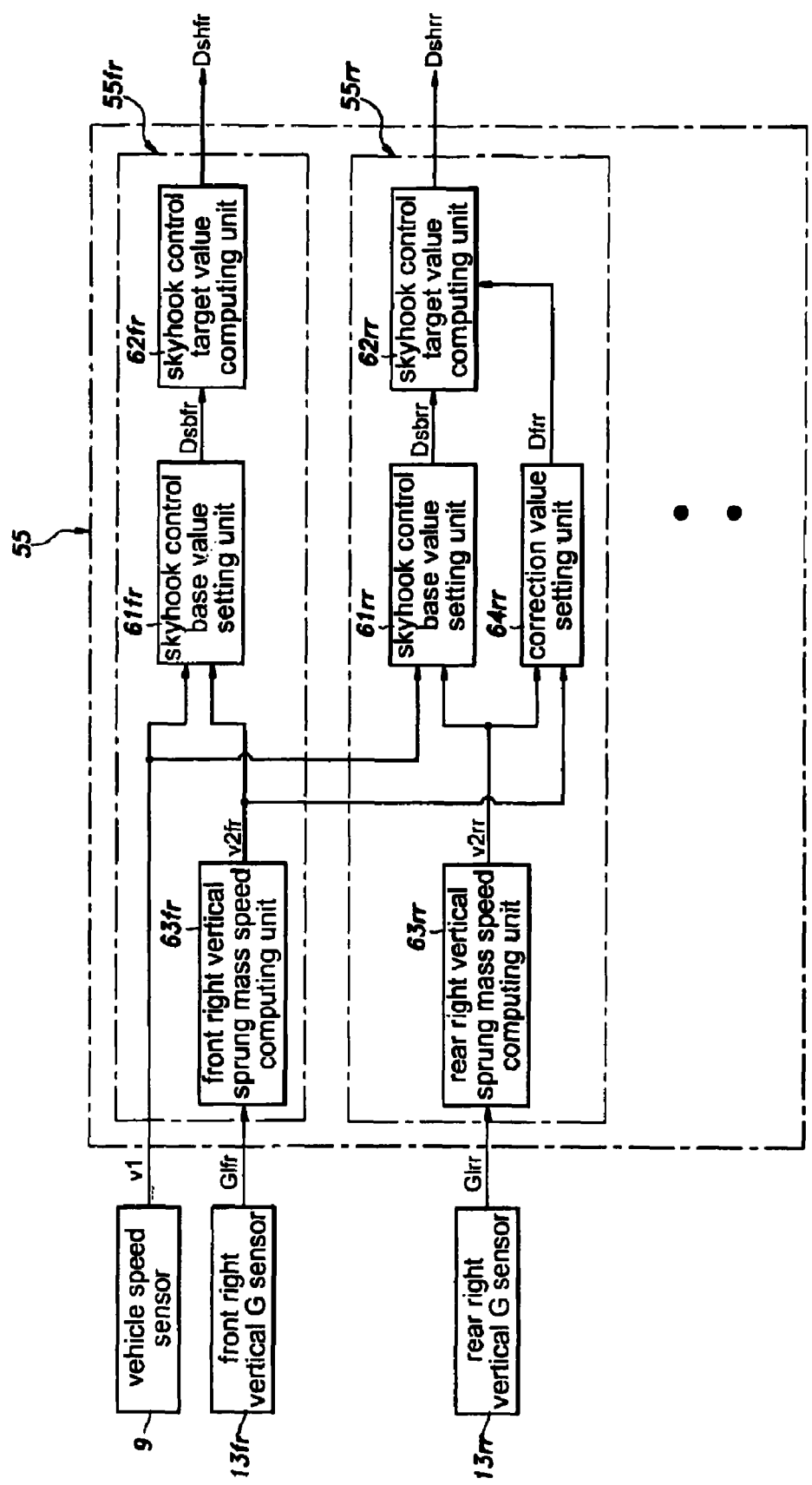
FIG. 4 is a block diagram of a skyhook control unit of the first embodiment.

FIG. 1 is a simplified diagram of a passenger vehicle to which the present invention is applied, FIG. 2 is a vertical sectional view of a damper to which the present invention is applied. FIG. 3 is a block diagram showing the general structure of a damping force control unit given as a first embodiment of the present invention, and FIG. 4 is a block diagram showing the details of a skyhook control unit used in the first embodiment of the present invention.

Referring to FIG. 1, the illustrated vehicle comprises four wheels 3 which are denoted with numerals $3fl$, $3fr$, $3rl$ and $3rr$, the suffixes indicating the four different positions of the wheels while numeral 3 denoting the wheels. The components associated with each wheel are similarly denoted in the following description by using the same notation system.

The vehicle V thus includes four wheels 3 each fitted with a pneumatic tire 2, and each wheel 3 is supported by a vehicle body 1 via a corresponding suspension system 17 including suspension arms 4, a spring 5 which in this case consists of a compression coil spring, a MRF damper 6 and other components. The vehicle V additionally comprises an ECU (electronic control unit) 7 for controlling the suspension systems 17, an EPS (electric power steering system) 8 and a vehicle speed sensor 9. The vehicle V is also provided with various vehicle motion sensors including a lateral G sensor 10, a fore-and-aft G sensor 11 and a yaw rate sensor 12 provided in suitable parts of the vehicle body, a vertical G sensor 13 for detecting a vertical acceleration of a vehicle part adjacent to each wheel, and a damper stroke sensor 14 provided for each wheel 3.

The ECU 7 comprises a microcomputer, ROM, RAM, a peripheral circuit, an input/output interface and various drivers, and is connected to the dampers 6 and the various sensors 9 to 14 via a communication line such as CAN (controller area network).

As shown in FIG. 2, each damper 6 of the illustrated embodiment consists of a mono-tube type shock absorber comprising a cylindrical cylinder 22 filled with MRF, a piston rod 23 extending out of the cylinder 22 in a slidable manner, a piston 26 attached to the inner end of the piston rod 23 and separating the interior of the cylinder 22 into an upper chamber 24 and a lower chamber 25, a free piston 28 defining a high pressure gas chamber 27 in a lower part of the cylinder 22, a cylindrical cover 29 having a larger inner diameter than the outer diameter of the cylinder 22 and attached to the piston rod 23 in a coaxial relationship to protect the piston rod 23 from contamination, and a bump stopper 30 attached to the piston rod 23 to define the limit of the movement of the damper 6 at the time of full bound in a resilient manner.

The lower end of the cylinder 22 is connected to a bracket formed in the upper surface of one of the suspension arms 4 via a bolt 31 passed through the bracket and an eyepiece $22a$ formed in the lower end of the cylinder 22. The upper end of the piston rod 23 is provided with a threaded portion $23a$ which is connected to a damper base 34 (formed in an upper part of a wheel house) via a pair of rubber bushes 32 interposing a damper base member and a nut 33 threaded onto the threaded portion $23a$ of the piston rod 23.

The piston 26 is provided with an annular passage 41 communicating the upper chamber 24 and the lower chamber 25 with each other and an MLV coil 42 provided immediately radially inwardly of the annular passage 41. When electric current is supplied to the MLV coil 42 by the ECU 7, the MRF flowing through the annular passage 41 is subjected to a magnetic field which forms clusters of the chains of magnetic particles in the MRF and increases the apparent viscosity of the MRF flowing through the annular passage 41.

A damping force control unit 50 is incorporated in the ECU 7 as illustrated in FIG. 3. The damping force control unit 50 comprises an input interface 51 to which the sensors 9 to 14 are connected, a damping force setting unit 52 for determining a target damping force of each damper 6 according to the detection signals obtained from the sensors 9 to 14, a drive current generating unit 53 for generating drive current for each damper 6 (MLV coil 42) according the corresponding target damping force supplied by the damping force setting unit 52 and a detection signal Ss from the corresponding stroke sensor 14 and an output interface 54 for supplying the drive current generated by the drive current generating unit 53 to each damper 6. The damping force setting unit 52 comprises a skyhook control unit 55 for performing a skyhook control, a roll control unit 56 for performing a roll control, a pitch control unit 57 for performing a pitch control, and other control units.

The skyhook control unit 55 having the structure represented in FIG. 4 is provided for each wheel. In the illustrated embodiment, a skyhook control is performed by using the right front wheel as a reference wheel as will be discussed more fully hereinafter. The skyhook control unit $55fr$ corresponding to the right front wheel comprises a sprung mass speed computing unit $63fr$, a skyhook control base value setting unit $61fr$ and a skyhook control target value computing unit $62fr$.

The sprung mass; speed computing unit $63fr$ computes a sprung mass speed $V2fr$ by integrating a vertical acceleration $G1fr$ received from the vertical G sensor $13fr$, and forwards it to the skyhook control base value setting unit $61fr$. The skyhook control base value setting unit $61fr$ sets a skyhook control base value Dsbfr by multiplying a vehicle speed v1 received from the vehicle speed sensor 9 to the sprung mass speed $V2fr$ received from the sprung mass speed computing unit $63fr$, and multiplying a prescribed skyhook gain Gshfr to the product. The skyhook control target value computing unit $62fr$ sets a skyhook control target value Dshfr according to the skyhook control base value Dsbfr, and outputs the obtained value for a control purpose.

The skyhook control unit $55rr$ for the right rear wheel comprises a sprung mass speed computing unit $63rr$, a skyhook control base value setting unit $61rr$, a correction value setting unit $64rr$ and a skyhook control target value computing unit $62rr$.

The sprung mass speed computing unit $63rr$ computes a sprung mass speed $V2rr$ by integrating a vertical acceleration G1$rr$ received from the vertical G sensor 13$rr$, and forwards it to the skyhook control base value setting unit 61$rr$. The skyhook control value base setting unit 61$rr$ sets a skyhook control base value Dsbrr by multiplying a vehicle speed v1 received from the vehicle speed sensor 9 to the sprung mass speed V2$rr$ received from the sprung mass speed computing unit 63$rr$, and multiplying a prescribed skyhook gain Gshrr to the product. A correction value setting unit 64$rr$ computes a difference between the two sprung mass speeds V2$fr$ and V2$rr$ which are forwarded from the sprung mass speed computing unit 63$fr$ and sprung mass speed computing unit 63$rr$, respectively, and sets a skyhook control correction value Dfrr by multiplying a prescribed correction gain Gfrr to the computed difference.

The skyhook control target value computing unit 62$rr$ sets a skyhook control target value Dshrr according to the skyhook control base value Dsbfr obtained from the skyhook control base value setting unit 61$fr$ and skyhook control correction value Dfrr obtained from the skyhook control base value setting unit 61 rr, and outputs the obtained value for a control purpose.

The skyhook control unit 55$fl$ corresponding to the left front wheel 3$fl$ and skyhook control unit 55$rl$ corresponding to the left rear wheel 3$rl$ each have a structure similar to that of the skyhook control unit 55$rr$, and set a corresponding skyhook control target value Dshfl or Dshrl, as the case may be. It should be noted that each of the four wheels can be a reference wheel, and the foregoing description applies to each of such reference wheels.

Figure 5:
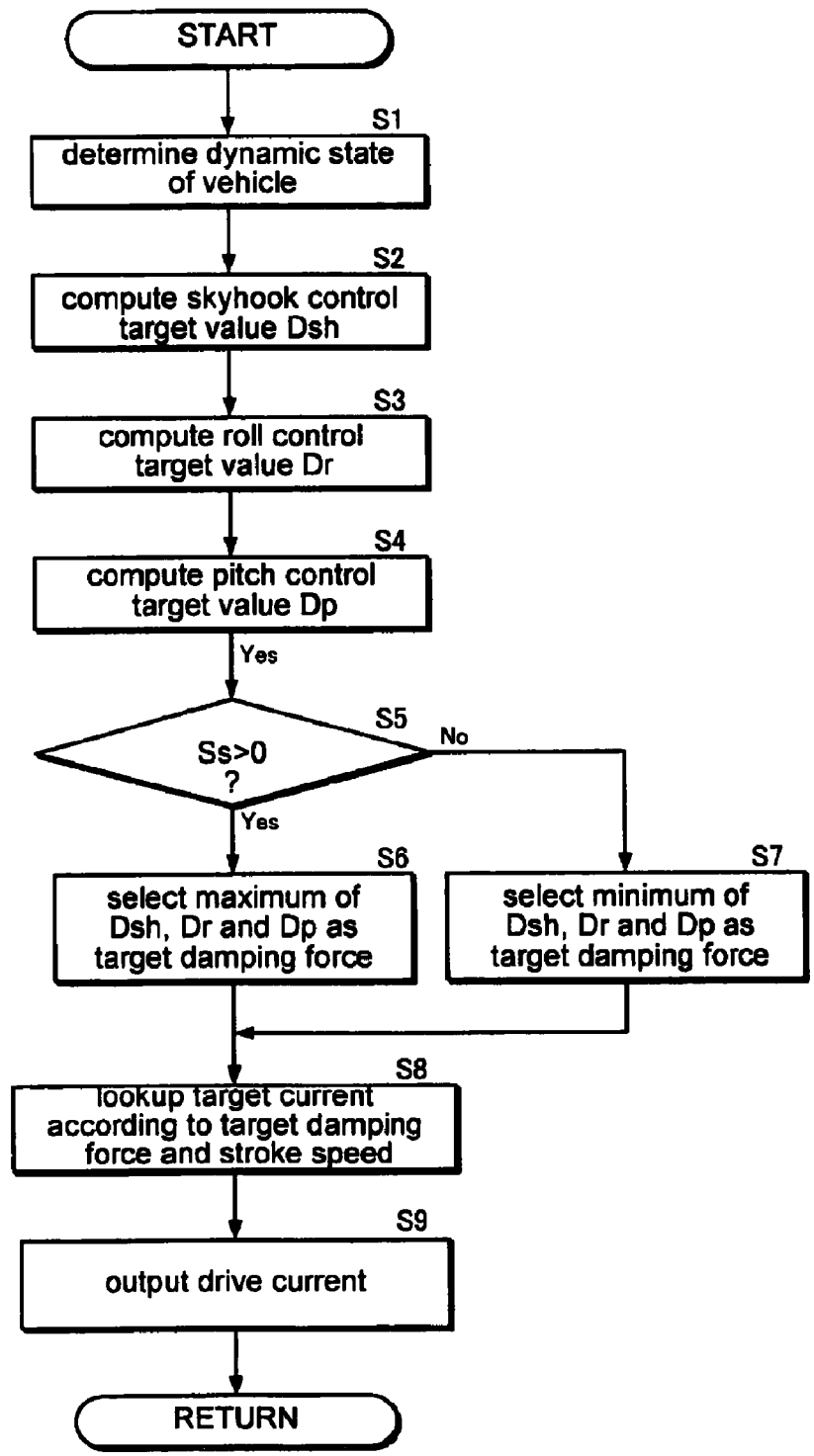
FIG. 5 is a flowchart of the damper control process of the first embodiment.

When the vehicle is traveling, the damping force control unit 50 performs a damping control represented by the flowchart of FIG. 5 for each wheel at a prescribed processing interval such as 10 msec. First of all, the dynamic state (including at least the sprung mass speed of each wheel) of the vehicle V is determined according to the acceleration information of the vehicle obtained by the lateral G sensor 10, fore-and-aft G sensor 11 and vertical G sensors 14, the vehicle speed obtained by the vehicle speed sensor 9 and a steering speed obtained by the steering angle sensor (not shown in the drawing) in step S1. From the dynamic state of the vehicle, a skyhook control target value Dsh for each damper 6 is computed in step S2, a roll control target value Dr for each damper 6 is computed in step S3, and a pitch control target value Dp is computed for each damper 6 in step S4.

The damping force control unit 50 then determines if the stroke speed Ss of each damper 6 is positive in step S5. If the stroke speed Ss is positive in value (or the damper 6 is extending), the largest value of the three control target values Dsh, Dr and Dp is selected as the target damping force Dtgt in step S6. If the stroke speed Ss is negative in value (or the damper 6 is contracting), the smallest value of the three control target values Dsh, Dr and Dp is selected as the target damping force Dtgt in step S7.

Figure 6:
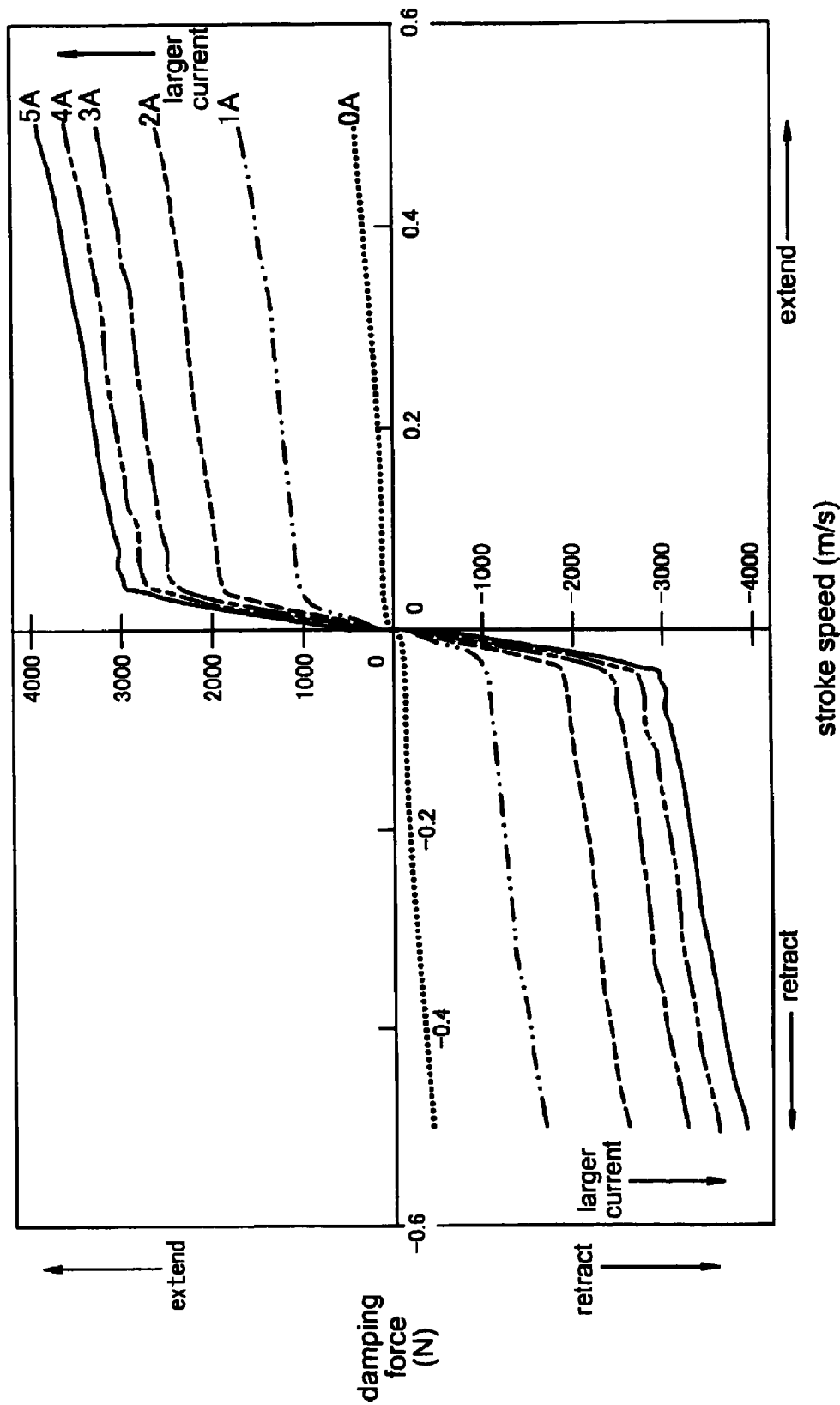
FIG. 6 is a graph showing a relationship between the stroke speed, damping force and electric current supplied to the MLV coil of the damper.

Once the target damping force Dtgt is determined step S6 or S7, the damping force control unit 50 looks up a target current Itgt corresponding to the target damping force Dtgt from a target current map as presented in the graph of FIG. 6 in step S8. In step S9, the damping force control unit 50 then supplies a drive current to the MLV coil 42 of each damper 6 according to the target current It determined in step S8

Figure 7:
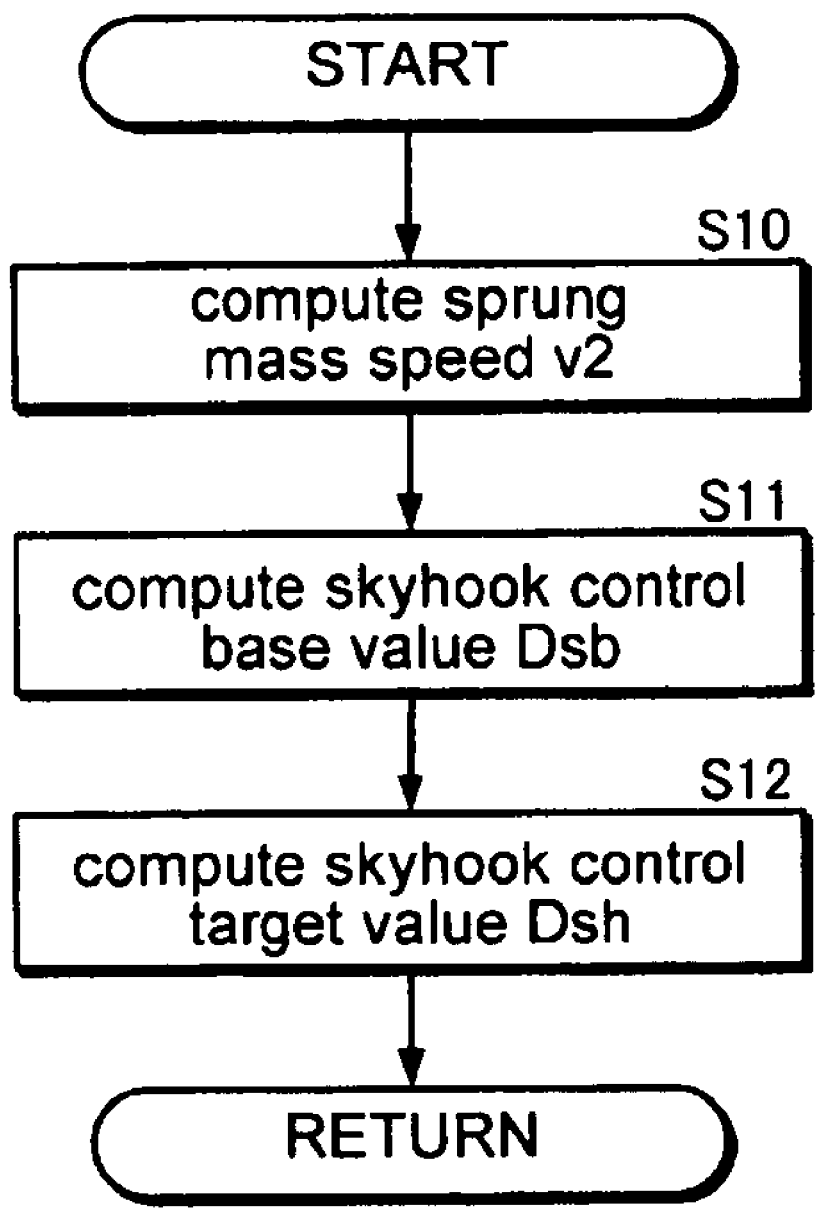
FIG. 7 is a flowchart of the damper control process for a reference wheel in the first embodiment.
Figure 8:
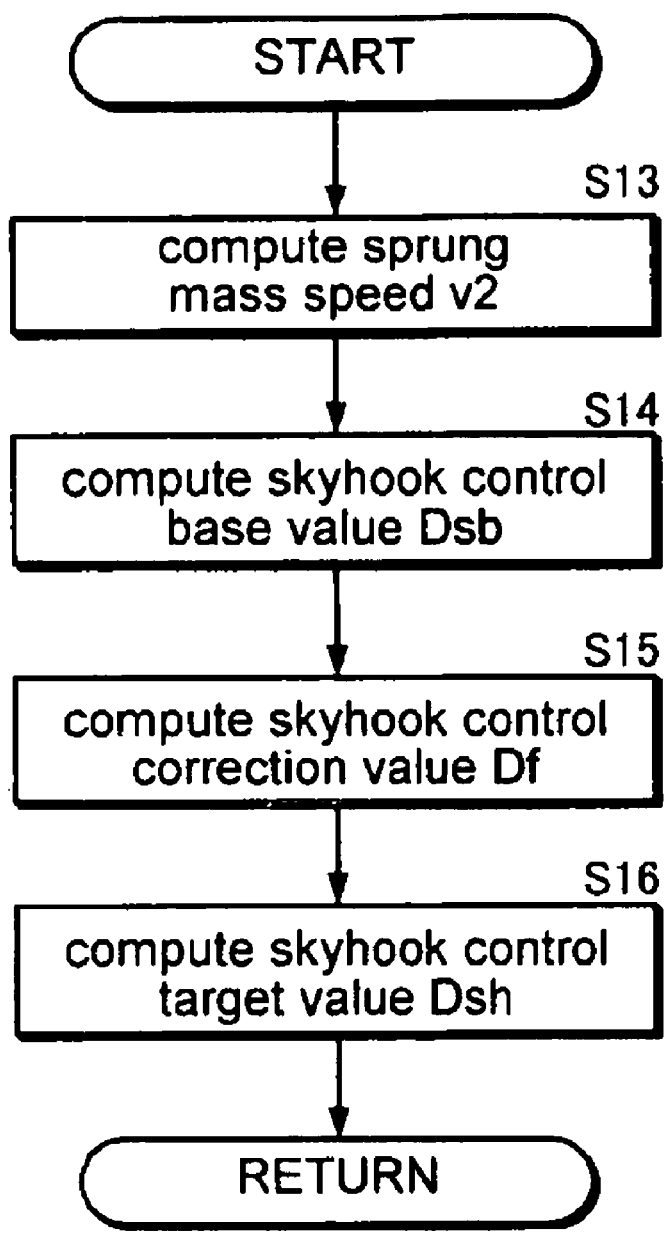
FIG. 8 is a flowchart of the damper control process for a non-reference wheel in the first embodiment.

The skyhook control unit 55 of the damping force setting unit 52 computes the skyhook control target value Sdhfr according to the procedure illustrated in the flowcharts of FIGS. 7 and 8. The skyhook control target value Dshfr for the damper 6$fr$ of the reference wheel or the right front wheel 3$fr$ is computed by the corresponding skyhook control unit 55$fr$ according to the flowchart of FIG. 7, and the skyhook control target values Dshfl, Dshrr and Dshrl for the dampers 6$fl$, 6$rr$ and 6$rl$ of the remaining wheels 3$fl$, 3$rr$ and 3$rl$ are computed by the corresponding skyhook control units 55$fl$, 55$rr$ and 55$rl$ according to the flowchart of FIG. 8.

As shown in FIG. 7, upon starting of the damper skyhook control target value computing process by the skyhook control unit 55$fr$, the sprung mass speed computing unit 63$fr$ computes the sprung mass speed v2$fr$ by integrating the corresponding vertical acceleration G1$fr$ in step S10. The skyhook control base value setting unit 61$fr$ then computes the skyhook control base value Dsbfr according to the vehicle speed v1, sprung mass speed v2$fr$ and skyhook gain Gshfr in step S11. The skyhook control base value setting unit 62$fr$ outputs a skyhook control target value Dshfr according to the skyhook control base value Dsbfr.

As shown in FIG. 8, upon starting of the damper skyhook control target value computing process by the skyhook control unit 55$rr$ corresponding to the right rear wheel 3$rr$. the sprung mass speed computing unit 63$rr$ computes the sprung mass speed v2$rr$ by integrating the vertical acceleration G1$rr$ in step S13. The skyhook control base value setting unit 61$rr$ then computes the skyhook control base value Dsbrr according to the vehicle speed v1, sprung mass speed v2$rr$ and skyhook gain Gshrr in step S14. The correction value setting unit 64$rr$ computes a difference between the two sprung mass speeds V2$fr$ and V2$rr$, and computes the skyhook control correction value Dfrr according to the obtained difference and the correction gain Gfrr in step S115. The skyhook control target value Dshrr is computed from the skyhook control base value and skyhook control correction value Dfrr computed in steps S14 and 15, respectively.

The skyhook control target values Dshfl and Dshrl corresponding to the left front wheel 3$fl$ and left rear wheel 3$rl$ are computed by the control flow illustrated in FIG. 8 similarly as the skyhook control target value Dshrr for the right rear wheel 3$rr$, and is outputted for a control purpose.

According to the first embodiment, the sprung mass speeds of the different wheels can be brought to mutually similar values when performing a feedback skyhook control of the vertical movement of each wheel based on the corresponding sprung mass speed by using the right front wheel 3$fr$, or any other wheel, as the reference wheel for providing a correction gain for the feedback control.

Figure 9:
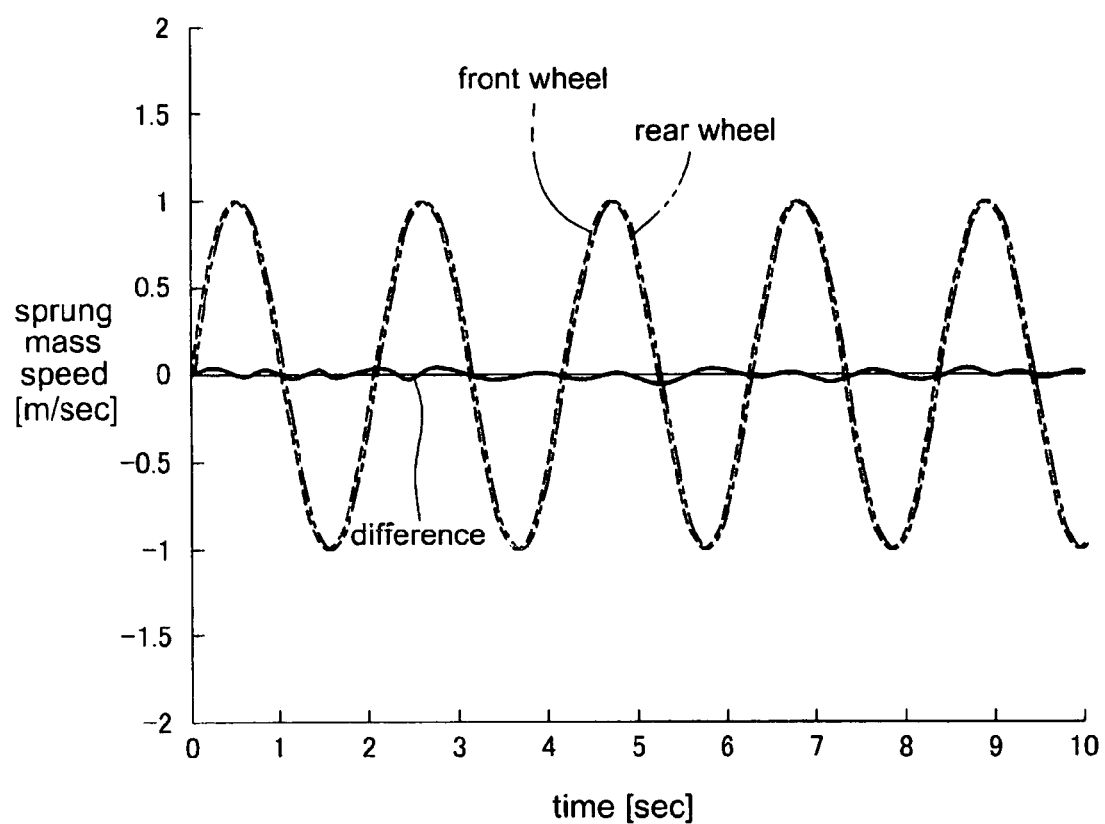
FIG. 9 is a graph showing the sprung mass speeds v2 of the front wheel and rear wheel when the control process of the first embodiment is executed.

FIG. 9 shows the sprung mass speeds v2 of the front wheels 3$fr$ and 3$fl$ and rear wheels 3$rr$ and 3$rl$ when the control process of the first embodiment is executed. When the vehicle is traveling a road that slants upward or downward, the sprung mass speeds are brought close to each other, and the pitching movement of the vehicle body can be avoided. Similarly, although not shown in the graph, according to the first embodiment, the sprung mass speeds v2 of the right wheels 3$fr$ and 3$rr$ and left wheels 3$fr$ and 3$fl$ may be similarly brought close to each other, and the rolling movement of the vehicle body can be avoided when the vehicle is traveling over a laterally slanted road surface.

Figure 10:
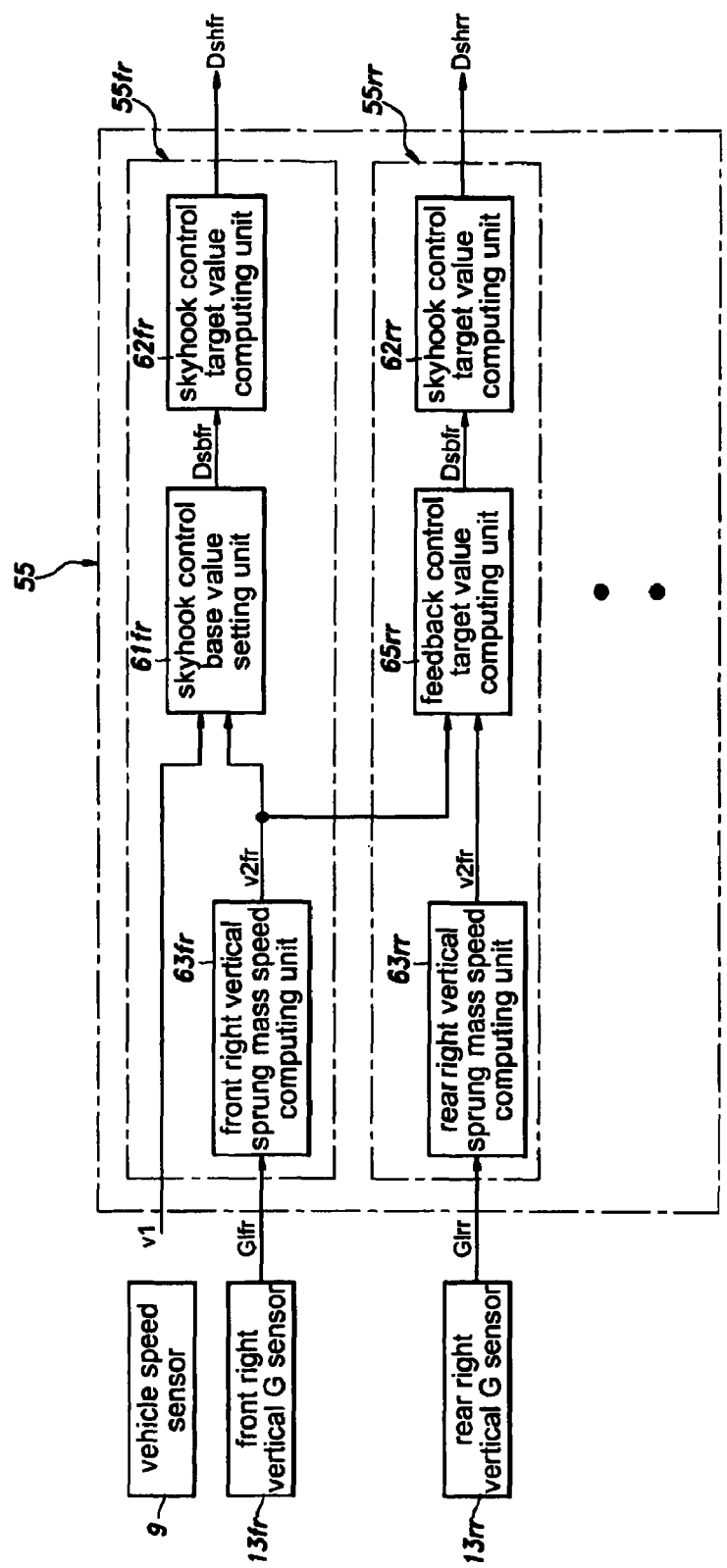
FIG. 10 is a block diagram similar to FIG. 4 showing a skyhook control unit for a second embodiment.

FIG. 10 shows a block diagram of a second embodiment of the present invention which is slightly modified from the first embodiment. In FIG. 10, the parts corresponding to those of the previous embodiment are denoted with like numerals without repeating the description of such parts. This embodiment differs from the previous embodiment in the structures of the skyhook control units 55$rr$, 55$fl$ and 55$rl$ corresponding to the non-reference wheels, and is otherwise similar to the first embodiment.

As shown in FIG. 10, the skyhook control unit 55$rr$ corresponding to the right rear wheel comprises a sprung mass speed computing unit 63$rr$, a feedback control target value computing unit 65*rr* and a skyhook control target value computing unit 62*rr*. The sprung mass speed computing unit 63*rr* is not different from that of the first embodiment. The feedback control target value computing unit 65*rr* computes a difference between a sprung mass speed V2*fr* received from the sprung mass speed computing unit 63*fr* and a sprung mass speed V2*rr* received from the sprung mass speed computing unit 63*rr*, and computes a feedback control target value Dfbrr according to the computed difference and a prescribed correction gain Gf2*rr*. The skyhook control target value computing unit 62*rr* sets a skyhook control target value Dshrr according to the feedback control target value Dfbrr, and outputs it for a control purpose.

The skyhook control unit 55*fl* corresponding to the left front wheel 3*fl* and skyhook control unit 55*rl* corresponding to the left rear wheel 3*rl* each have a structure similar to that of the skyhook control unit 55*rr*, and set a corresponding skyhook control target value Dshfl or Dshrl, as the case may be.

According to the second embodiment, the sprung mass speeds of the different wheels can be brought to mutually similar values so that undesired pitching and rolling movements may be reduced by performing a feedback skyhook control of the vertical movement of each wheel based on the corresponding sprung mass speed by using the right front wheel 3*fr*, or any other wheel, as the reference wheel for providing a correction gain for the feedback control while doing away with the skyhook control base values for the non-reference wheels.

Figure 11:
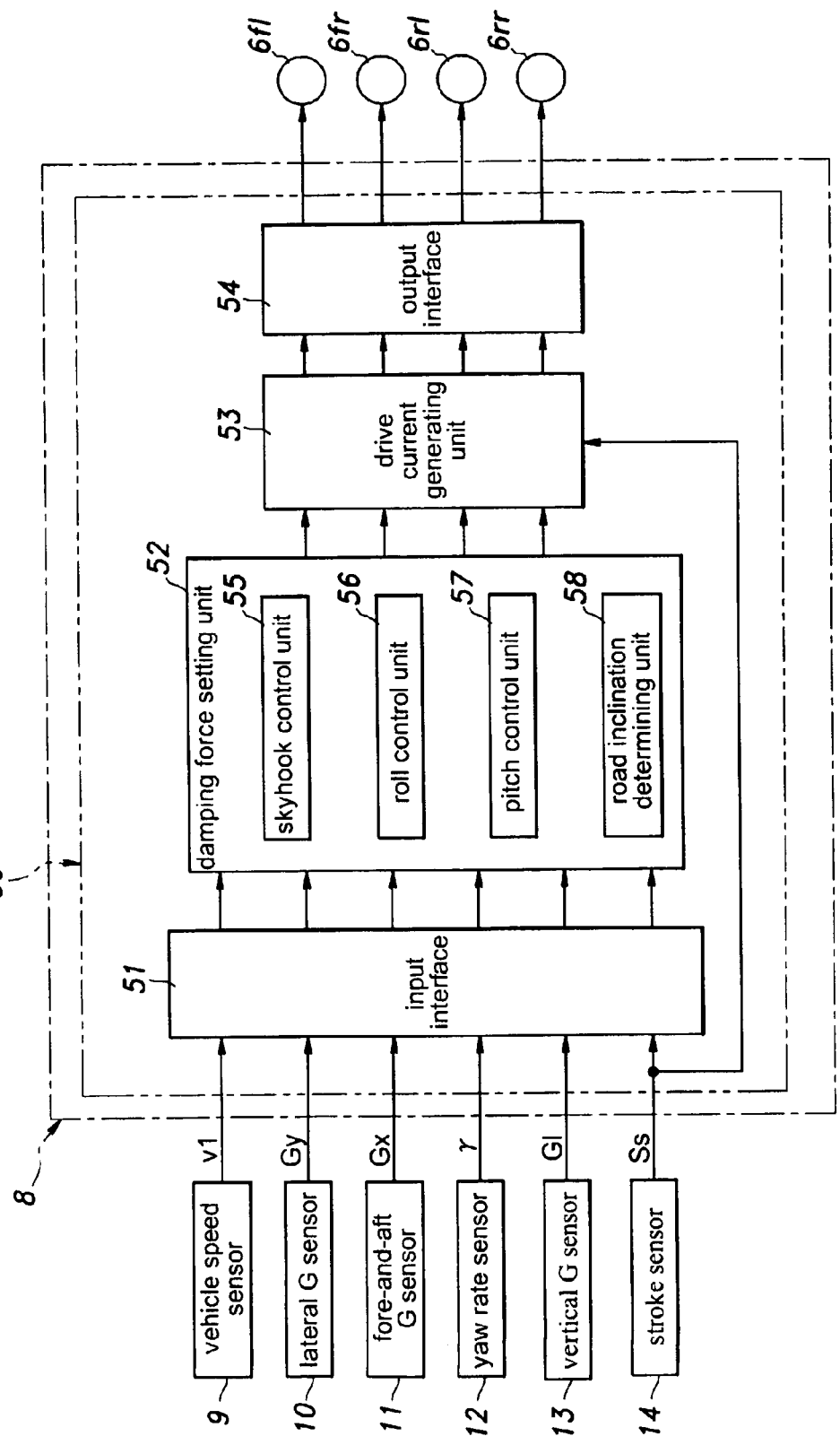
FIG. 11 is a block diagram similar to FIG. 1 showing a third embodiment of the present invention.
Figure 12:
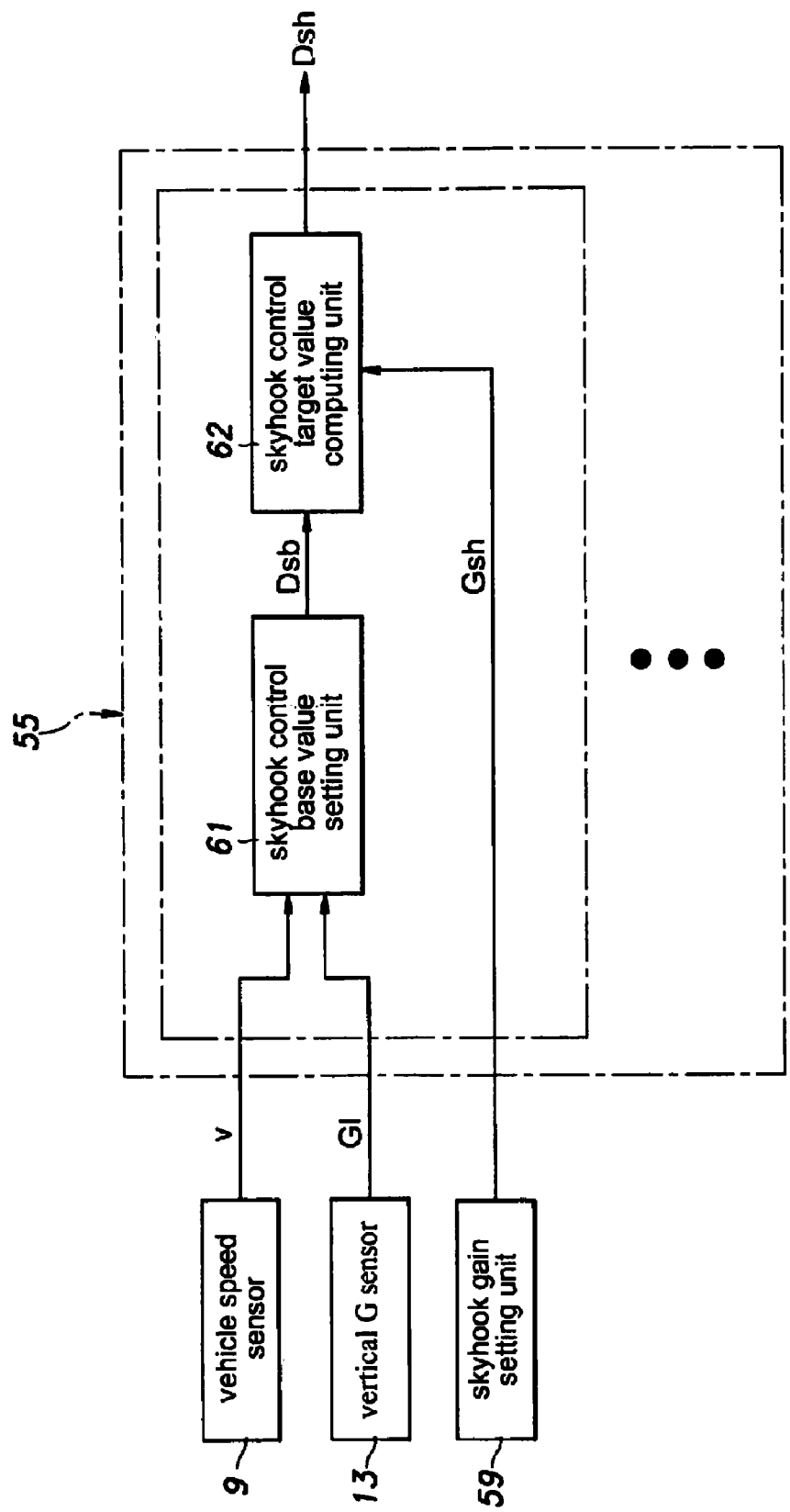
FIG. 12 is a block diagram showing the details of the skyhook control unit of the third embodiment.
Figure 13:
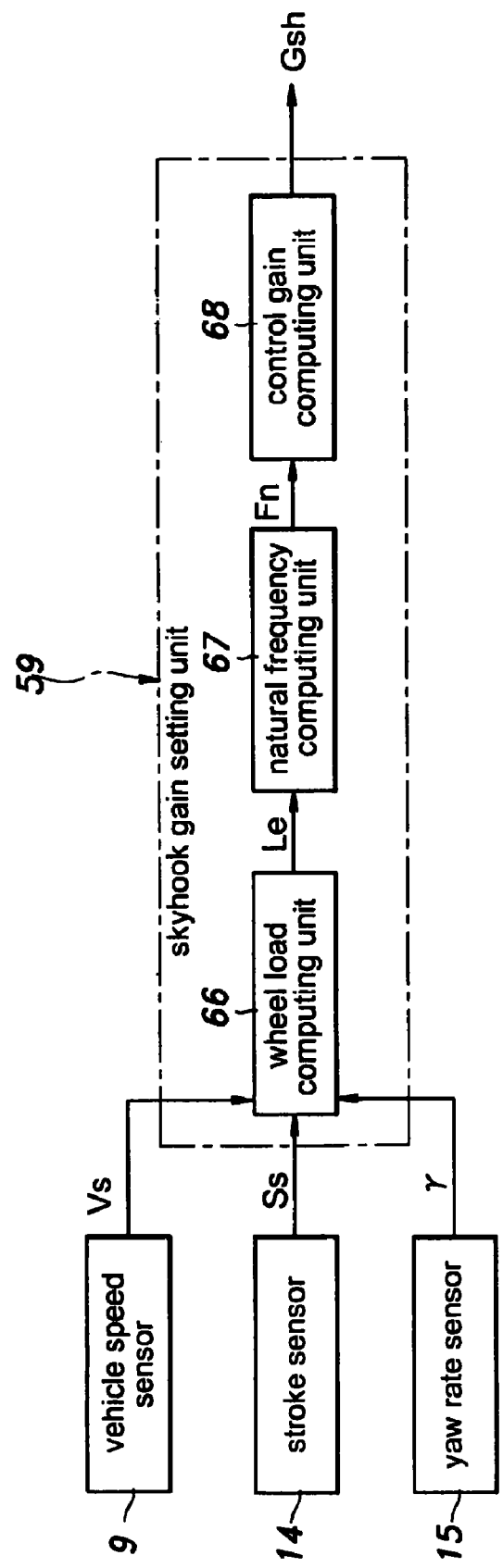
FIG. 13 is a block diagram showing the structure of the skyhook gain setting unit of the third embodiment.

FIGS. 11 to 13 show a third embodiment of the present invention. The parts corresponding to those of the previous embodiments are denoted with like numerals without repeating the description of such parts.

Figure 17:
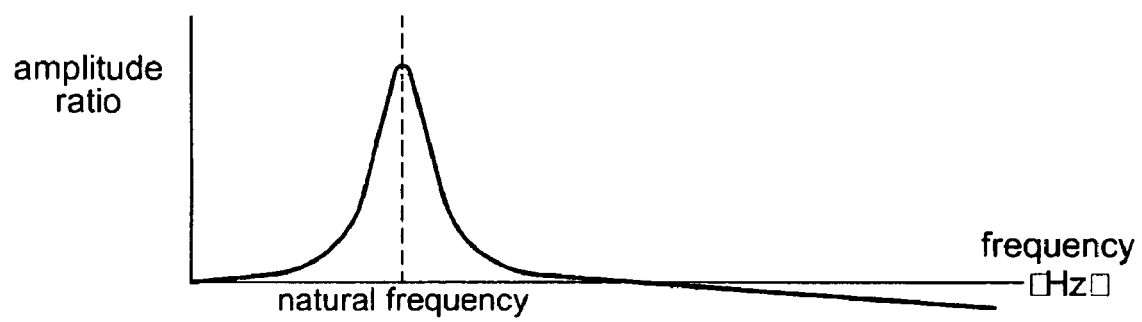
FIG. 17 is a graph comparing the natural frequencies of different wheels when the vehicle is traveling over a horizontal road surface.
Figure 18:
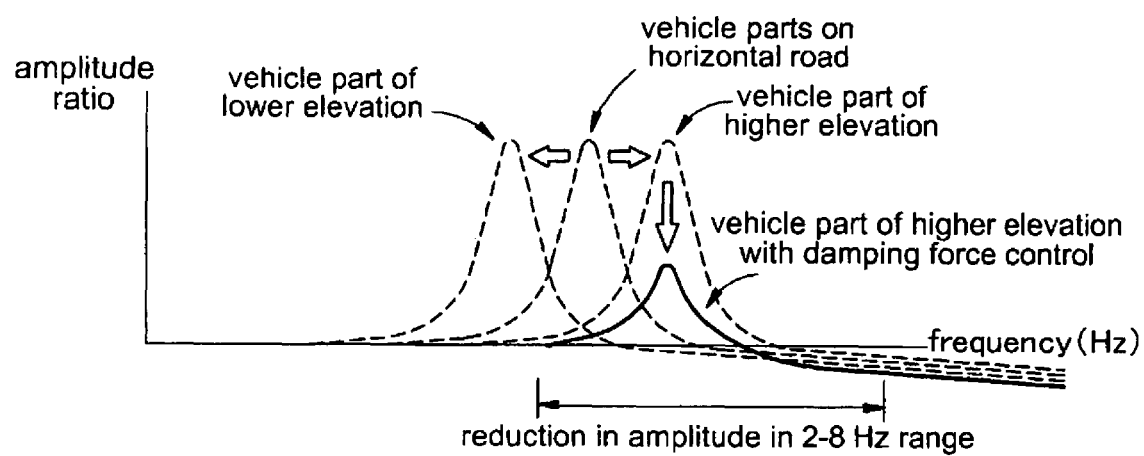
FIG. 18 is a graph comparing the natural frequencies of different wheels when the vehicle is traveling over a slanted road surface and showing an improvement in ride quality achieved by increasing the damping force for a vehicle part at an upper elevation.
Figure 19:
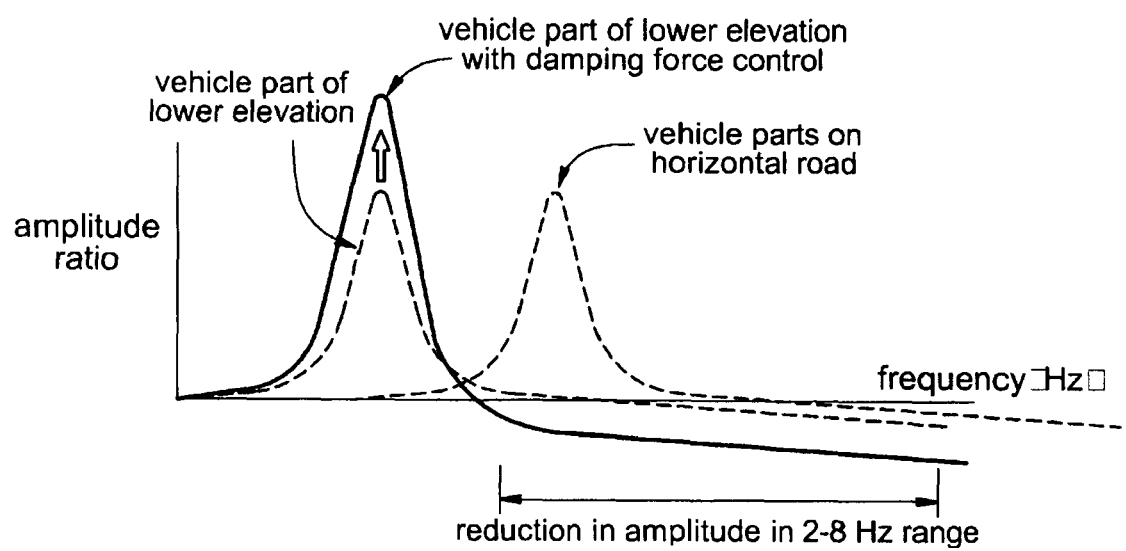
FIG. 19 is a graph comparing the natural frequencies of different wheels when the vehicle is traveling over a slanted road surface and showing an improvement in ride quality achieved by reducing the damping force for a vehicle part at a lower elevation.

As is typically the case, the wheel suspension systems of the illustrated embodiment are configured such that the natural frequencies Fn of the wheel suspension systems of the different wheels are identical to one another when the vehicle V is traveling over a horizontal road surface as shown in FIG. 17. FIG. 17, and FIGS. 18 and 19 which are to be discussed hereinafter, show the relationship between an amplitude ratio of the amplitude of a sprung mass movement to the amplitude of road surface irregularities and the frequency. The amplitude ratio is given in a logarithmic scale ($20*\log_{10}x$). Therefore, the smaller the value of the amplitude ratio is, the smaller is the amplitude of the sprung mass movement for a given input of road surface irregularities.

Referring to FIG. 11, the damping force control unit 50 is similar to that of the first embodiment, but the damping force setting unit 52 is additionally incorporated with a road inclination determining unit 58 that determines an inclination of a road surface on which the vehicle is placed or is traveling. The inclination of the vehicle body itself may also be used instead of the inclination of a road surface, and it should be understood that these two inclinations may be used interchangeably without departing from the spirit of the present invention.

As shown in FIG. 12, the skyhook control unit 55 comprises a skyhook control base value setting unit 61 which sets a skyhook control base value Dsb according to a vehicle speed signal v received from the vehicle speed sensor 9 and a vertical acceleration signal G1 (sprung mass vertical acceleration) received from the vertical G sensor 13, and a skyhook control target value computing unit 62 for computing a skyhook control target value Dsh by multiplying the skyhook control base valued Dsb by a skyhook gain Gsh set by a skyhook gain setting unit 59, for each wheel.

As shown in FIG. 13, the skyhook gain setting unit 59 comprises a wheel load computing unit 66 that computes a wheel load Le of each wheel 3 according a vehicle speed Vs received from the vehicle speed sensor 9, a stroke speed Ss received from the stroke sensor 14 and a yaw rate γ received from the yaw rate sensor 12, a natural frequency computing unit 67 that computes a natural frequency Fn of the part of the vehicle body adjacent to the corresponding wheel 3 according to the wheel load Le, and a control gain setting unit 68 that sets the skyhook gain Gsh according to the output of the natural frequency computing unit 67.

The road inclination determining unit 58 is configured to determine a fore-and-aft inclination θx of the road surface in a fore-and-aft direction of the vehicle according to a fore-and-aft acceleration Gx received from the fore-and-aft G sensor 11 when the vehicle is traveling at a constant speed as detected by the vehicle speed sensor 9, and a lateral inclination θy of the road surface in a lateral direction of the vehicle according to a lateral acceleration Gy received from the lateral G sensor 10 when a yaw rate γ received from the yaw rate sensor 12 is zero.

Figure 14:
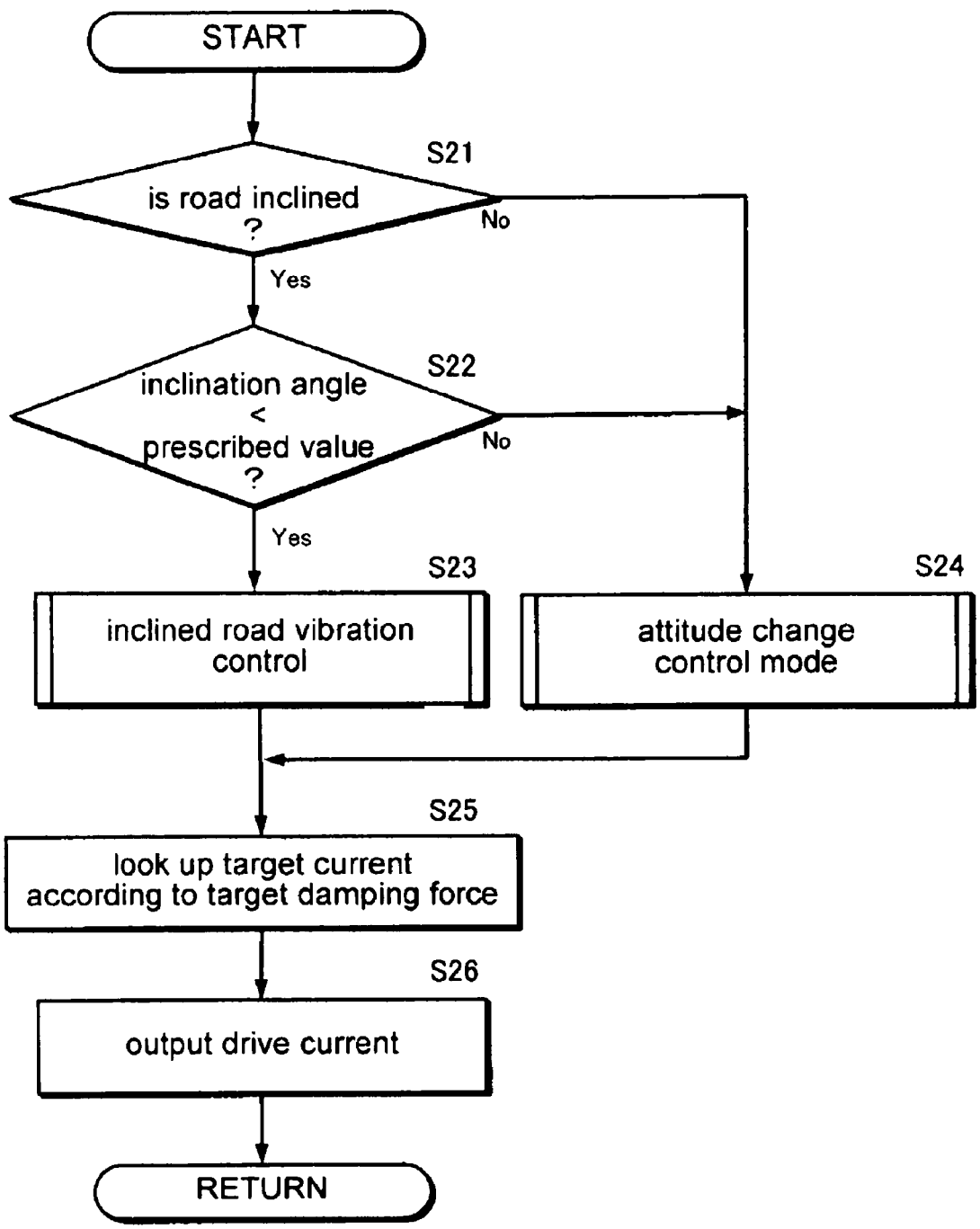
FIG. 14 is a flowchart of a damper control process of the third embodiment.

When the vehicle is traveling, the damping force control unit 50 performs a damping control represented by the flowchart of FIG. 14 for each wheel at a prescribed processing interval such as 10 msec. First of all, the road inclination determining unit 58 of the damping force setting unit 52 determines inclinations of the road surface θx and θy in step S21. If any appreciable inclination in any direction is not detected (No) in step S21, the skyhook control unit 55 of the damping force setting unit 52 executes an attitude change reduction control which will be described hereinafter in step S24. In this attitude change reduction control, a skyhook control target value Dsh or a target damping force for each damper 6 is determined.

On the other hand, if an appreciable inclination in any direction is detected (Yes) in step S21, it is determined if the detected inclination angle is greater than a prescribed value in step S22. If the detected inclination angle is greater than the prescribed value (No) in step S22, the attitude change reduction control is executed in step S24. If the detected inclination angle is smaller than the prescribed value (Yes) in step S22, the skyhook control unit 55 of the damping force setting unit 52 executes an inclined road vibration reduction control in step S23 which will be described hereinafter. In this inclined road vibration reduction control, a skyhook control target value Dsh or a target damping force for each damper 6 is determined similarly as in the attitude change reduction control.

The drive current generating unit 53 of the damping force control unit 50 determines a target drive current for each target damping force given by the attitude change reduction control or inclined road vibration reduction control by looking up a prescribed target current map in step S25, and supplies a corresponding electric current to the MLV coil 42 of each damper 6 in step S26. The foregoing steps are repeated thereafter.

Figure 15:
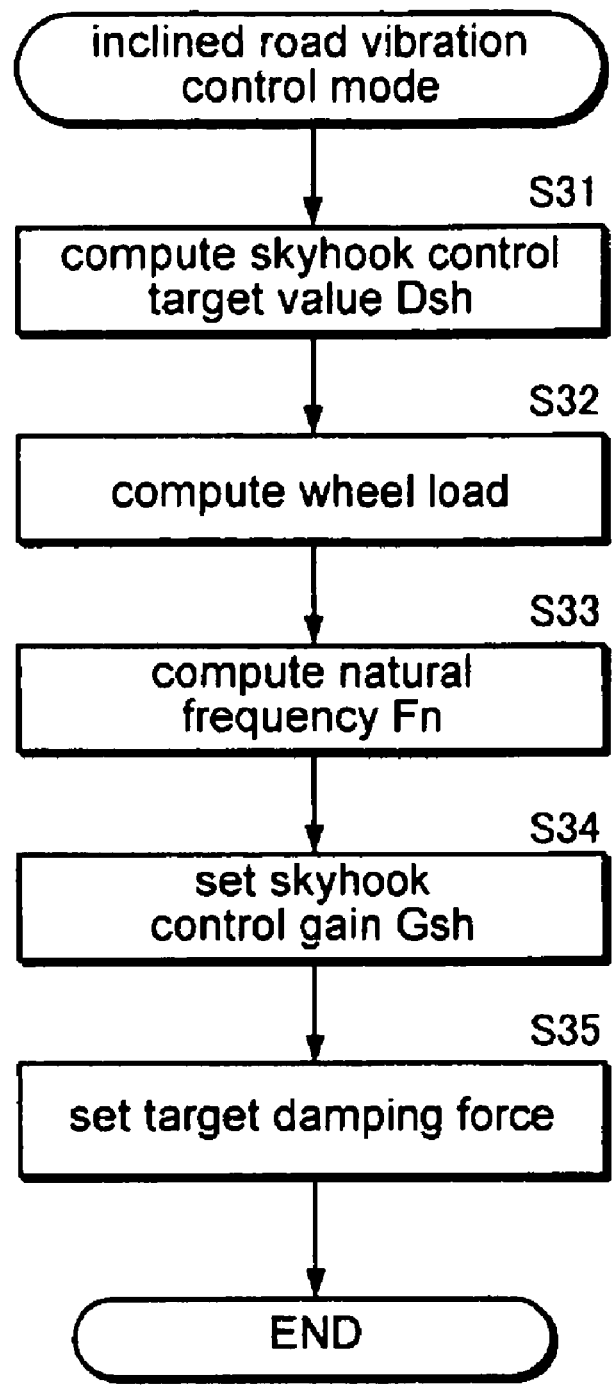
FIG. 15 is a flowchart of the inclined road vibration reduction control process of the third embodiment.

The inclined road vibration reduction control is described in the following with reference to the flowchart of FIG. 15. First of all, the skyhook control base value setting unit 61 of the damping force setting unit 52 determines a skyhook control base value Dsb in step S31. The wheel load computing unit 66 of the skyhook gain setting unit 59 computes a wheel load Le of each wheel in step S32, and the natural frequency computing unit 67 computes a natural frequency Fn of the corresponding part of the vehicle body according to the wheel load Le computed in step S32 (step S33), and the control gain setting unit 68 determines a skyhook gain Gsh for each wheel 3 according to the natural frequency Fn computed in step S33 (step S34).

When determining the skyhook gain Gsh for each wheel 3 in step S34, the skyhook gain Gsh of the vehicle part located at a higher elevation in the inclination determined by the road inclination determining unit 58 is corrected such that a smaller resonant amplitude may be attained, and the skyhook gain Gsh of the vehicle part located at a lower elevation in the inclination determined by the road inclination determining unit 58 is corrected such that a larger resonant amplitude may be attained.

The skyhook control target value computing unit 62 of the damping force setting unit 52 computes a skyhook control target value Dsh for each damper 6 by multiplying the natural frequency Fn to the skyhook control base value Dsb set in step S31 (step S35). This concludes the inclined road vibration reduction control process.

Figure 16:
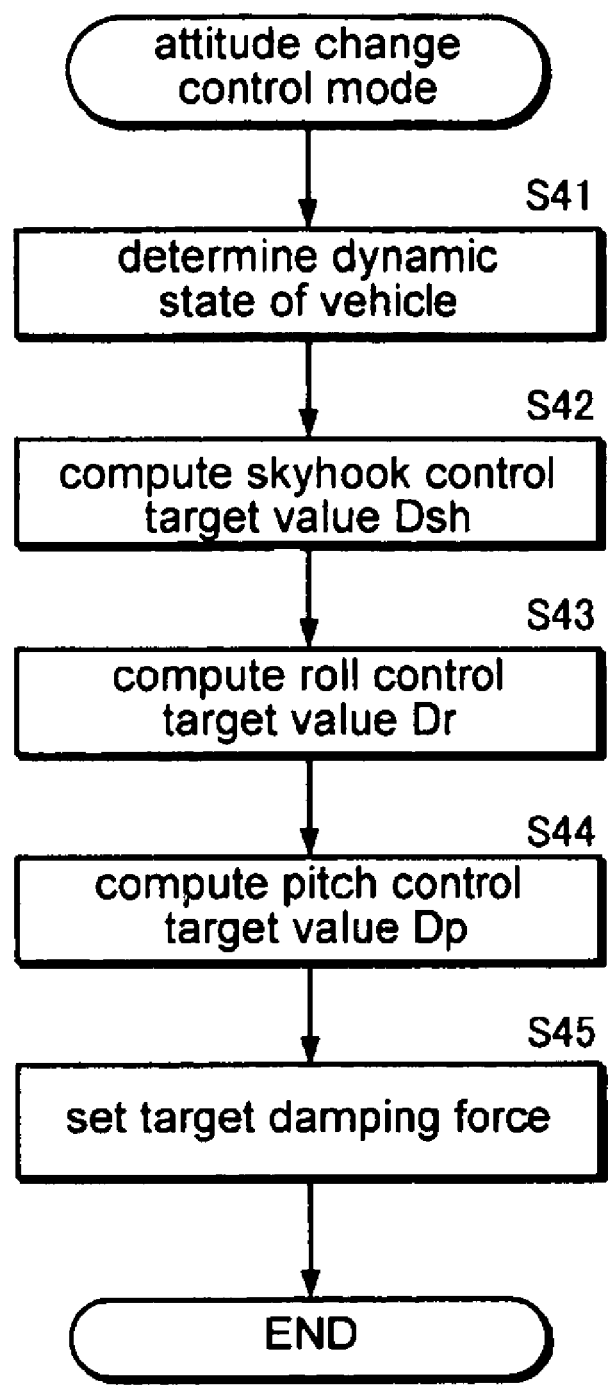
FIG. 16 is a flowchart of the attitude change reduction control process of the third embodiment.

The attitude change reduction control mentioned above is described in the following with reference to FIG. 16. First of all, the skyhook control unit 55 of the damping force setting unit 52 determines a dynamic state (such as a sprung mass speed of each wheel 3) according to the acceleration information of the vehicle V obtained from the lateral G sensor 10, fore-and-aft G sensor 11 and vertical G sensor 13, vehicle speed obtained from the vehicle speed sensor 9 and a steering speed obtained from a steering angle sensor not shown in the drawings (step S41).

The skyhook control unit 55 of the damping force setting unit 52 then computes a skyhook control target value Dsh for each damper 6 according to the dynamic state of the vehicle V determined in step S41 (step S42). Similarly, the roll control unit 57 computes a roll control target value Dr for each damper in step S43, and the pitch control unit 58 computes a pitch control target value Dp for each damper in step S44 in a similar fashion. The damping force setting unit 52 sets the computed skyhook control target value Dsh in step S45, and this concludes the attitude change reduction control process.

The wheel suspension systems are configures such that the natural frequencies of the all the wheel suspension systems are identical to one another when the vehicle is traveling over a horizontal road surface. However, as discussed above, when the vehicle is traveling over a slanted road surface, the wheel load acting on a wheel at a higher elevation is smaller than that acting on a wheel at a lower elevation. (This may also hold true with a slight modification when the vehicle is slanted owing to an uneven loading of the vehicle such as when a heavy object is stored in the trunk of the vehicle.) According to the illustrated embodiment, as shown in FIG. 18, the skyhook gains Gsh are adjusted such that the resonant oscillation amplitude of the wheel at the higher elevation which is associated with a higher natural frequency is reduced so that the oscillation of the sprung mass in a frequency range of 2 to 8 Hz (which is known to be important for the ride quality of the vehicle) can be reduced, and the rider quality when traveling over a slanted road surface can be improved.

As shown in FIG. 19, when the vehicle parts associated with the wheels at higher and lower elevations are given with different natural frequencies owing to the difference in the wheel loads acting on these wheels, the skyhook gains are corrected such that the amplitude of the resonant movement for the wheel at a lower elevation is increased so that the amplitude of the vertical oscillatory movement of the sprung mass in a frequency range of 2 to 8 Hz (which is known to be important for the ride quality of the vehicle) can be reduced, and the ride quality of the vehicle traveling over a slanted road surface can be improved.

By thus computing a prescribed gain according to the change in the natural frequency of the corresponding wheel suspension system owing to the slanting of the road surface, and multiplying this gain to the skyhook control base value Dsb or otherwise correcting the skyhook control base value Dsb according to the magnitude of this gain, the skyhook control is enabled to improve the ride quality of the vehicle when the vehicle is traveling over a slanted road surface.

When there is substantially no slanting in the road surface, the inclined road vibration reduction control is not necessary, and the normal attitude change reduction control is selected. Also when the slanting of the road surface is greater than a threshold level, the difference between the natural frequencies of the vehicle parts associated with the wheels at higher and lower elevations is so great that the inclined road vibration reduction control is ineffective, and the normal attitude change reduction control is selected. When the slanting of the road surface is in a certain small range below this threshold level, the inclined road vibration reduction control is selected as it is effective in controlling the vertical vibrations of the vehicle.

In the foregoing description, it should be noted that it is possible to detect an inclination of a road surface according to the distribution of wheel loads. However, the wheel loads are affected not only by a road inclination but also by other factors such as the turning and other dynamic condition of the vehicle. Therefore, it is generally necessary to detect both wheel loads and a road inclination when performing an appropriate vehicle damping force control or any other vehicle control at all times.

Figure 20:
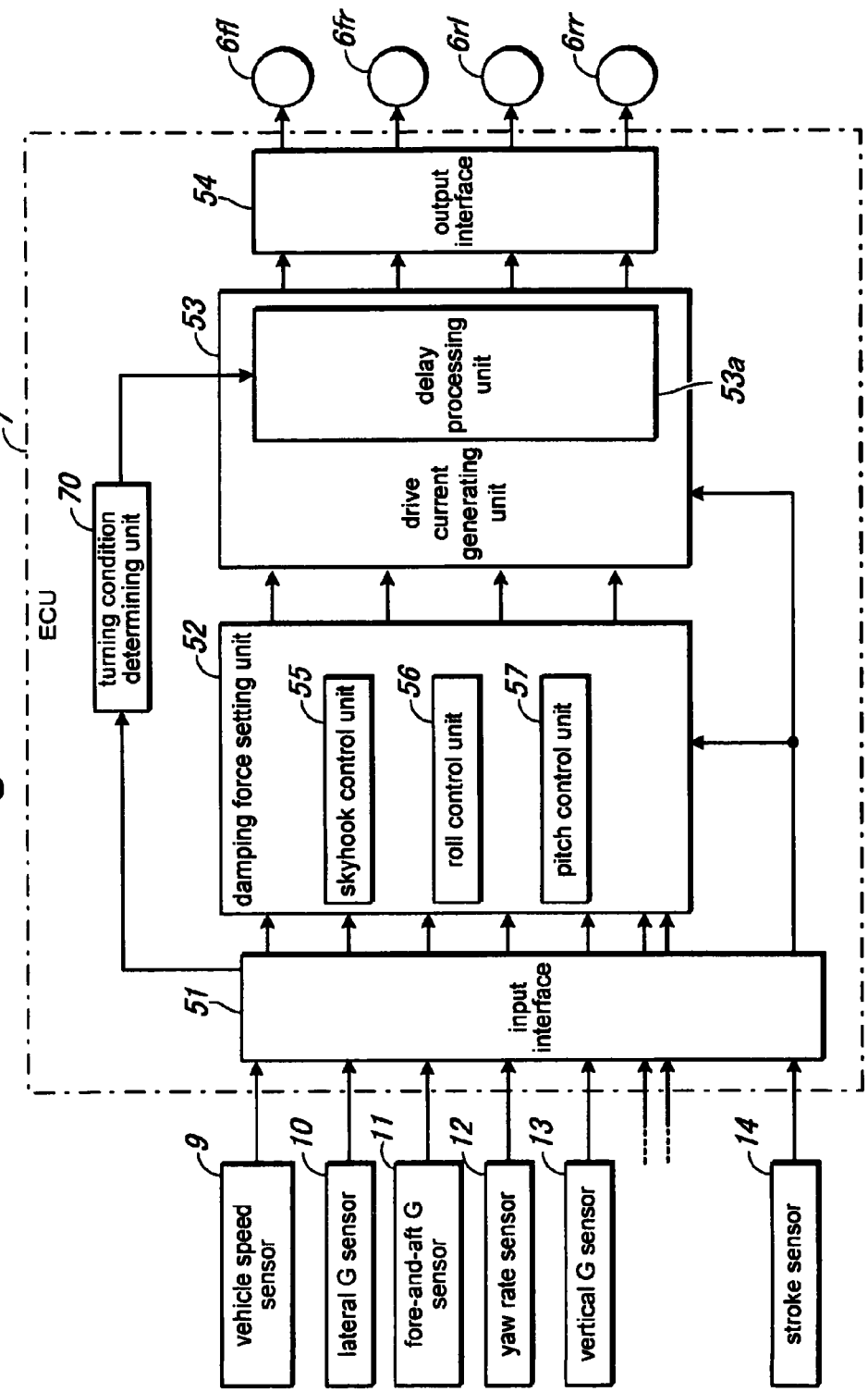
FIG. 20 is a block diagram similar to FIG. 1 showing a fourth embodiment of the present invention.
Figure 21:
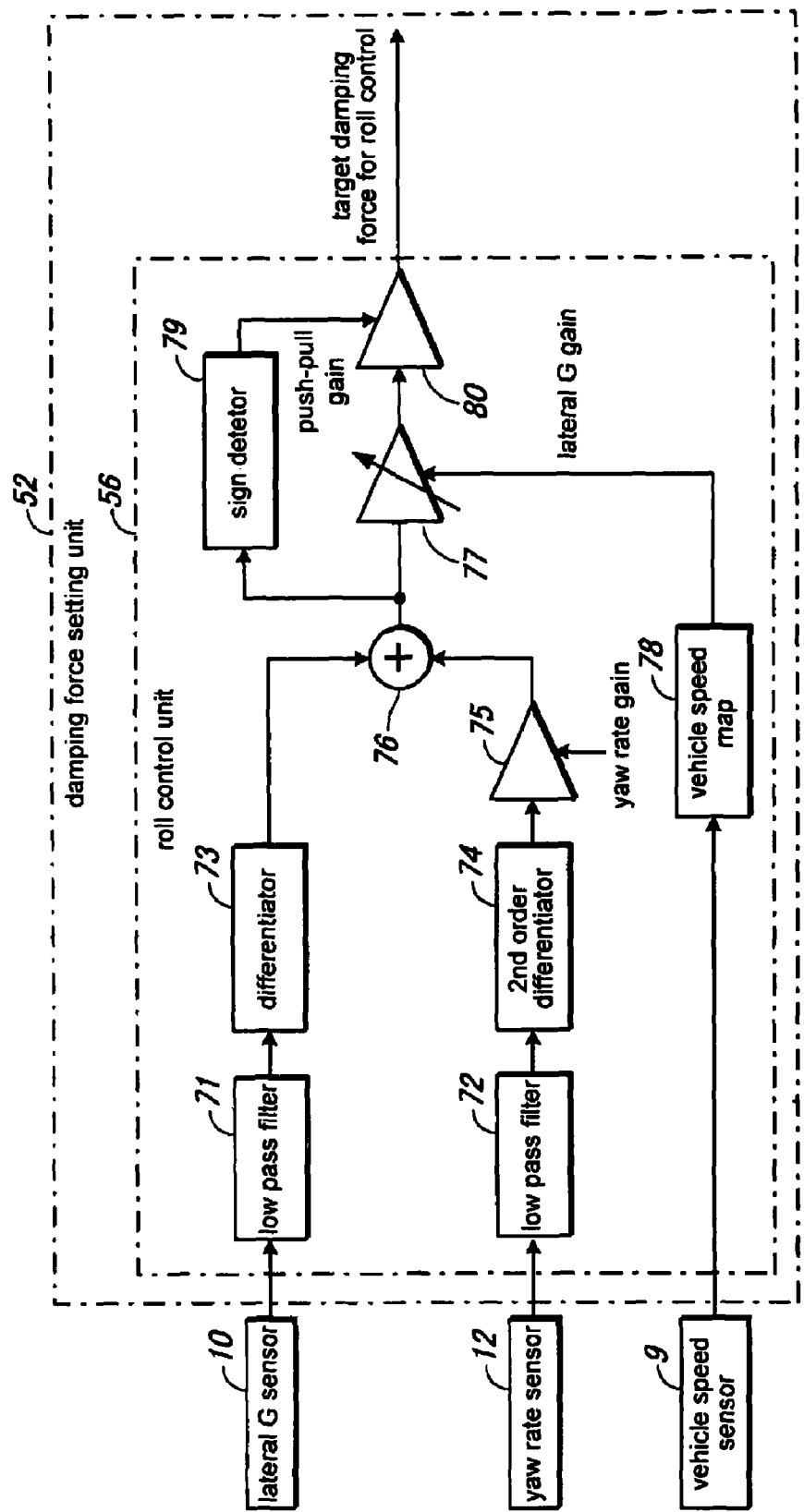
FIG. 21 is a block diagram showing the details of the roll control unit of the fourth embodiment.

FIGS. 20 and 21 show a fourth embodiment of the present invention. The parts corresponding to those of the previous embodiments are denoted with like numerals without repeating the description of such parts. In this embodiment also, the damping force setting unit 52 comprises a skyhook control unit 55, a roll control unit 56 and a pitch control unit 57. The roll control unit 56 and pitch control unit 57 are configured to control the rolling movement of the vehicle such as when the vehicle is making a turn and the pitching movement of the vehicle such as when the vehicle is accelerating or decelerating, and thereby jointly control the attitude of the vehicle. The skyhook control unit 55 controls the vertical movement of the vehicle to improve the ride quality such as when the vehicle rides over road surface irregularities.

As shown in FIG. 21, the roll control unit 56 comprises a pair of low pass filters 71 and 72, a differentiator 73, a second order differentiator 74, a yaw rate gain multiplier 75, an adder 76, a lateral acceleration gain multiplier 77, a vehicle speed map 78, a sign detector 79 and a push-pull gain multiplier 80. These components are used for computing a target damping force for each damper at a prescribed timing.

The low pass filter 71 removes lateral acceleration components, that are produced for causes other than a steering action when the vehicle is traveling, from the lateral acceleration Gy detected by the lateral G sensor 10, and this filtered signal is converted into a differential value dGy/dt of the lateral acceleration by the differentiator 73.

The other low pass filter 72 removes yaw rate components, that are produced for causes other than a steering action when the vehicle is traveling, from the yaw rate $\gamma$ detected by the yaw rate sensor 72, and this filtered signal is converted into a second-order differential value $d^2\gamma/dt^2$ of the yaw rate $\gamma$ by the second-order differentiator 74. The second-order differential value $d^2\gamma/dt^2$ of the yaw rate $\gamma$ is forwarded to the yaw rate gain multiplier 75 which multiplies the distances Lf and Lr (See FIG. 1) from the gravitational center to the front axle and rear axle, respectively, to the second-order differential value $d^2\gamma/dt^2$ to obtain correction values $d^2\gamma/dt^2 \times Lf$ and $d^2\gamma/dt^2 \times Lr$ for the lateral acceleration differential values $(dGy/dt)_F$ and $(dGy/dt)_R$ for the positions of the front wheels 3$fl$ and 3$fr$ and rear wheels 3$rl$ and 3$rr$, respectively, as the vehicle undergoes a yaw movement.

The lateral acceleration differential value $(dGy/dt)_F$ for the front wheels and the correction value $d^2\gamma/dt^2 \times Lf$ for the lateral acceleration differential value for the front wheels are forwarded to the adder 76 to obtain a corrected lateral acceleration differential value $(dGy/dt)_F + d^2\gamma/dt^2 \times Lf$ for the front wheels. Similarly, the lateral acceleration differential value $(dGy/dt)_R$ for the rear wheels and the correction value $d^2\gamma/dt^2 \times Lr$ for the lateral acceleration differential value for the rear wheels are forwarded to the adder 76 to obtain a corrected lateral acceleration differential value $(dGy/dt)_R + d^2\gamma/dt^2 \times Lr$ for the rear wheels.

Figure 22:
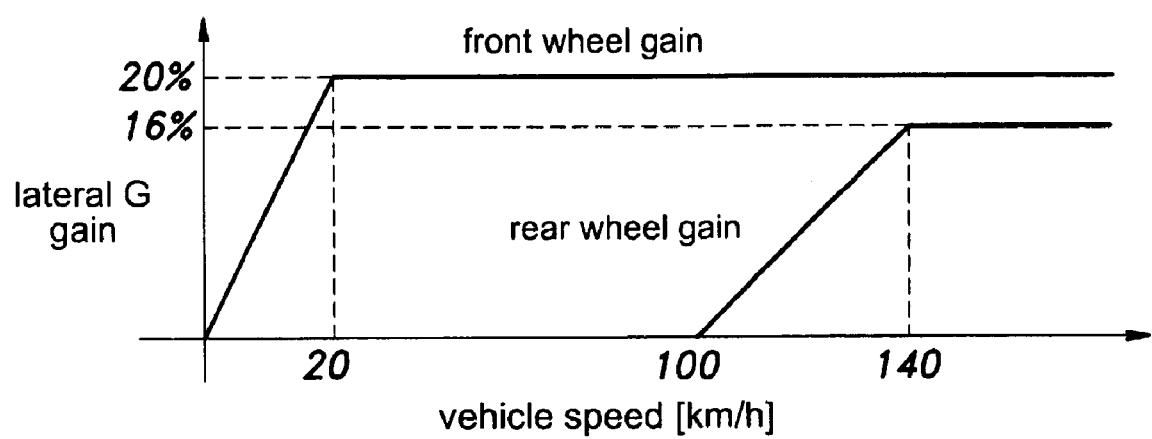
FIG. 22 is a graph showing a map for determining lateral acceleration gains for the front wheel side and rear wheel side depending on the vehicle speed in the fourth embodiment.

Meanwhile, lateral acceleration gains for the front wheel side and rear wheel side are obtained from the vehicle speed v detected by the vehicle speed sensor 9 by using the vehicle speed map 78 which is represented in the graph of FIG. 22, and are multiplied by the corrected lateral acceleration differential values for the front wheels and rear wheels (that were computed by the adder 76) at the lateral acceleration gain multiplier 77. The signs of the lateral accelerations for the front wheel side and rear wheel side are determined by the sign detector 79. A push-pull gain that depends on if the suspension is contracting or extending according to the lateral acceleration acting upon the vehicle body is multiplied to the output of the lateral acceleration gain multiplier 77 at the push-pull gain multiplier 80.

At the same time as the roll control unit 56 computes target damping forces, the skyhook control unit 55 and pitch control unit 57 compute corresponding target damping forces. When a damper in question is extending, the largest of the three corresponding target damping forces is selected as the final target damping force. When a damper in question is contracting, the smallest of the three corresponding target damping forces is selected as the final target damping force.

Once the target damping force is determined by the damping force setting unit 52, the drive current setting unit 53 determines a target electric current according to the target damping force and a stroke speed obtained from the stroke sensor 14 by looking up a target current map shown in FIG. 6. The electric current supplied to the MLV coil 42 of each damper 4 is feedback controlled based on the determined target electric current.

In view of the fact that a yaw movement resulting from a steering action appears first on the side of the front wheels 3$fl$ and 3$fr$ which are steered before the rear wheel which are not steered, the damping force setting unit 52 is configured such that an increase in the damping force occurs earlier on the side of the front wheels 3$fl$ and 3$fr$ than on the side of the rear wheel 3$rl$ and 3$rr$ by increasing the gain for the front wheels 3$fl$ and 3$fr$ earlier than the gain for the rear wheels 3$rl$ and 3$rr$.

The ECU 7 is provided with a turning condition determining unit 70 which determines a turning condition of the vehicle according to the lateral acceleration detected by the lateral G sensor 10. The turning condition determining unit 70 not only detects if the vehicle is turning or not from the lateral acceleration detected by the lateral G sensor 10 but also determines which of the wheels are inside of the curve according to the direction of the lateral acceleration.

The drive current setting unit 53 is incorporated with a delay processing unit 53$a$ which provides a delay in the supply of drive current to the dampers 4 on the inside of the curve. When performing a delay control for the front wheels 3$fl$ and 3$fr$, the drive current setting unit 53 delays the rise in the drive current for the damper 4 corresponding to the front wheel which is inside of the curve as determined by the turning condition determining unit 70, and the timing of providing a damping force for the inner one of the front wheels 3$fl$ and 3$fr$ is delayed with respect to that for the outer front wheel. Similarly, when performing a delay control for the rear wheels 3$rl$ and 3$rr$, the drive current setting unit 53 delays the rise in the drive current for the damper 4 corresponding to the rear wheel which is inside of the curve as determined by the turning condition determining unit 70, and the timing of providing a damping force for the inner one of the rear wheels 3$fl$ and 3$fr$ is delayed with respect to that for the outer rear wheel.

Figure 23:
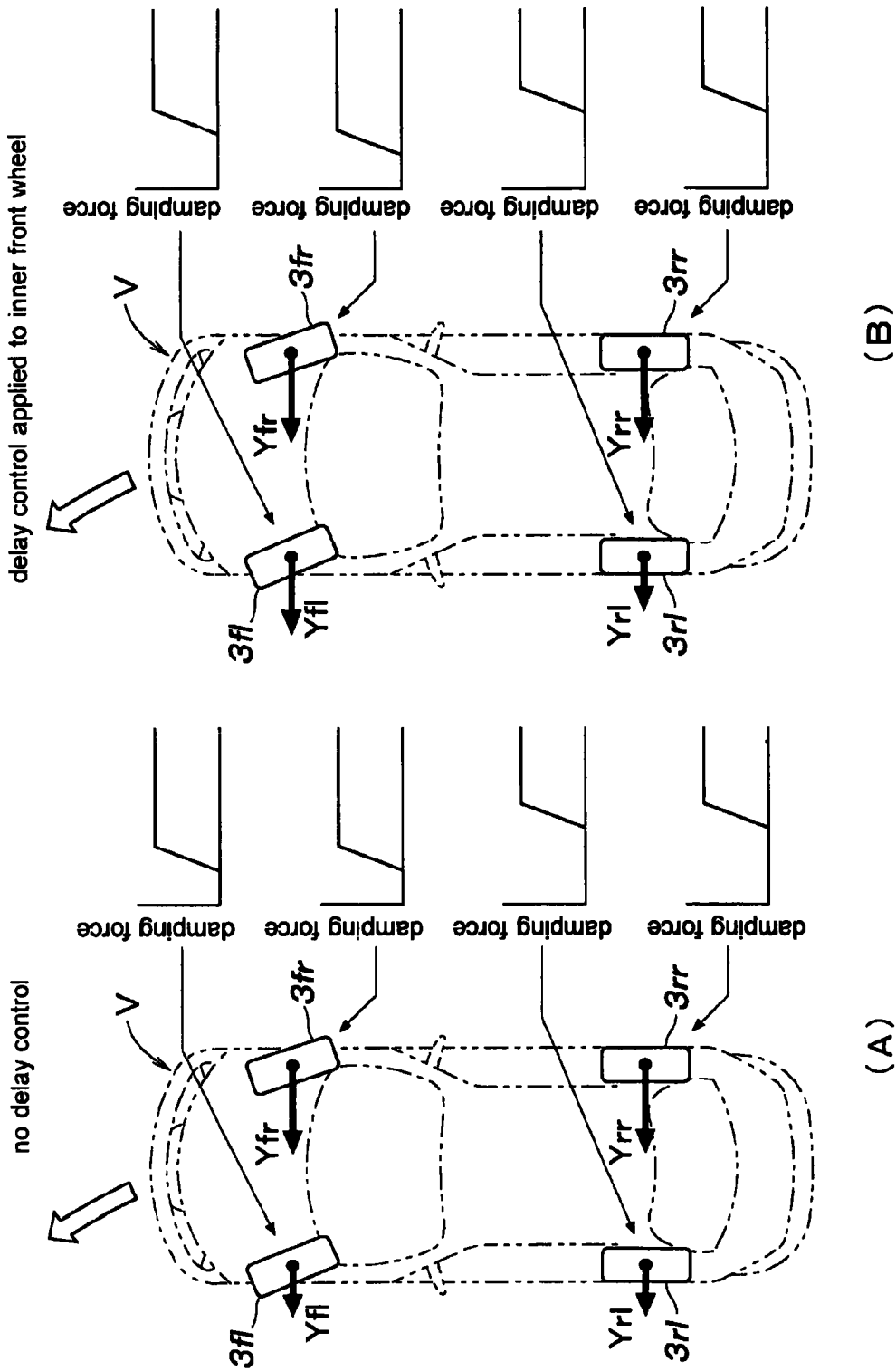
FIG. 23A is a diagram showing the timing of increasing the damping forces for the front and rear wheels with a time delay applied only to the rear wheels.
FIG. 23B is a diagram showing the timing of increasing the damping forces for the front and rear wheels with a time delay applied also to the front inner wheel.
Figure 24:
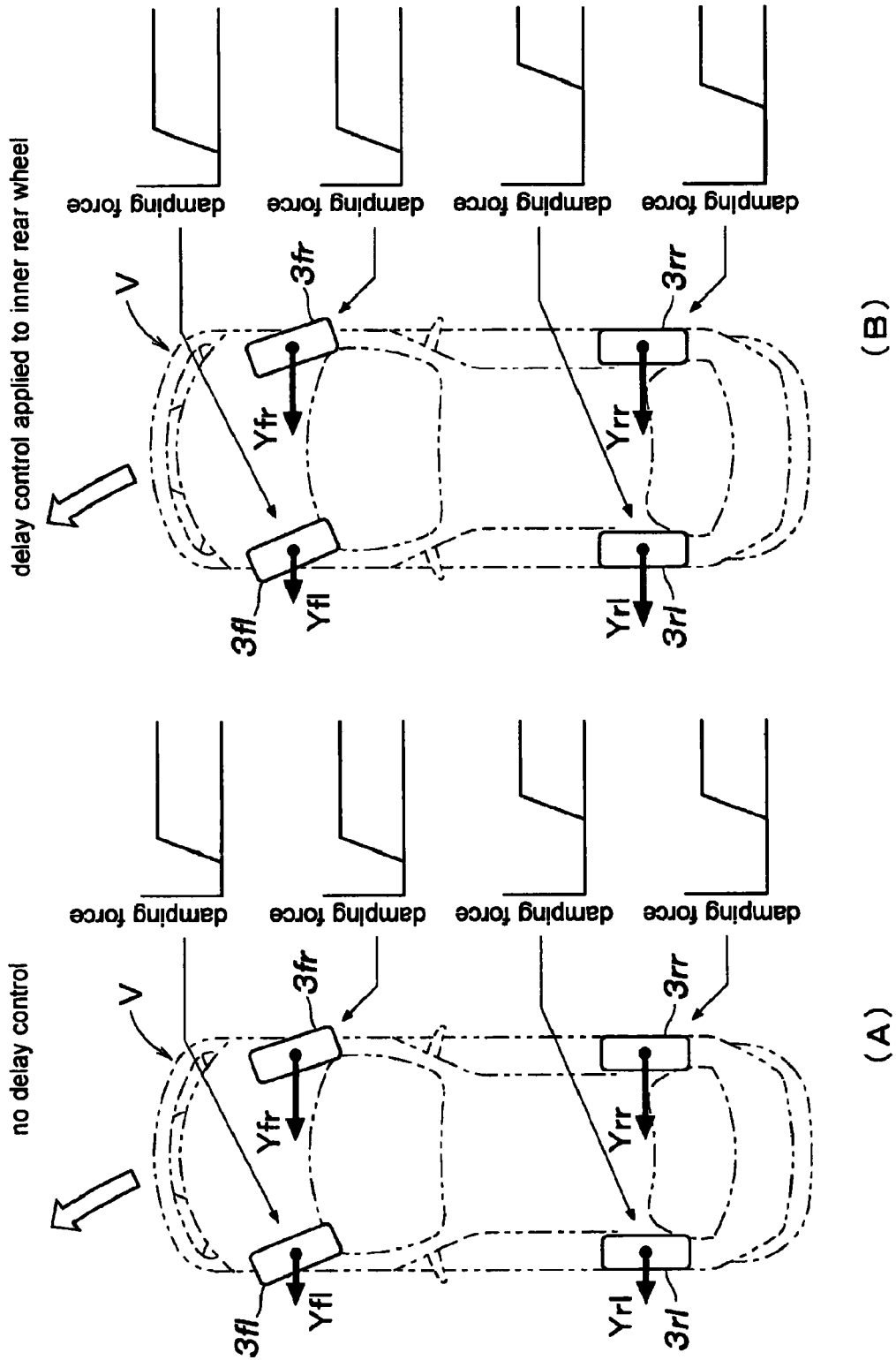
FIG. 24A is a diagram showing the timing of increasing the damping forces for the front and rear wheels with a time delay applied only to the rear wheels.
FIG. 24B is a diagram showing the timing of increasing the damping forces for the front and rear wheels with a time delay applied also to the rear inner wheel.
Figure 25:
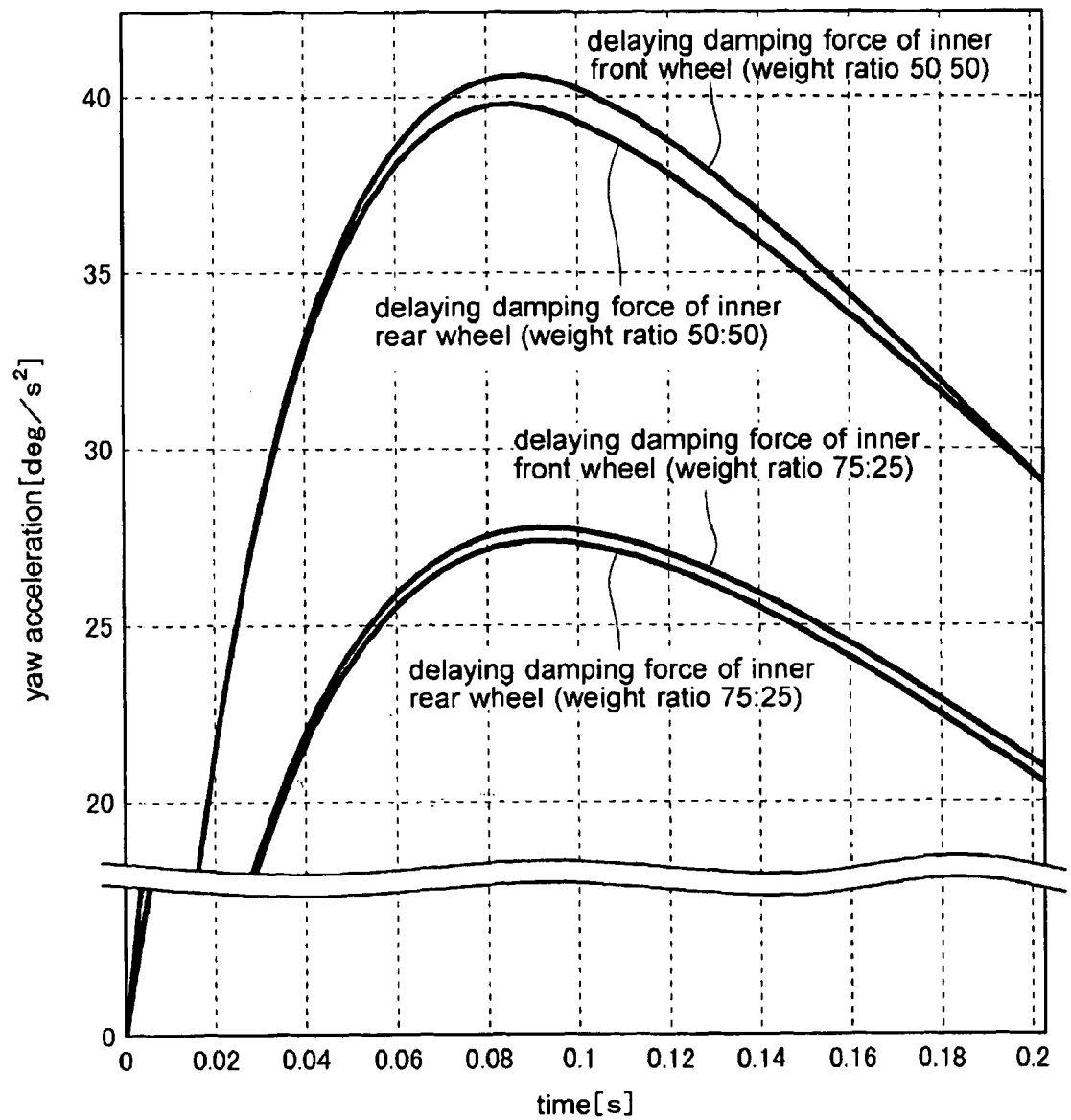
FIG. 25 is a graph showing results of simulations that represent the changes in the yaw acceleration when a delay control is applied to the front wheels and rear wheels, respectively.

FIGS. 23 and 24 illustrate the cornering forces of the vehicle as it makes a turn, and the modes of generating damping forces at such times. FIG. 23 shows the case where the delay control is performed on the front wheels, and FIG. 24 shows the case where the delay control is performed on the rear wheels. In these examples, the vehicle is assumed to be making a left turn. However, it is obvious for a person skilled in the art that the vehicle behaves in a mirror image to this when the vehicle makes a right turn. It should be also noted that the delay control process may be performed only on the front wheels or on the rear wheels, or on both the front and rear wheels depending on the desired property of the vehicle handling. FIG. 25 is a graph showing results of simulations that represent the changes in the yaw acceleration when a delay control is applied to the front wheels and rear wheels, respectively.

As the vehicle V starts turning, the front wheels which are steered experience a yaw movement earlier than the rear wheels. Accordingly, in the illustrated embodiment, the damping force for the front wheels is increased before the damping force for the rear wheels is increased as illustrated in FIG. 23A.

When the timing of increasing the damping force for the inner front wheel 3$fl$ is delayed as illustrated in FIG. 23B, the reduction in the contact load of the inner front wheel 3$fl$ is mitigated, and the reduction in the cornering force of the front wheels is minimized. Therefore, the cornering force of the front wheels becomes greater than that of the rear wheels so that a relatively high yaw acceleration is produced as shown in FIG. 25, and the heading response (steer feel) of the vehicle can be improved.

When the timing of increasing the damping force for the inner rear wheel is delayed as illustrated in FIG. 24B, the reduction in the contact load of the inner rear wheel is restricted, and the reduction in the cornering force of the rear wheels is minimized. Therefore, the cornering force of the rear wheels becomes greater than that of the front wheels so that a relatively low yaw acceleration is produced as shown in FIG. 25, and the lateral acceleration response of the vehicle can be improved while the heading response of the vehicle lowered. This contributes to the improvement in the driving stability of the vehicle.

The driving stability of the vehicle can be thus improved by increasing the gain for the front wheels before the gain for the rear wheels is creased so that the damping force for the front wheels rises earlier than that for the rear wheels when performing a roll movement control owing to the fact that the front wheels that are steered experience a yaw movement before the rear wheels do. By performing a delay control to the front inner wheel and/or the rear inner wheel in addition to controlling the timing for generating of a damping force between the front wheel and rear wheels, the dynamic properties such as steer feel and driving stability can be adjusted at will.

FIG. 25 shows examples of different vehicle body weight ratios, and it can be seen that the vehicle body weight ratio does not substantially affect the properties in the changes of the yaw angle acceleration when a delayed control is performed on the inner front and inner rear wheels.

Figure 26:
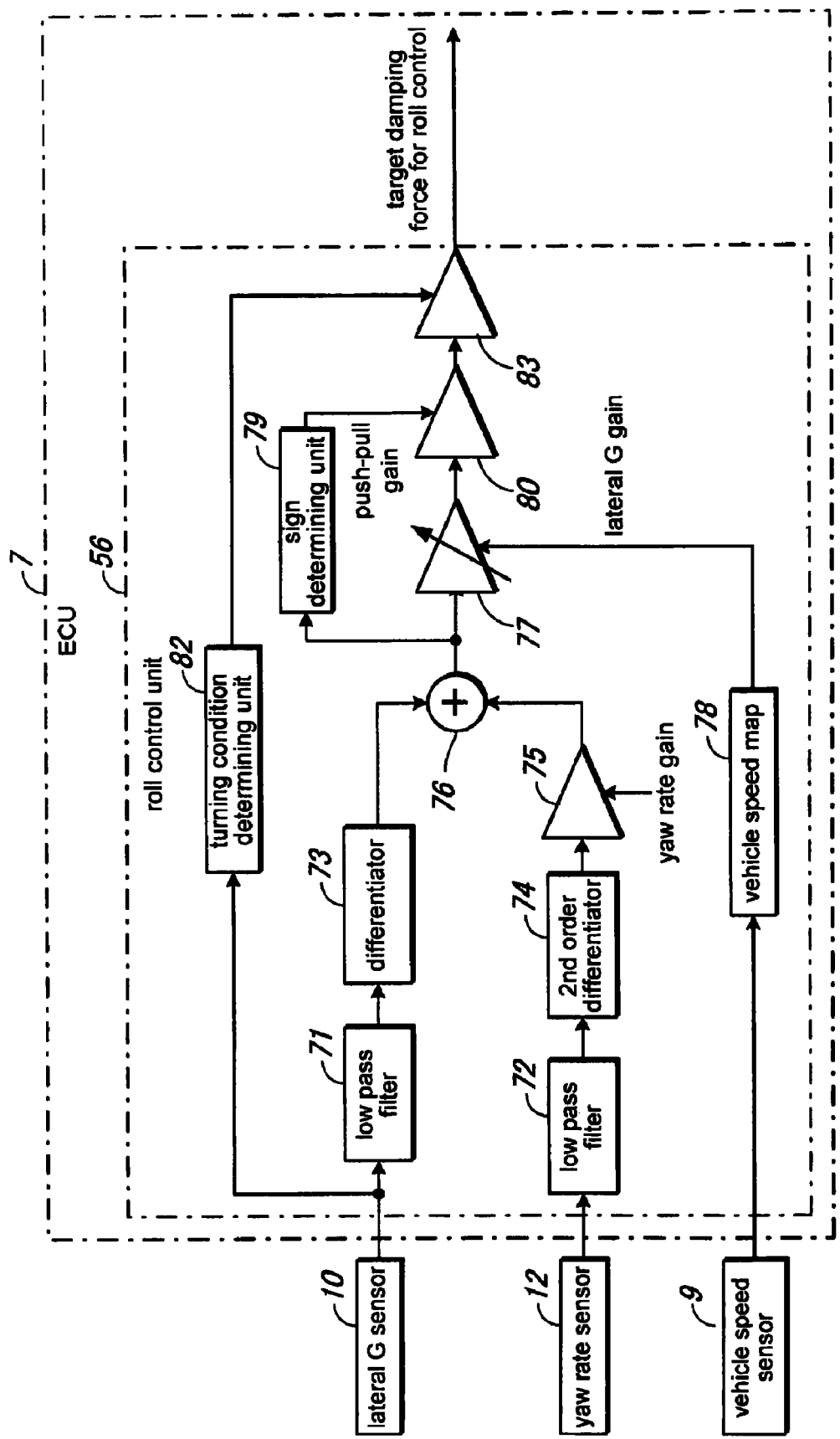
FIG. 26 is a block diagram showing the details of the roll control unit of a fifth embodiment.

FIG. 26 is a block diagram of a fifth embodiment of the present invention which differs from the previous embodiment in that the delay process is executed within the roll control unit 56. In this embodiment, the turning condition determining unit 70 is provided in a different part of the system (in the roll control unit 56), and the drive current setting unit 53 is not provided with the delay processing unit 53a. In this embodiment, the roll control unit 56 is provided with a turning condition determining unit 82 for determining the turning condition of the vehicle. The turning condition determining unit 82 not only determines if the vehicle is turning or not from the lateral acceleration but also forwards the gains for the inner wheels and outer wheels to a corresponding delay processing multiplier 83, which is incorporated in an output end of the roll control unit 56, depending on the direction (or sign) of the determined turning movement The gains for the inner and outer wheels are controlled such that the timing for generating the damping force for the inner front wheel is delayed with respect to the outer front wheel. The delay control is performed in such a manner that the delay processing multiplier 83 multiplies the gains for the inner and outer wheels to the target damping forces for the front and rear wheels which are forwarded from the push-pull gain multiplier 80.

In the following is explained why the cornering force is increased, and steer feel and driving stability can be improved by delaying the generation of a damping force for the inner wheel.

Figure 27:
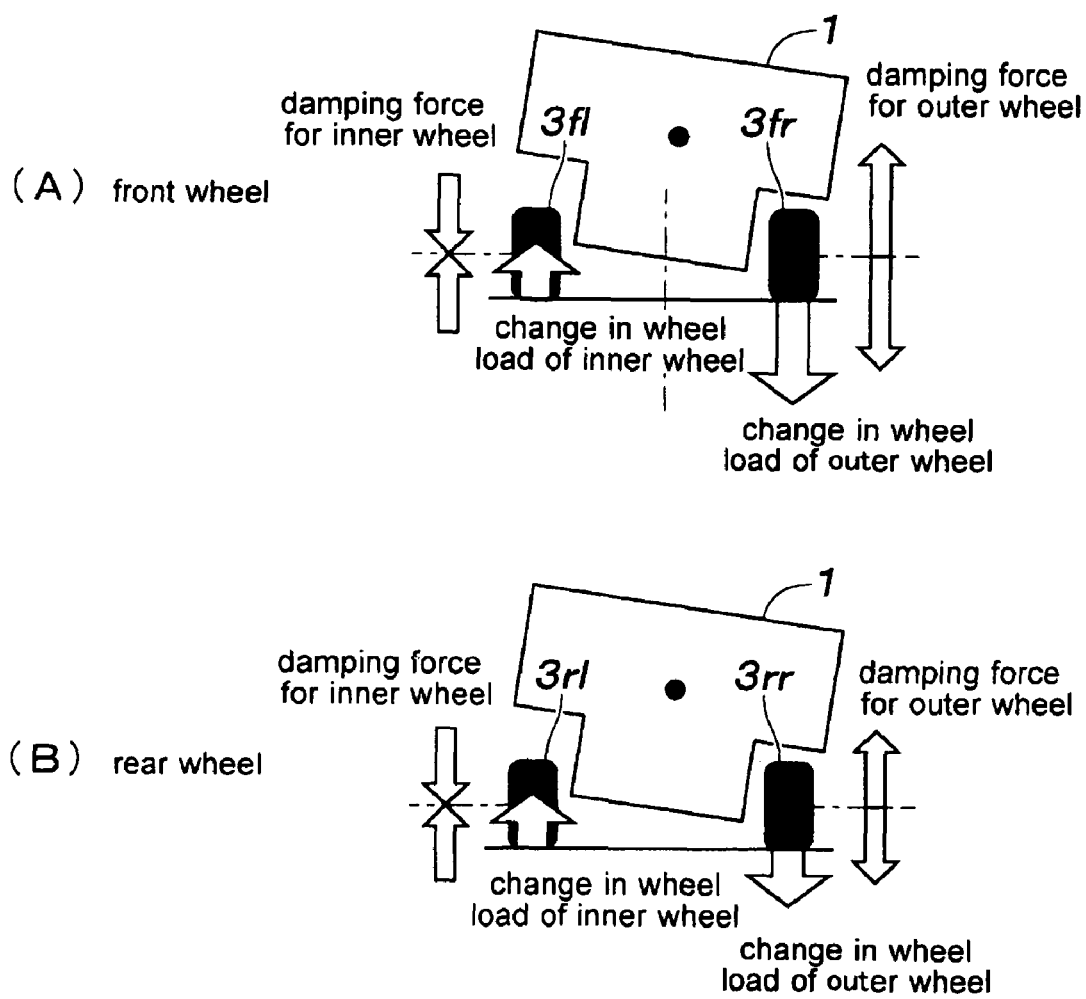
FIG. 27A is a diagram showing the changes in the wheel loads of the inner and outer front wheels when the delay control is applied to the inner front wheel.
FIG. 27B is a diagram showing the changes in the wheel loads of the inner and outer rear wheels when the delay control is applied to the inner front wheel.

FIGS. 27A and 27B are schematic views showing the changes in the wheel loads of the inner and outer, front and rear wheels when the delay control is applied to the inner front wheel. The vehicle turns to the left in FIG. 27, and a right turn of the vehicle gives rises to a mirror image of this drawing.

When the vehicle starts the turn, and the timing of increasing the damping force for the inner front wheel 3fl is delayed as illustrated in FIG. 23B, the damping force at the beginning of the turn for the inner front wheel 3fl is small and that for the outer front wheel 3fr is large as illustrated in FIG. 27A. Such a distribution of the damping force causes the transient change in the wheel load for the inner wheel 3fl to be smaller than that for the outer wheel 3fr.

As the damping force for the outer wheel 3fr is increased, a jack-up effect occurs to the vehicle body, and the resulting inertia force of the vehicle body 1 causes the sum of the wheel loads of the inner and outer wheels to be greater than the static value thereof so that the wheel load change of the outer wheel (which is same in sense to the inertia force) is increased by the contribution of the inertia force while the wheel load change of the inner wheel (which is opposite in sense to the inertia force) is decreased by the contribution of the inertia force If the damping forces for the inner and outer rear wheels are identical to each other immediately after the start of the turn as shown in FIG. 27B, the transient change in the wheel load for the inner rear wheel is the same as that for the outer rear wheel.

Figure 28:
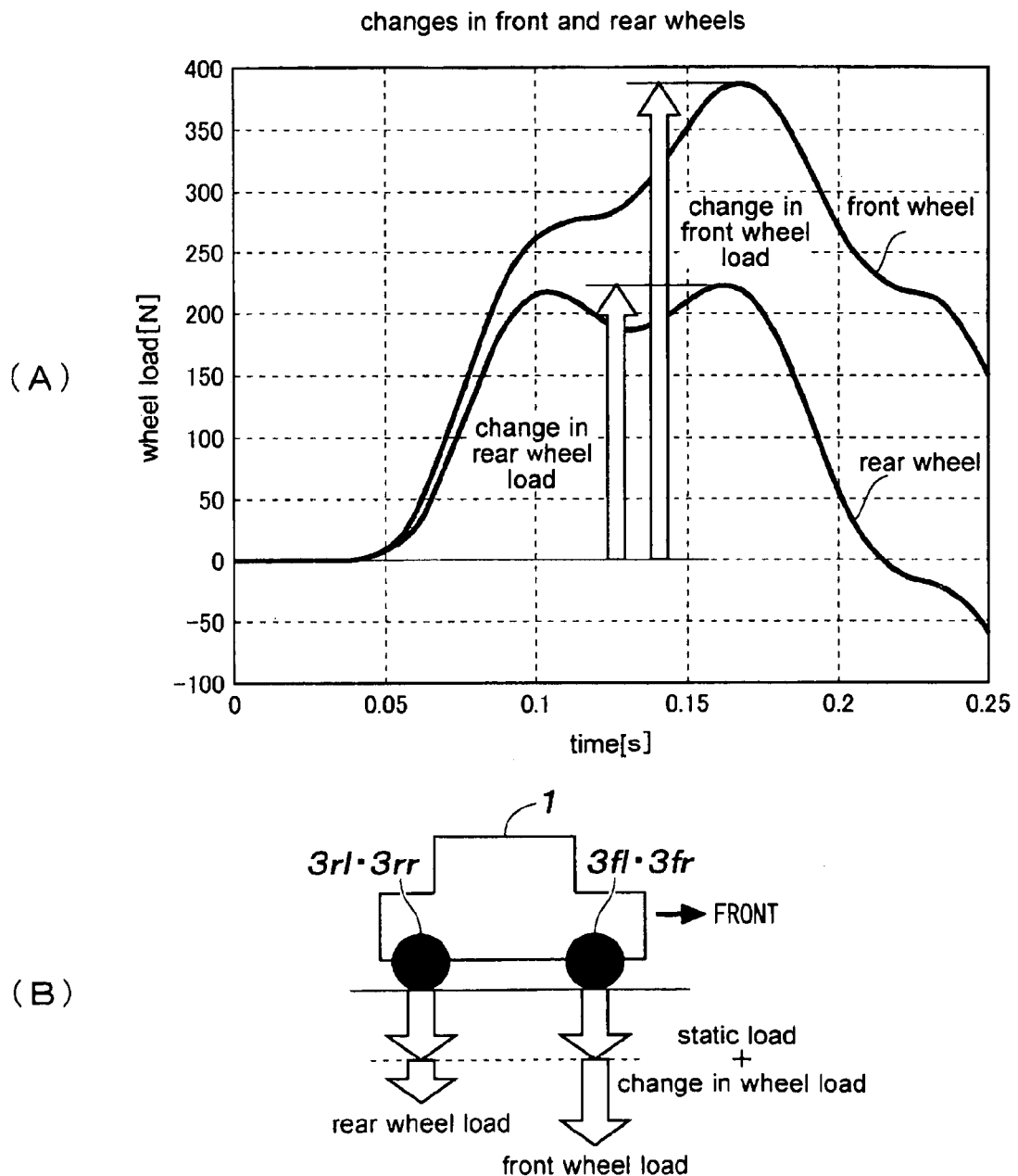
FIG. 28A is a graph showing the change in the wheel loads of the front and rear wheels immediately after a steering action.
FIG. 28B is a diagram showing the mode of change in the wheel loads of the front and rear wheels.

FIG. 28A is a graph showing the change in the wheel loads of the front and rear wheels immediately after a steering action, and FIG. 28B is a diagram showing the mode of change in the wheel loads of the front and rear wheels.

During the transient period immediately following a steering action by a vehicle operator, the wheel loads of both the front and rear wheels increase, but the increase of the wheel load in the front wheels is greater than that of the rear wheels. When the transient change in the wheel load of the inner rear wheel is identical to that of the outer rear wheel as exemplified in the example illustrated in FIG. 27B, these two effects cancel each other, and there is no overall change in the wheel load for the rear wheels. At any event, it is important that the wheel loads of the front wheels increase more than those of the rear wheels, and this increases the cornering force of the front wheels.

The yaw acceleration is given by the following equation.

$$I(d\gamma/dt)=Lf(Yfl+Yfr)-Lr(Yrl+Yrr) \qquad (1)$$

where I is yaw inertia moment, γ is yaw rate, Lf and Lr are distances of the front and rear axles from the gravitational center, and Yfl, Yfr, Yrl and Yrr are cornering forces of the corresponding wheels. As can be appreciated from this equation, as the wheel loads of the front wheels increase and the cornering forces of the front wheels increase as a result, the yaw acceleration (dγ/dt or time differential of yaw rate) increases.

By thus delaying the generation of the damping force for the inner front wheel immediately after the vehicle makes a turn, the wheel load on the front wheel side is transiently increased, and this causes a sharp increase in the yaw acceleration. Therefore, the heading performance (steer wheel) of the vehicle which the vehicle operator perceives immediately after a steering action improves.

Meanwhile, when the vehicle makes a turn, delaying the generation of the damping force for the inner rear wheel 3rl as illustrated in FIG. 24B causes the transient change in the wheel load of the inner rear wheel 3rl immediately after the beginning of the turning movement to be greater than that of the outer rear wheel 3rr, and this increases the overall wheel load of the rear wheels. As a result, the overall cornering force (Yrl+Yrr) of the rear wheels increases in Equation (1), and the yaw acceleration (dγ/dt) is controlled while the rise in the lateral acceleration is speeded up. This means that the vehicle is enabled to make a turn in a stable manner.

Figure 29:
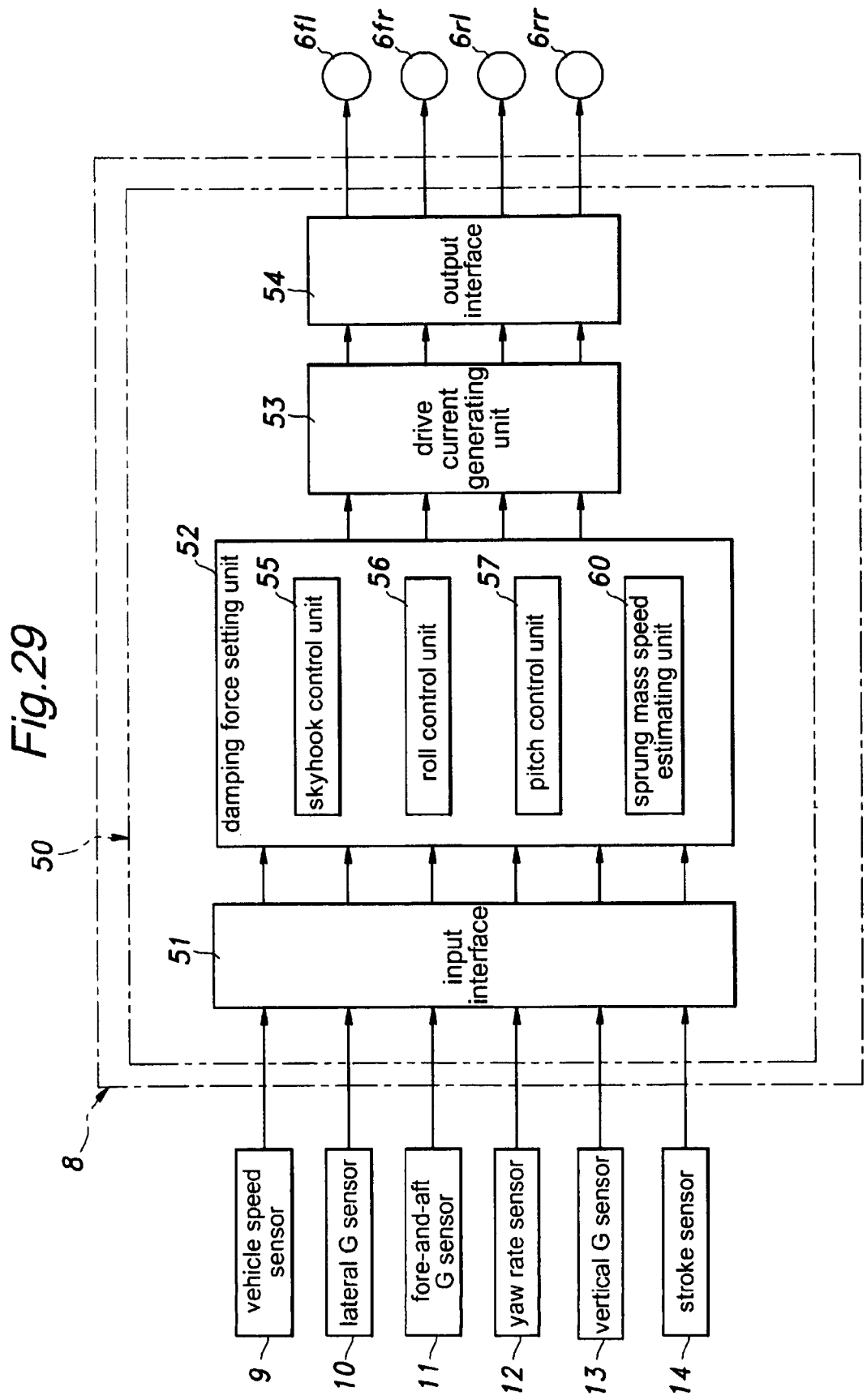
FIG. 29 is a block diagram similar to FIG. 1 showing a sixth embodiment of the present invention.

FIG. 29 shows a sixth embodiment of the present invention in which the damping force setting unit 52 is similar to that of the first embodiment, but additionally includes a sprung mass speed estimating unit 60 which estimates a sprung mass speed associated with each wheel.

Figure 30:
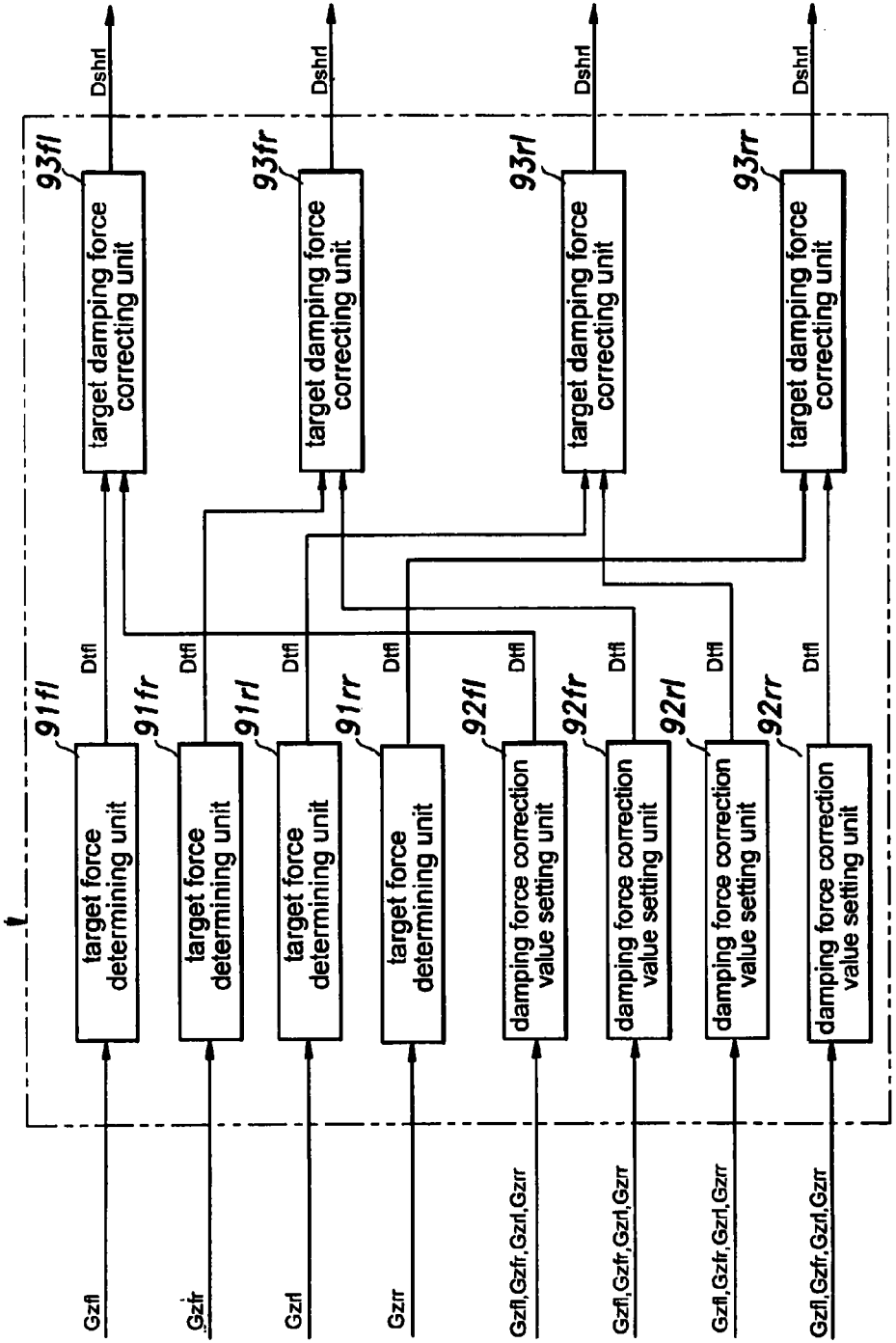
FIG. 30 is a block diagram showing the details of the skyhook control unit of the fifth embodiment.

FIG. 30 is a block diagram representing the structure of the skyhook control unit 55 in a simplified manner. The skyhook control unit 55 comprises, for each wheel 3fl-3rr, a target damping force setting unit 91fl-91rr, a damping force correction value setting unit 92fl-92rr and a target damping force correcting unit 93fl-93rr. Each target damping force setting unit 91 sets a corresponding target damping force according to a vertical acceleration Gz detected by the vertical G sensor 13 provided adjacent to the corresponding wheel by using a single wheel oscillation model that takes into account the operating properties of the wheel suspension system. The damping force correction value setting unit 92 sets a corresponding damping force correction value Dc by taking into account a vertical acceleration Gz or sprung mass speed associated with at least one of the remaining or other wheels so as to appropriately distribute the damping force among the different dampers as will be described in greater detail in the following. The target damping force correcting unit 93 corrects the corresponding target damping force Dt according to the corresponding damping force correction value.

The control process executed by the damping force control unit 50 is described in the following with reference to FIG. 31.

Figure 31:
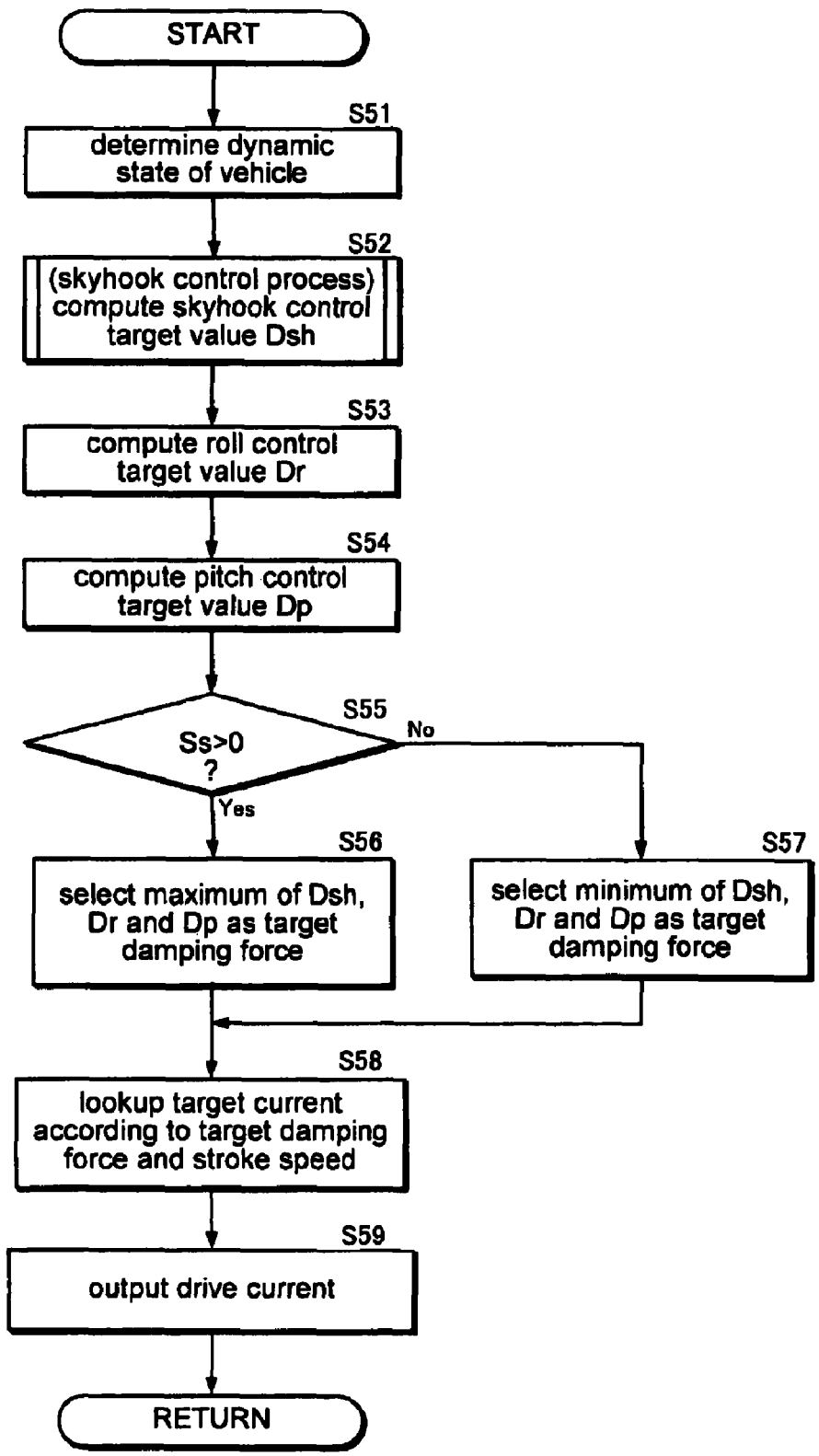
FIG. 31 is a flowchart of the damper control process of the fifth embodiment.

When the vehicle is traveling, the damping force control unit 50 performs a damping control represented by the flowchart of FIG. 31 for each wheel at a prescribed processing interval such as 10 msec. First of all, the dynamic state of the vehicle V is determined according to the acceleration information of the vehicle obtained by the lateral G sensor 10, fore-and-aft G sensor 11 and vertical G sensors 14, the vehicle speed obtained by the vehicle speed sensor 9 and a steering speed obtained by the steering angle sensor (not shown in the drawing) in step S51. From the dynamic state of the vehicle, a skyhook control target value Dsh for each damper 6 is computed in step S52, a roll control target value Dr for each damper 6 is computed in step S53, and a pitch control target value Dp is computed for each damper 6 is computed in step S54.

The damping force control unit 50 then determines if the stroke speed Ss of each damper 6 is positive in sign in step S55. If the determination result is Yes or the damper is extending, the greater of the three control target values Dsh, Dr and Dp is set as the target damping force Dtgt in step S56. Conversely, if the determination result is No or the damper is contractinq, the smallest of the three control target values Dsh, Dr and Dp is set as the target damping force Dtgt in step S57.

Once the target damping force Dtgt is determined in step S56 or S57, the damping force control unit 50 looks up a target current Itgt corresponding to the target damping force Dtgt from a target current map as presented in the graph of FIG. 6 in step S58. In step S59, the damping force control unit 50 then supplies a drive current to the MLV coil 42 of each damper 6 according to the target current It determined in step S58.

The skyhook control process is now described in the following with reference to FIG. 32. The skyhook control unit 55 performs a similar skyhook control process on each of the dampers 6 for the different wheels 3, but only the control process for the left front wheel 3fl is described in the following to simplify the description and avoid redundancy.

Figure 32:
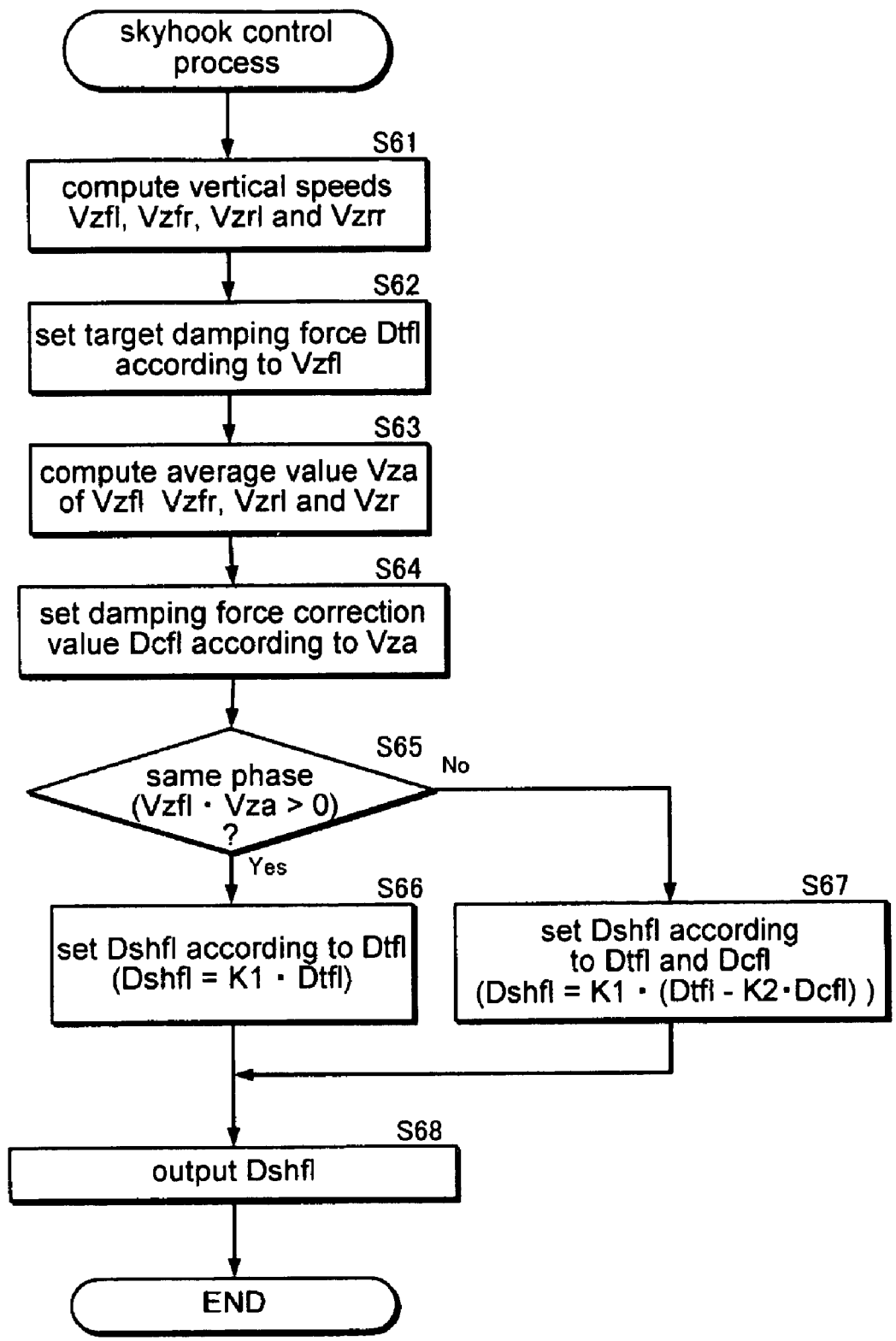
FIG. 32 is a flowchart of a first example of the skyhook control process of the fifth embodiment.

FIG. 32 is a flowchart of a first example of the skyhook control process. The skyhook control unit 55 computes the vertical speeds Vzfl, Vzfr, Vzrl and Vzrr (sprung mass speeds) according to the integrated values of the vertical accelerations Gzfl, Gzfr, Gzrl and Gzrr of the damper bases 1a of the corresponding wheels 3 in step S61. The target damping force setting unit 91fl then sets a target damping force Dtfl according to the vertical speed Vzfl of the damper base 1afl by looking up a prescribed map in step S62. The damping force correction value setting unit 92fl computes an average Vza of the vertical speeds Vzfr, Vzrl and Vzrr of the remaining damper bases 1a in step S63, and a damping force correction value Dcfl is determined from the average value Vza by looking up a prescribed map in step S64.

The target damping force correcting unit 63fl then determines if the input to the left front damper base 1afl is in the same phase as the input to the remaining damper bases 1afr, 1arl and 1arr or if the vertical speed Vzfl is the same in sign as the average value Vza according to the following formula in step S65.

$$Vzfl \times Vza > 0 \qquad (2)$$

If the determination result is Yes in step S65 or the input to the left front damper base 1afl is in the same phase as that to the remaining damper bases, the target damping force correcting unit 63fl computes a skyhook control target value Dshfl from the target damping force Dtfl according to the following formula in step S66.

$$Dshfl = K1 \times Dtfl \qquad (3)$$

where K1 is a coefficient.

If the determination result is No in step S65 or the input to the left front damper base 1afl is in the opposite phase to that to the remaining damper bases, the target damping force correcting unit 63fl computes a skyhook control target value Dshfl from the target damping force Dtfl and damping force correcting value Dcfl according to the following formula in step S67.

$$Dshfl = K1 \times (Dtfl - K2 \times Dcfl) \qquad (4)$$

where K2 is a coefficient. The skyhook control target value Dshfl is forwarded to the damping force setting unit 52 in step S68, and this concludes the skyhook control process.

In this example, the damping force correction value for the left front damper 6fl was determined according to the average value of the vertical speeds of the damper bases associated with the dampers which are longitudinally, laterally and diagonally adjacent to the left front damper 6fl. When the input to the three damper bases 1a is opposite in phase to that to the damper base 1fl which is to be controlled, it can be interpreted as the attitude of the vehicle V experiencing a significant change. Therefore, in such a case, the skyhook control target value Dshfl is selected so as to have an absolute value greater than that of the target damping force (more conventional target damping force) Dtcfl by subtracting the damping force correcting value Dcfl from the target damping force Dtcfl. Therefore, the change in the attitude of the vehicle can be controlled in an effective manner.

When the input to the three damper bases 1a is in the same phase as that to the damper base 1fl which is to be controlled, it can be assumed that a same phase input to the damper in question will control the change in the attitude of the vehicle. Therefore, in such a case, the skyhook control target value Dshfl for the damper 6fl is determined without being affected by the vertical speeds of the remaining three damper bases 1a.

Figure 33:
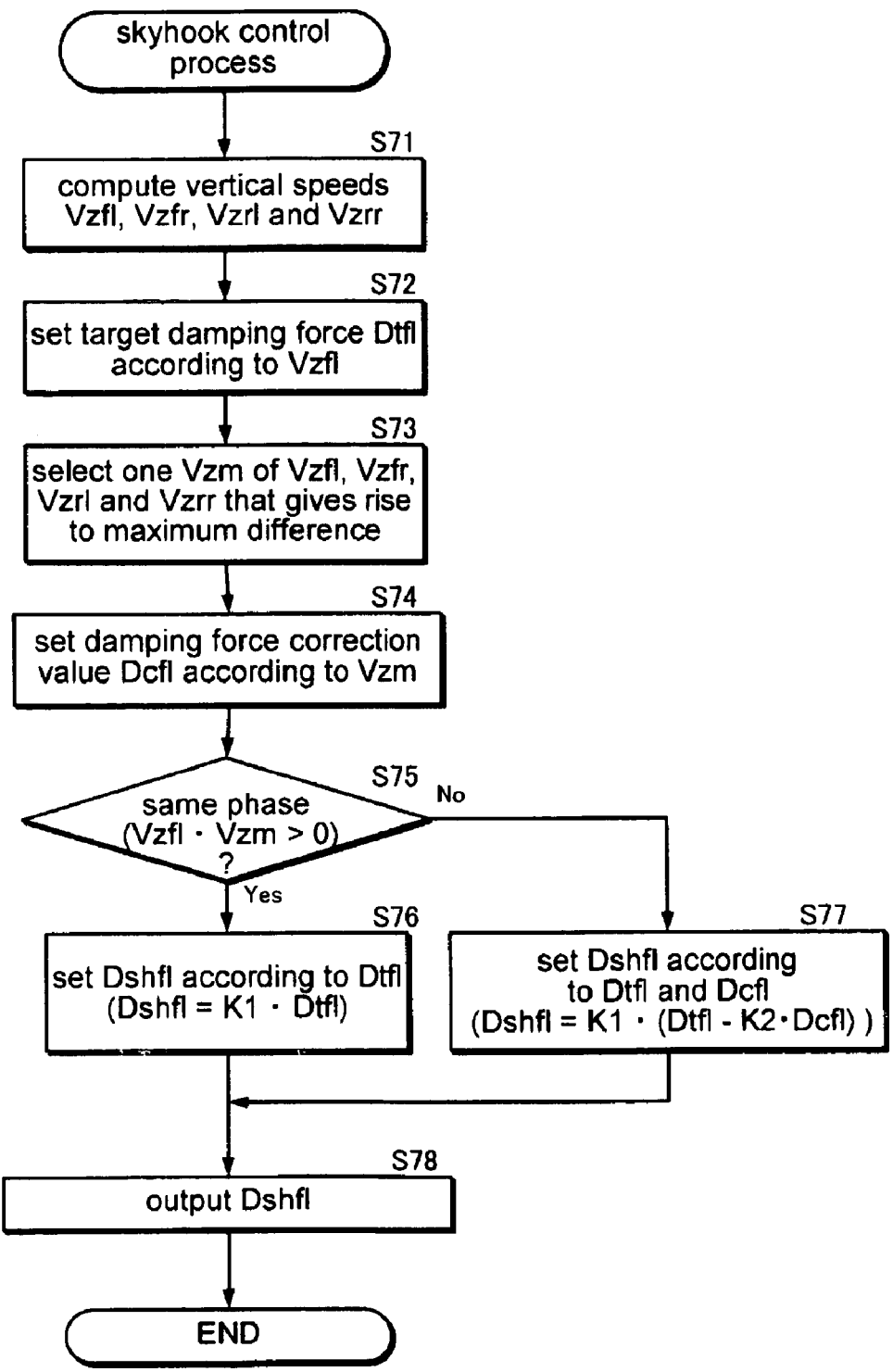
FIG. 33 is a flowchart of a second example of the skyhook control process of the fifth embodiment.

FIG. 33 is a flowchart of a second example of the skyhook control process. Parts of the description of this example common to those of the first example are omitted in the following description to avoid redundancy. The skyhook control unit 55 computes the vertical speeds Vzfl, Vzfr, Vzrl and Vzrr in a similar fashion in step S71. The target damping force setting unit 91fl then sets a target damping force Dtfl according to the vertical speed Vzfl of the damper base 1afl by looking up a prescribed map in step S72. The damping force correction value setting unit 92fl selects one of the vertical speeds of the front right, rear left and rear right damper bases 1a whose vertical speed has the greatest difference from the vertical distance Vzfl as the maximum value Vzm in step S73. A damping force correction value Dcfl is determined from the maximum value Vzm by looking up a prescribed map in step S74.

The target damping force correcting unit 63fl then determines if the input to the left front damper base 1afl is in the same phase as the input to the damper base associated with the maximum value Vzm of the vertical speeds or if the vertical speed Vzfl is the same in sign as the maximum value Vzm according to the following formula in step S75.

$$Vzfl \times Vzm > 0 \qquad (5)$$

If the determination result is Yes in step S75 or the input to the left front damper base 1afl is in the same phase as that of the damper base associated with the maximum value Vzm, the target damping force correcting unit 63fl computes a skyhook control target value Dshfl from the target damping force Dtfl according to the following formula in step S76.

$$Dshfl = K1 \times Dtfl \qquad (6)$$

where K1 is a coefficient.

If the determination result is No in step S75 or the input to the left front damper base 1afl is in the opposite phase to the damper base associated with the maximum value Vzm, the target damping force correcting unit 63*fl* computes a skyhook control target value Dshfl from the target damping force Dtfl and damping force correcting value Dcfl according to the following formula in step S77.

$$Dshfl = K1 \times (Dtfl - K2 \times Dcfl) \tag{7}$$

where K2 is a coefficient. The skyhook control target value Dshfl is forwarded to the damping force setting unit 52 in step S78, and this concludes the skyhook control process.

In this example, the damping force correction value for the left front damper 6*fl* is determined from one (the maximum value Vzm) of the vertical speeds of the front right, rear left and rear right damper bases 1*a* whose vertical speed has the greatest difference from the vertical speed Vzfl associated with the wheel 3*fl* which is being controlled.

When the input to the damper base associated with the maximum value Vzm is opposite in phase to that to the damper base 1*fl* which is to be controlled, it can be interpreted as the attitude of the vehicle V experiencing a significant change. Therefore, in such a case, the skyhook control target value Dshfl is selected so as to have an absolute value greater than that of the target damping force (more conventional target damping force) Dtcfl by subtracting the damping force correcting value Dcfl based on the vertical speed which is most different from the vertical speed of the front left damper base 1*a* from the target damping force Dtcfl. Therefore, the change in the attitude of the vehicle can be controlled in an effective manner.

When the input to the damper base associated with the maximum value Vzm is in the same phase to that to the damper base 1*fl* which is to be controlled, the skyhook control target value Dshfl for the damper 6*fl* is determined without being affected by the vertical speeds of the remaining three damper bases 1*a*. Also, this is affected without unduly increasing the damping force of the front left damper so that the attitude change of the vehicle can be favorably controlled.

Figure 34:
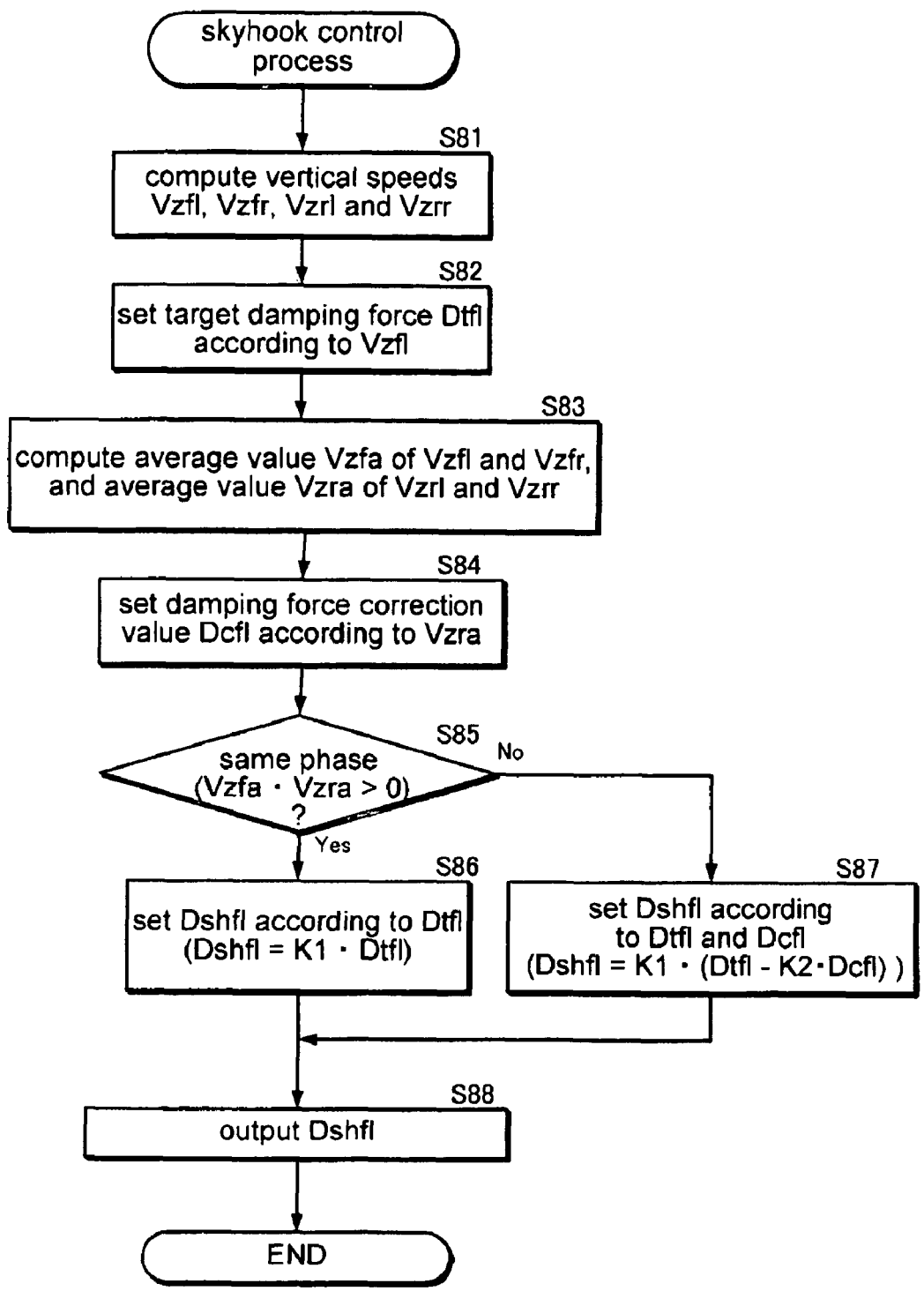
FIG. 34 is a flowchart of a third example of the skyhook control process of the fifth embodiment.

FIG. 34 is a flowchart of a third example of the skyhook control process. The skyhook control unit 55 computes the vertical speeds Vzfl, Vzfr, Vzrl and Vzrr according to the integrated values of the vertical accelerations Gzfl, Gzfr, Gzrl and Gzrr of the damper bases 1*a* of the corresponding wheels 3 in step S81. The target damping force setting unit 91*fl* then sets a target damping force Dtfl according to the vertical speed Vzfl of the damper base 1*afl* by looking up a prescribed map in step S82. The damping force correction value setting unit 92*fl* computes a front average value Vzfa from the vertical speeds Vzfl and Vzfr of the right and left front damper bases 1*afl* and 1*afr* and a rear average value Vzra from the vertical speeds Vzrl and Vzrr of the right and left rear damper bases 1*arl* and 1*arr* by using the following formulas in step S83.

$$Vzfa = (Vzfl + Vzfr)/2 > 0 \tag{8}$$

$$Vzra = (Vzrl + Vzrr)/2 > 0 \tag{9}$$

The damping force correction value setting unit 92*fl* then determines a damping force correction value Dcfl from the rear average value Vzra by looking up a prescribed map in step S84.

The target damping force correcting unit 93*fl* then determines if the input to the front part (damper bases 1*afl* and 1*afr*) of the vehicle body is in the same phase as the input to the rear part (damper bases 1*arl* and 1*arr*) of the vehicle body, or if the front average value (of the vertical speeds Vzfl and Vzfr) is the same in sign as the rear average value Vza (of the vertical speeds Vzrl and Vzrr) according to the following formula in step S85.

$$Vzfa \times Vzra > 0 \tag{10}$$

If the determination result is Yes in step S85 or the input to the front part of the vehicle body is in the same phase as the input to the rear part of the vehicle body, the target damping force correcting unit 93*fl* computes a skyhook control target value Dshfl from the target damping force Dtfl according to the following formula in step S86.

$$Dshfl = K1 \times Dtfl \tag{11}$$

where K1 is a coefficient.

If the determination result is No in step S85 or the input to the front part of the vehicle body is in an opposite phase to the input to the rear part of the vehicle body, the target damping force correcting unit 93*fl* computes a skyhook control target value Dshfl from the target damping force Dtfl and damping force correcting value Dcfl according to the following formula in step S87.

$$Dshfl = K1 \times (Dtfl - K2 \times Dcfl) \tag{12}$$

where K2 is a coefficient. The skyhook control target value Dshfl is forwarded to the damping force setting unit 52 in step S88, and this concludes the skyhook control process.

In this example, the damping force correction value for the left front damper 6*fl* was determined according to the rear average value of the vertical speeds of the damper bases associated the right and left rear wheels. When there is any opposite phase input to the rear part of the vehicle in relation to the front part of the vehicle, it can be assumed that the pitch changes of the vehicle V is significant, and the skyhook control target value Dshfl is selected so as to have an absolute value greater than that of the target damping force (more conventional target damping force) Dtcfl by subtracting the damping force correcting value Dcfl from the target damping force Dtcfl. Therefore, the change in the pitch changes of the vehicle can be controlled in an effective manner.

When the inputs to the front part of the vehicle and rear part of the vehicle are in the same phase, it can be assumed that a same phase input to the damper in question will control the change in the attitude of the vehicle. Therefore, in such a case, the skyhook control target value Dshfl for the damper 6*fl* is determined without being affected by the rear average value of the vertical speeds of the rear damper bases (or without excessively increasing the damping force), and the pitch movements of the vehicle V can be controlled in an appropriate manner.

Figure 35:
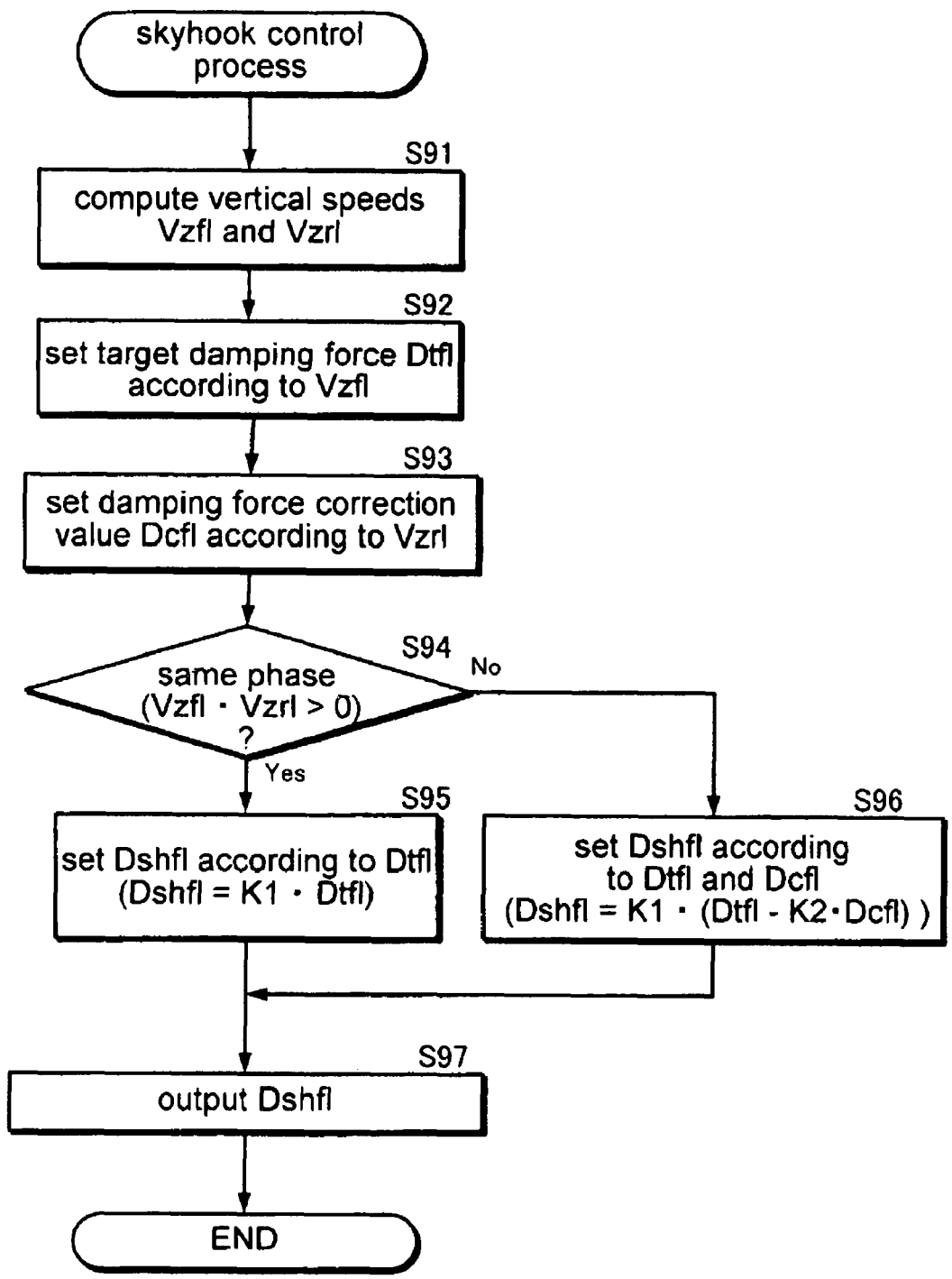
FIG. 35 is a flowchart of a fourth example of the skyhook control process of the fifth embodiment.

FIG. 35 is a flowchart of a fourth example of the skyhook control process. The skyhook control unit 55 computes the left vertical speeds Vzfl and Vzrl according to the integrated values of the vertical accelerations Gzfl and Gzrl of the damper bases 1*a* of the left wheels 3*fl* and 3*rl* in step S91. The target damping force setting unit 91*fl* then sets a target damping force Dtfl according to the vertical speed Vzfl of the damper base 1*afl* corresponding to the left front wheel 3*fl* by looking up a prescribed map in step S92. The damping force correction value setting unit 92*fl* computes a damping force correction value Dcfl from the vertical speed Vzrl of the damper base 1*arl* corresponding to the left rear wheel 3*rl* by looking up a prescribed map in step S93.

The target damping force correcting unit 93*fl* then determines if the input to the left front damper base 1*afl* is in the same phase as the input to the left rear damper base 1*arl* or if the vertical speed Vzfl is the same in sign as the vertical speed Vzrl according to the following formula in step S94.

$$Vzfl \times Vzrl > 0 \tag{13}$$

If the determination result is Yes in step S94 or the input to the left front damper base 1*afl* is in the same phase as that of the left rear damper base, the target damping force correcting unit 93*fl* computes a skyhook control target value Dshfl from the target damping force Dtfl according to the following formula in step S95.

$$Dshfl = K1 \times Dtfl \tag{14}$$

where K1 is a coefficient.

If the determination result is No in step S94 or the input to the left front damper base 1*afl* is in the opposite phase to that to the left rear damper base, the target damping force correcting unit 93*fl* computes a skyhook control target value Dshfl from the target damping force Dtfl and damping force correcting value Dcfl according to the following formula in step S96.

$$Dshfl = K1 \times (Dtfl - K2 \times Dcfl) \tag{15}$$

where K2 is a coefficient. The skyhook control target value Dshfl is forwarded to the damping force setting unit 52 in step S97, and this concludes the skyhook control process.

In this example, the damping force correction value Dcfl for the left front damper 6*fl* is determined according to the input (vertical speed Vzrl) to the left rear damper base 1*arl*. When there is any input to the left rear damper base 1*arl* which is opposite in phase to that to the left front damper base 1*fl*, it can be interpreted as the left part of the vehicle V experiencing a significant pitch change. Therefore, in such a case, the skyhook control target value Dshfl is selected so as to have an absolute value greater than that of the target damping force (more conventional target damping force) Dtcfl by subtracting the damping force correcting value Dcfl from the target damping force Dtcfl. Therefore, the change in the pitch change of the vehicle can be controlled in an effective manner.

When the input to the left rear damper base 1*arl* is in the same phase as the input to the left front damper base 1*afl*, the skyhook control target value Dshfl for the damper 6/1 is determined without being affected by the vertical speed Vzrl of the left rear damper base 1*arl* or without generating an excessive damping force. Therefore, the pitching movement of the vehicle V can be controlled in an appropriate manner.

Figure 36:
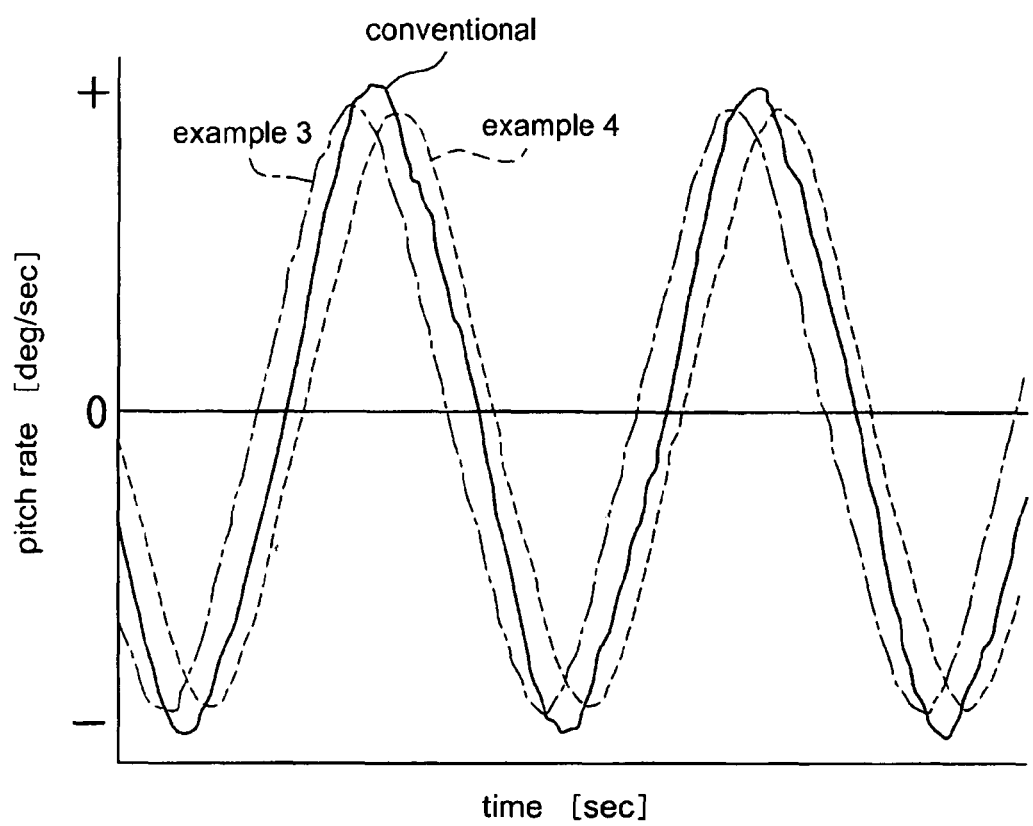
FIG. 36 is a graph showing the pitching movements of the subject vehicles which are controlled in a conventional manner, and according to the third and fourth examples.

Oscillations of a frequency of 1.2 Hz and an amplitude of 7 mm were applied to the front and rear left wheels with a phase difference of 180 degrees (opposite phase) to a conventional vehicle (skyhook control target valued Dshfl=target damping force Dt) and vehicles based on the third and fourth examples (skyhook control target value Dshfl=target damping force Dt−damping force correction value Dc), and FIG. 36 shows the pitching movements of the subject vehicles. In the third example, the damping force correction value Dc was selected according to the front average value of the vertical speeds of the front damper bases or the rear average value of the vertical speeds of the rear damper bases. In the fourth example, the damping force correction value Dc was selected according to the vertical speed Vz of the front or rear damper base 1*a* which is on the same side of the vehicle body as the damper which is to be controlled. The abscissa (time) of the graph is shifted for each curve so that the curves may be more easily compared with one another. As can be appreciated from the graph of FIG. 36, the examples 3 and 4 achieve a significant reduction in the pitching rate of the vehicle body 1 when the vehicle is subjected to opposite phase inputs as compared with the prior art.

Figure 37:
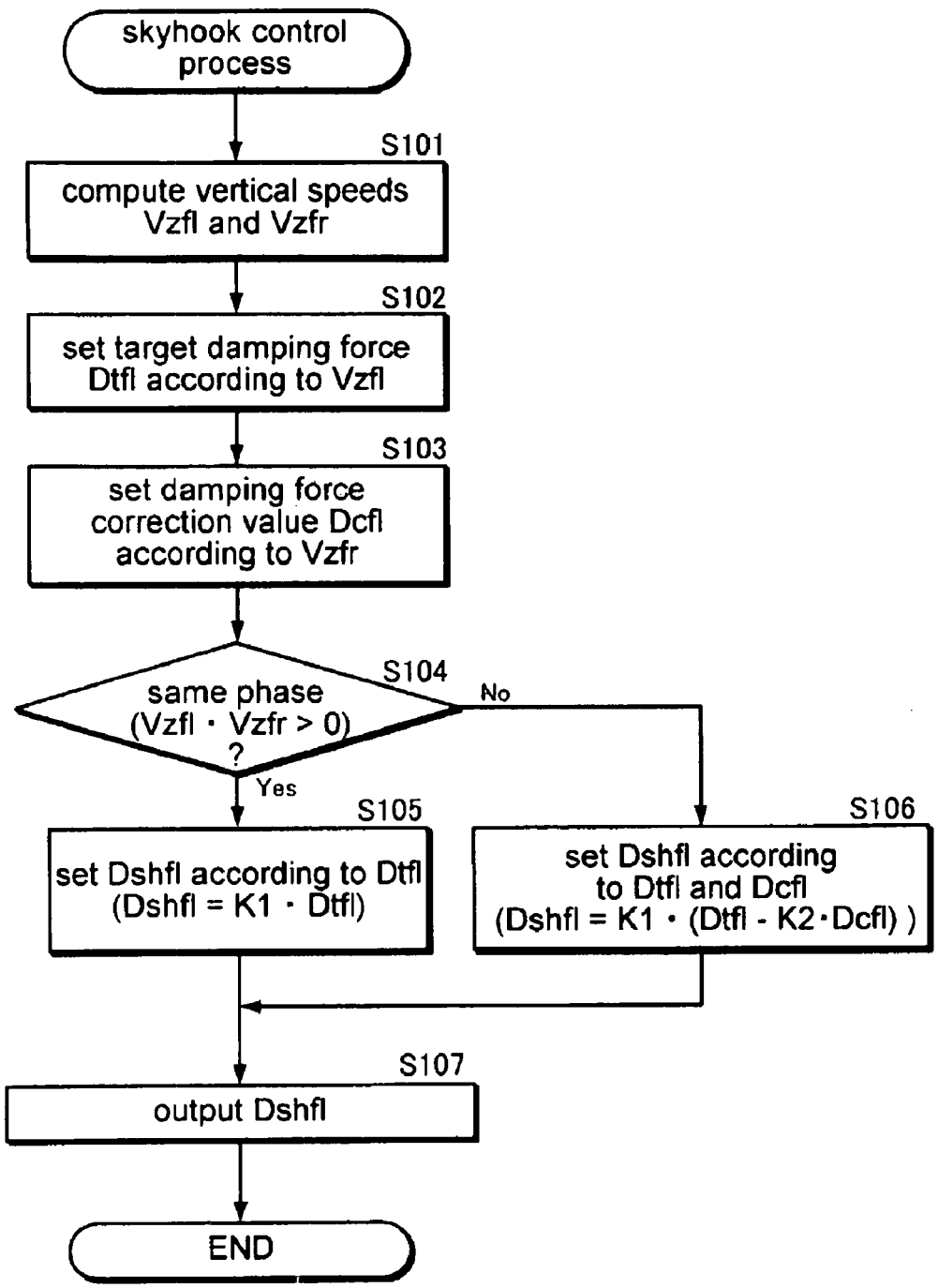
FIG. 37 is a flowchart of a fifth example of the skyhook control process of the fifth embodiment.

FIG. 37 is a flowchart of a fifth example of the skyhook control process. The skyhook control unit 55 computes the front vertical speeds Vzfl and Vzfr according to the integrated values of the vertical accelerations Gzfl and Gzfr of the damper bases 1*a* of the front wheels 3*fl* and 3*fr* in step S101. The target damping force setting unit 91*fl* then sets a target damping force Dtfl according to the vertical speed Vzfl of the damper base 1*afl* by looking up a prescribed map in step S102. The damping force correction value setting unit 92*fl* for the left front wheel 3*fl* computes a damping force correction value Dcfl from the vertical speed Vzfr associated with the right front wheel 3*fr* by looking up a prescribed map in step S103.

The target damping force correcting unit 93*fl* then determines if the input to the left front damper base 1*afl* is in the same phase as the input to the right front damper base 1*afr* or if the vertical speed Vzfl is the same in sign with the vertical speed Vzfr according to the following formula in step S104.

$$Vzfl \times Vzfr > 0 \tag{16}$$

If the determination result is Yes in step S104 or the input to the left front damper base 1*afl* is in the same phase as that of the right front damper base 1*afr*, the target damping force correcting unit 93*fl* computes a skyhook control target value Dshfl from the target damping force Dtfl according to the following formula in step S105.

$$Dshfl = K1 \times Dtfl \tag{17}$$

where K1 is a coefficient.

If the determination result is No in step S104 or the input to the left front damper base 1*afl* is in the opposite phase to that to the right front damper base 1*afr*, the target damping force correcting unit 93*fl* computes a skyhook control target value Dshfl from the target damping force Dtfl and damping force correcting value Dcfl according to the following formula in step S106.

$$Dshfl = K1 \times (Dtfl - K2 \times Dcfl) \tag{18}$$

where K2 is a coefficient. The skyhook control target value Dshfl is forwarded to the damping force setting unit 52 in step S107, and this concludes the skyhook control process.

In this example, the damping force correction value Dcfl for the left front damper 6*fl* is determined according to the input (vertical speed Vzrl) to the right front damper base 1*afr*. When there is any opposite phase input to the right front damper base 1*afr*, it can be interpreted as the roll movement of the front part of the vehicle V is significant. Therefore, in such a case, the skyhook control target value Dshfl is selected so as to have an absolute value greater than that of the target damping force (more conventional target damping force) Dtcfl by subtracting the damping force correcting value from the target damping force Dtcfl. Therefore, the change in the roll movement of the vehicle can be controlled in an effective manner.

When the input to the left front damper base 1*afr* is in the same phase as the input to the left front damper base 1*afl*, the skyhook control target value Dshfl for the damper 6*fl* is determined without being affected by the vertical speed Vzfr of the front right damper base 1*afr* or without generating an excessive damping force. Therefore, the rolling movement of the vehicle V can be controlled in an appropriate manner.

Figure 38:
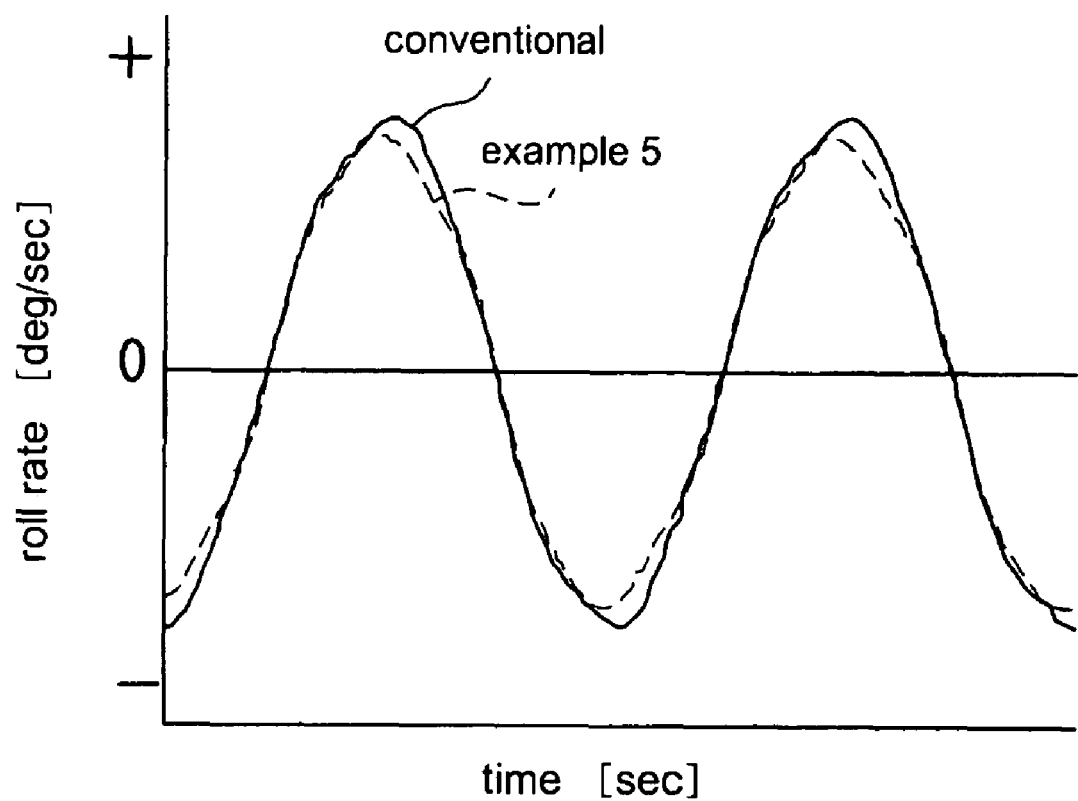
FIG. 38 is a graph showing the rolling movements of the subject vehicles which are controlled in a conventional manner, and according to the fifth example.

Oscillations of a frequency of 1.2 Hz and an amplitude of 7 mm were applied to the right and left front wheels with a phase difference of 180 degrees (opposite phase) to a conventional vehicle (skyhook control target valued Dshfl=target damping force Dt) and vehicle based on the fifth example (skyhook control target value Dshfl=target damping force Dt−damping force correction value Dc), and FIG. 38 shows the rolling movements of the subject vehicles. In the fifth example, the damping force correction value Dc was selected according to the vertical speed Vz of the damper base 1a which is on the laterally opposite side of the vehicle body as the damper which is to be controlled. As can be appreciated from the graph of FIG. 36, the fifth example achieves a significant reduction in the rolling rate of the vehicle body 1 when the vehicle is subjected to opposite phase inputs as compared with the prior art.

Figure 39:
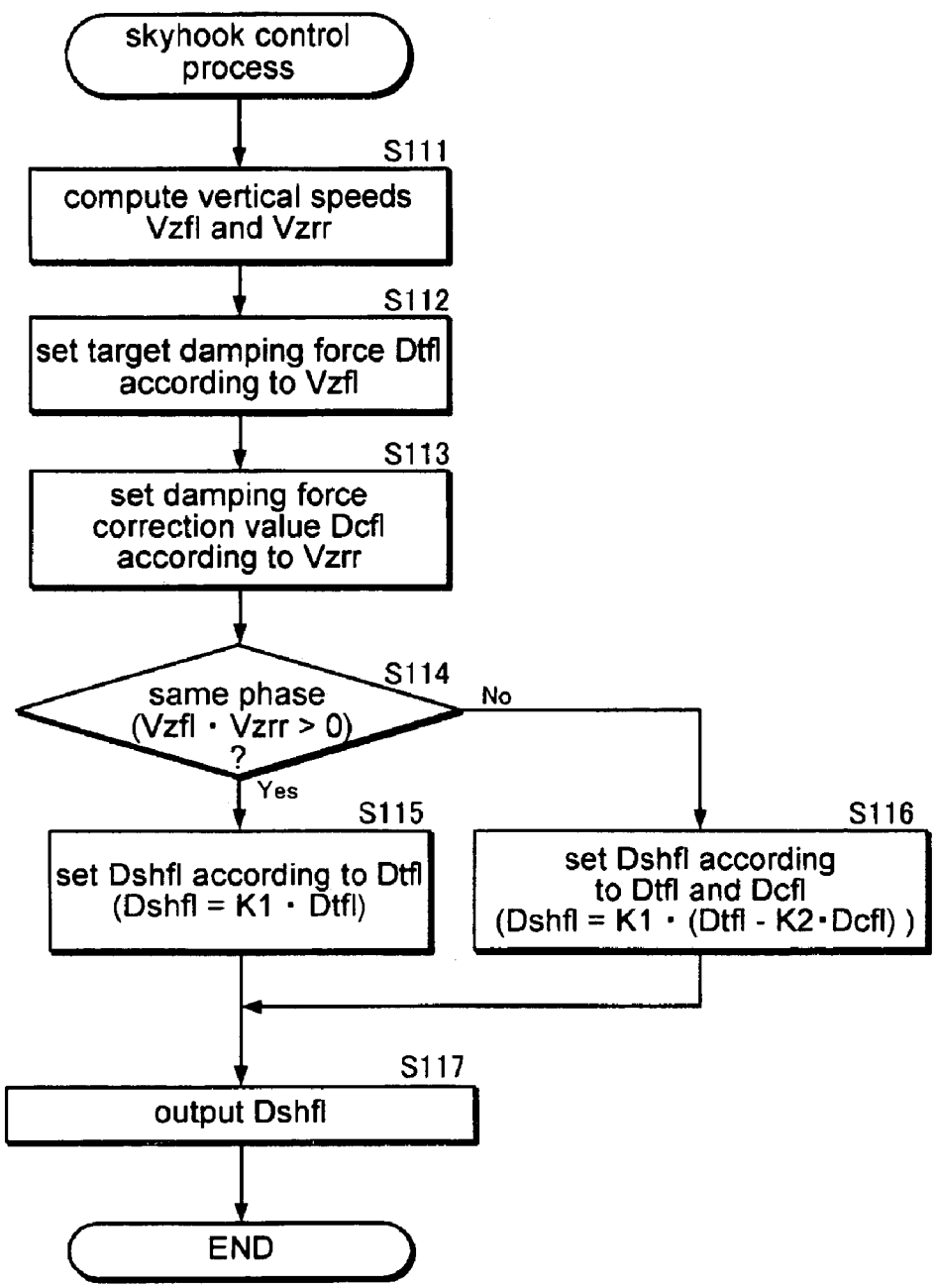
FIG. 39 is a flowchart of a sixth example of the skyhook control process of the fifth embodiment.

FIG. 39 is a flowchart of a sixth example of the skyhook control process. The skyhook control unit 55 computes the vertical speeds Vzfl and Vzrr according to the integrated values of the vertical accelerations Gzfl and Gzrr of the damper bases 1a of the left front wheel 3fl and right rear wheel 3rr (which is diagonally opposite to the left front wheel 3fl) in step S111. The target damping force setting unit 91fl then sets a target damping force Dtfl according to the vertical speed Vzfl of the damper base 1afl by looking up a prescribed map in step S112. The damping force correction value setting unit 92fl computes a damping force correction value Dcfl is determined from the vertical speed Vzrr associated with the right rear wheel 3rr by looking up a prescribed map in step S113.

The target damping force correcting unit 93fl then determines if the input to the left front damper base 1afl is in the same phase as the input to the (diagonally opposite) right rear damper base 1arr or if the vertical speed Vzfl is the same in sign with the vertical speed Vzrr according to the following formula in step S114.

$$Vzfl \times Vzrr > 0 \quad (19)$$

If the determination result is Yes in step S114 or the input to the left front damper base 1afl is in the same phase as that of the right rear damper base 1arr, the target damping force correcting unit 93fl computes a skyhook control target value Dshfl from the target damping force Dtfl according to the following formula in step S115.

$$Dshfl = K1 \times Dtfl \quad (20)$$

where K1 is a coefficient.

If the determination result is No in step S114 or the input to the left front damper base 1afl is in the opposite phase to that to the right rear damper base, the target damping force correcting unit 93fl computes a skyhook control target value Dshfl from the target damping force Dtfl and damping force correcting value Dcfl according to the following formula in step S116.

$$Dshfl = K1 \times (Dtfl - K2 \times Dcfl) \quad (21)$$

where K2 is a coefficient. The skyhook control target value Dshfl is forwarded to the damping force setting unit 52 in step S117, and this concludes the skyhook control process.

In this example, the damping force correction value Dcfl for the left front damper 6fl is determined according to the input (vertical speed Vzrr) to the right rear damper base 1arr. When there is any opposite phase input to the right rear damper base 1afr, it can be interpreted as the rolling movement and pitching movement of the vehicle V are both significant. Therefore, in such a case, the skyhook control target value Dshfl is selected so as to have an absolute value greater than that of the target damping force (more conventional target damping force) Dtcfl by subtracting the damping force correcting value from the target damping force Dtcfl. Therefore, the change in the roll and pitch movements of the vehicle can be controlled in an effective manner.

When the input to the right rear damper base 1arr is in the same phase as the input to the left front damper base 1afl, the skyhook control target value Dshfl for the damper 6fl is determined without being affected by the vertical speed Vzrr of the rear right damper base 1arr or without generating an excessive damping force. Therefore, the rolling and pitching movements of the vehicle V can be controlled in an appropriate manner.

Figure 40:
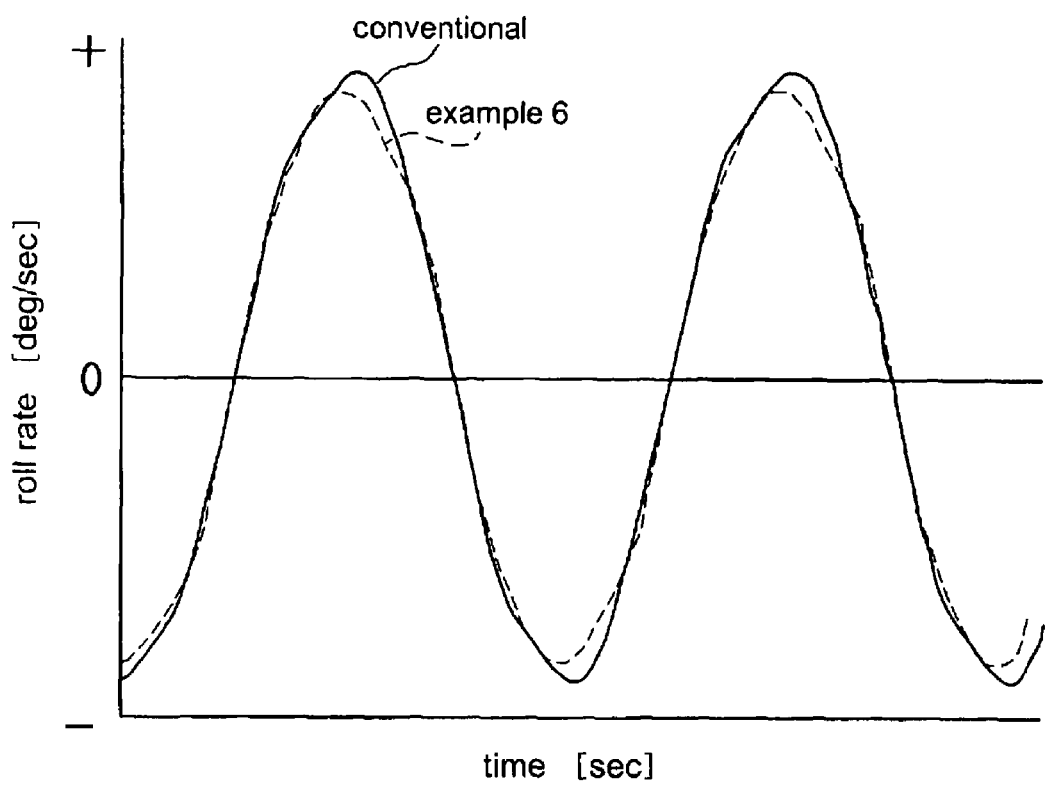
FIG. 40 is a graph showing the rolling movements of the subject vehicles which are controlled in a conventional manner, and according to the sixth example.
Figure 41:
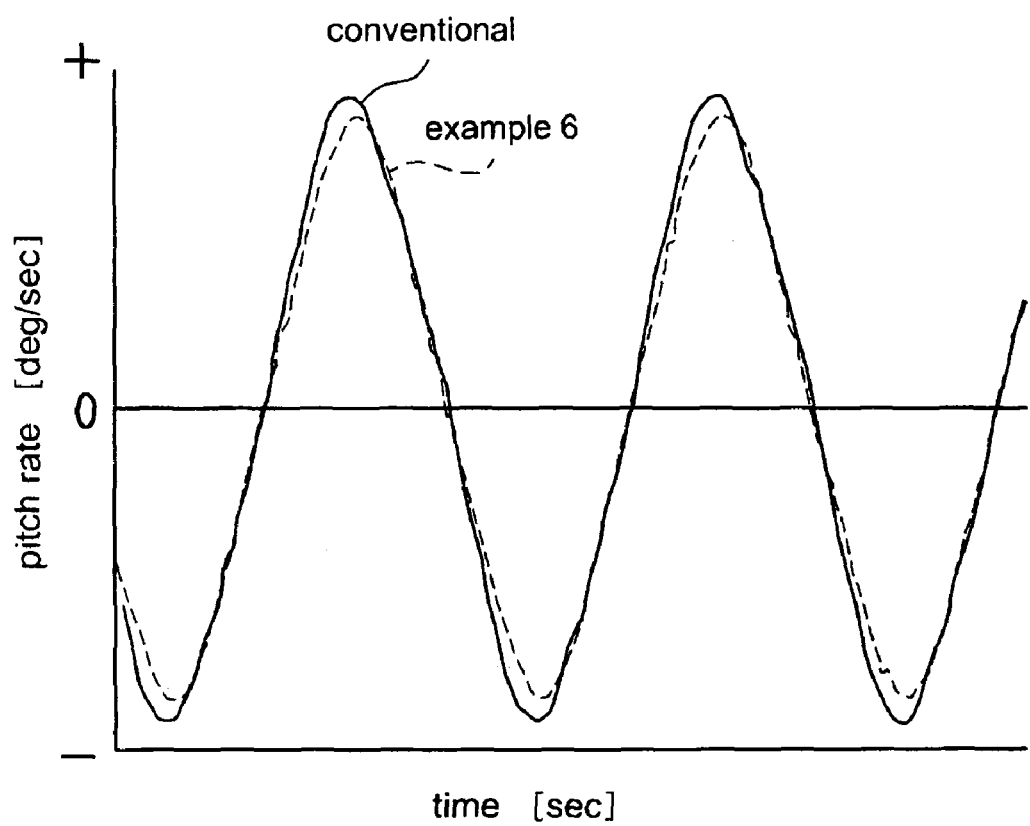
FIG. 41 is a graph showing the pitching movements of the subject vehicles which are controlled in a conventional manner, and according to the sixth example.

Oscillations of a frequency of 1.2 Hz and an amplitude of 7 mm were applied to the right and left wheels with a phase difference of 180 degrees (opposite phase) to a conventional vehicle (skyhook control target valued Dshfl=target damping force Dt) and vehicle based on the sixth example (skyhook control target value Dshfl=target damping force Dt−damping force correction value Dc), and FIGS. 40 and 41 show the rolling and pitching movements of the subject vehicles.

In the sixth example, the damping force correction value Dc was selected according to the vertical speed Vz of the damper base 1a which is diagonally opposite to the damper which is to be controlled. As can be appreciated from the graphs of FIGS. 40 and 41, the sixth example achieves a significant reduction in the rolling rate and pitching rate of the vehicle body 1 when the vehicle is subjected to opposite phase inputs as compared with the prior art.

A seventh embodiment of the present invention is described in the following with reference to FIGS. 42 to 46. Again, the parts corresponding to those of the previous embodiments are denoted with like numerals without repeating the description of such parts. In this embodiment, each wheel is supported by a wheel suspension system 107 using an air spring 105 instead of a more conventional coil spring. The wheel suspension systems are configured such that the natural frequencies of the vertical movements of the wheel are identical to one another when the vehicle is traveling over a horizontal road surface.

The air spring 105 used in the present embodiment is provided with a per se known structure, and the detailed description thereof is omitted in this specification. It includes a tubular air piston surrounding the cylinder 22 of the damper 6, a tubular air cylinder connected to the piston rod 23 of the damper 6 and having a larger diameter than the air piston, a flexible diaphragm connected to both the air piston and air cylinder so as to accommodate a relative axial movement between the air piston and air cylinder and a tubular cover connected to the lower end of the air chamber and receiving the diaphragm therein. An air chamber defined by the air piston, air cylinder and diaphragm communicates with an air tube whose other end is connected to an air compressor or an air tank. By filling air into and drawing air out of the air chamber, the air pressure in the air chamber is variably controlled, and the spring constant of the air spring 105 can be varied as desired.

Figure 43:
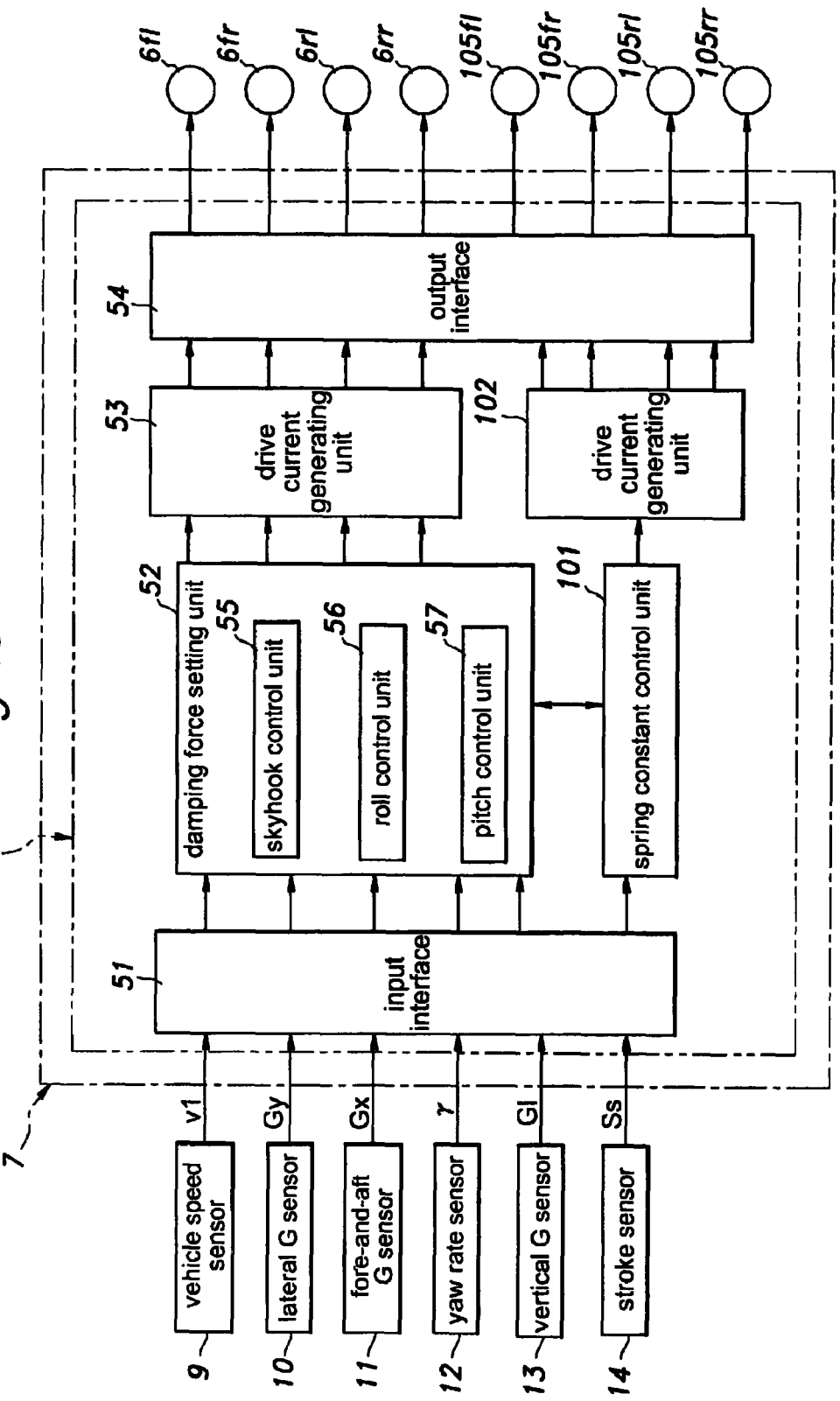
FIG. 43 is a block diagram of a damping force control unit of the seventh embodiment.

As shown in FIG. 43, the ECU 7 is incorporated with a suspension property control unit 150. The suspension property control unit 150 comprises an input interface 51 to which the sensors 9 to 14 are connected, a damping force setting unit 52 for determining the target damping force of each damper 6 according to the detection signals obtained from the sensors 9 to 14, a spring constant control unit 101 for setting a spring constant control value Dsu of each sir spring according to the detection signals obtained from the sensors 9 to 14, a spring drive current generating unit 102 for generating a drive current for the air compressor or pressure control valve corresponding to each air spring 105 according to the spring constant control value Dsu received from the spring constant control unit 101, a damper drive current generating unit 53 for generating the drive current for each damper 6 (MLV coil 42) according the corresponding target damping force supplied by the damping force setting unit 52 and an output interface 54 for supplying the drive currents generated by the damper drive current generating unit 53 and spring drive current generating unit 102 to each damper 6 and each air spring 105, respectively.

Figure 44:
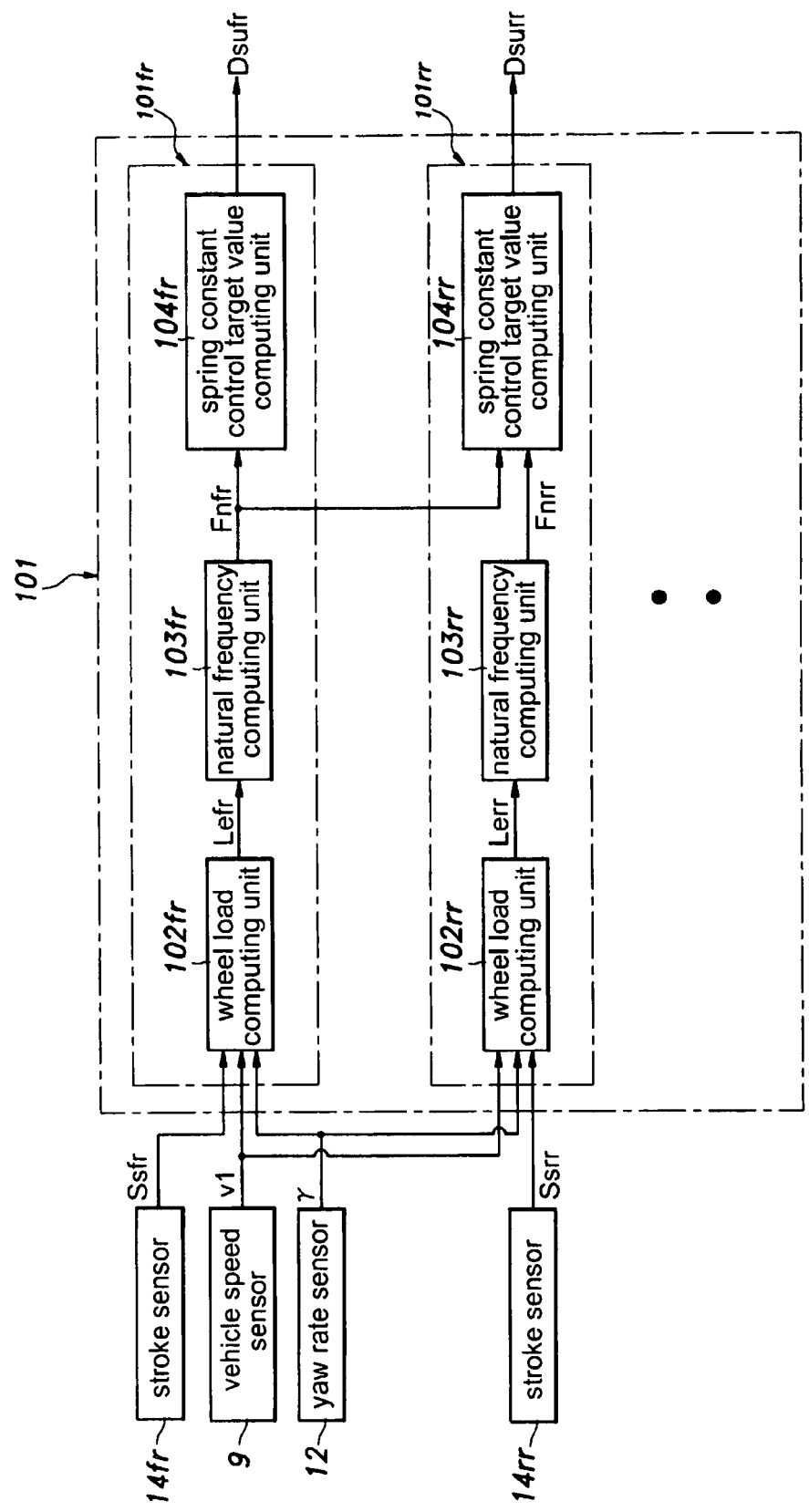
FIG. 44 is a block diagram of the spring constant control unit of the seventh embodiment.

As shown in FIG. 44, the spring constant control unit 101 is provided for each wheel, and the spring constant control is executed using the right front wheel as a reference wheel in the illustrated embodiment. However, the reference wheel may also be any other wheel according to a broad concept of the present invention. The spring constant control unit 101 variably controls (feedback control) the spring constants of the air springs 105 such that the natural frequency Fn of the part of the vehicle body corresponding to each non-reference wheel that can vary depending on the corresponding wheel load Le is equal to or substantially equal to the natural frequency Fnfr of the part of the vehicle body corresponding to the reference wheel or right front wheel 3fr.

The spring constant control unit 101fr corresponding to the right front wheel (reference wheel) 3fr comprises a wheel load computing unit 102fr, a natural frequency computing unit 103fr and a spring constant control target value computing unit 104fr. The wheel load computing unit 102fr computes the wheel load Lefr of the right front wheel 3fr according to the vehicle speed v1 received from the vehicle speed sensor 9, a stroke speed Ssfr received from the stroke sensor 14fr corresponding to the right front wheel 3fr and a yaw rate γ received from the yaw rate sensor 12. The natural frequency computing unit 103fr computes the natural frequency Fnfr of the part of the vehicle body corresponding to the right front wheel 3fr according to the wheel load Lefr. The spring constant control target value computing unit 104fr sets a spring constant control target value Dsufr according to the computed natural frequency Fnfr, and outputs it for a control purpose.

The spring constant control unit 101rr corresponding to the right rear wheel 3rr comprises a wheel load computing unit 102rr, a natural frequency computing unit 103rr and a spring constant control target value computing unit 104rr. The wheel load computing unit 102rr computes the wheel load Lerr of the right rear wheel 3rr according to the vehicle speed v1 received from the vehicle speed sensor 9, a stroke speed Ssrr received from the stroke sensor 14rr corresponding to the right rear wheel 3rr and a yaw rate γ received from the yaw rate sensor 12. The natural frequency computing unit 103rr computes the natural frequency Fnrr of the part of the vehicle body corresponding to the right rear wheel 3rr according to the wheel load Lerr. The spring constant control target value computing unit 104rr sets a spring constant control target value Dsurr according to the wheel load Lerr so as to minimize a difference ΔFnrr between the natural frequency of the part of the vehicle body corresponding to the right front wheel 3fr and natural frequency of the part of the vehicle body corresponding to the right rear wheel 3rr.

The spring constant control unit 101fl corresponding to the left front wheel 3fl and spring constant control unit 101rl corresponding to the left rear wheel 3rl are each provided with a structure similar to that of the spring constant control unit 101 rr corresponding to the right rear wheel 3rr, and compute a spring constant control target value Dsufl or Dsurl according to the wheel load Lefl or Lerl so as to minimize a difference ΔFnfl and ΔFnrl between the natural frequency of the part of the vehicle body corresponding to the right front wheel (reference wheel) 3fr and natural frequency Fnfl or Fnrl of the part of the vehicle body corresponding to the left front wheel 3fl or left rear wheel 3rl, as the case may be.

Figure 45:
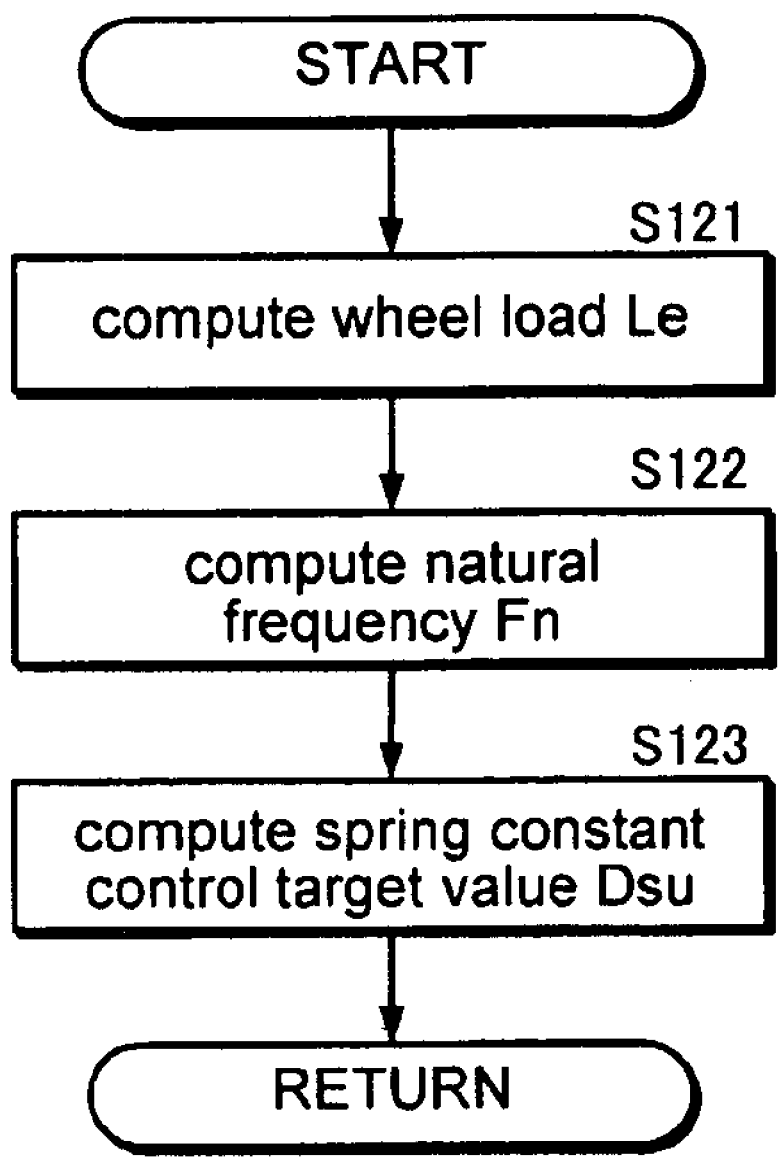
FIG. 45 is a flowchart showing the process of computing a spring constant target value for a reference wheel in the seventh embodiment.
Figure 46:
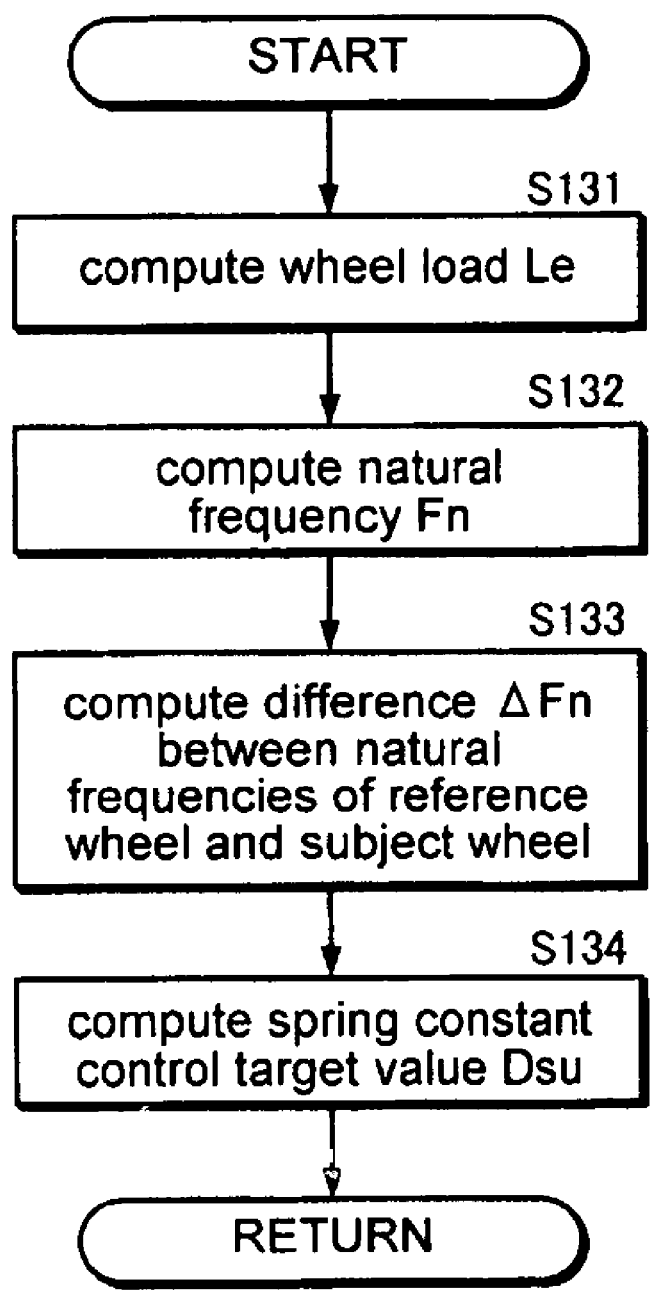
FIG. 46 is a flowchart showing the process of computing a spring constant target value for a non-reference wheel in the seventh embodiment.

The spring constant control unit 101 of the suspension property control unit 150 computes the spring constant control target value Dsu according to the control process illustrated in FIGS. 45 and 46. The spring constant control target value Dsufr for the air spring 105fr of the right front wheel 3fr or the reference wheel is computed by the spring constant control unit 101fr according to the flowchart of FIG. 45, and the spring constant control target values Dsufl, Dsurr and Dsurl of the air springs 105fl, 105rr and 105rl of the remaining wheels 3fl, 3rr and 3rl are computed by the spring constant control units 101fl, 101rr and 101nr according to the flowchart of FIG. 46.

As shown in FIG. 45, upon starting of the spring constant target value computing process by the spring constant control unit 101fr, the wheel load computing unit 102fr computes the wheel load Lefr corresponding to the right front wheel 3fr according to the vehicle speed v1, a stroke speed Ssfr corresponding to the right front wheel 3fr and a yaw rate γ in step S121. The natural frequency computing unit 103fr then computes the natural frequency Fnfr of the part of the vehicle body corresponding to the right front wheel 3fr according to the computed wheel load Lefr in step S122. The spring constant control target value computing unit 104fr sets a spring constant control target value Dsufr according to the computed natural frequency Fnfr, and outputs it for a control purpose in step S123.

As shown in FIG. 46, upon starting of the spring constant target value computing process by the spring constant control unit 101 rr corresponding to the right rear wheel 3rr, the wheel load computing unit 102rr computes the wheel load Lerr of the right rear wheel 3rr according to a vehicle speed v1, a stroke speed Ssrr corresponding to the right front wheel 3fr and a yaw rate γ in step S131. The natural frequency computing unit 103rr computes the natural frequency Fnrr of the part of the vehicle body corresponding to the right rear wheel 3rr according to the wheel load Lerr in step S132. The spring constant control target value computing unit 104rr computes a difference ΔFnrr between the natural frequency Fnfr of the part of the vehicle body corresponding to the right front wheel 3fr and natural frequency Fnrr of the part of the vehicle body corresponding to the right rear wheel 3rr in step S133. The spring constant control target value computing unit 104rr then sets a spring constant control target value Dsurr according to the difference in the natural frequencies ΔFnrr, and outputs it for a control purpose in step S134.

The spring constant control target values Dsufl and Dsurl corresponding to the left front wheel 3fl and left rear wheel 3rl, respectively, are computed similarly as the spring constant control target value Dsurr for the right rear wheel 3rr according to the flowchart of FIG. 46.

In the seventh embodiment, a feedback control based on the deviation ΔFn of the natural frequency Fn of the part of the vehicle body corresponding to each wheel 3rr, 3fl or 3rl or each air spring 105 from that of the part of the vehicle body corresponding to the reference wheel 3fr is carried out in such a manner that the deviation may be minimized. Thereby, the natural frequencies of all of the vehicle parts corresponding to the different wheels are made substantially equal to one another. Any difference in the vertical speed among the different parts of the vehicle body is caused by the differences in the natural frequencies of the different parts of the vehicle body which are in turn caused by the changes in the load distribution among the different vehicle parts. Therefore, the difference in the vertical speed among the various parts of the vehicle body can be minimized by equalizing the natural frequencies of the vehicle body parts associated with the different wheels fitted with the corresponding air springs. Thereby, even when the load distribution of the vehicle body is varied owing to the slanting of the vehicle body, the natural frequencies of the various parts of the vehicle body can be equalized, and the difference in the vertical speed among the different vehicle body parts can be minimized so that the pitching and rolling movements of the vehicle body can be minimized, and a favorable ride quality can be achieved.

Figure 42:
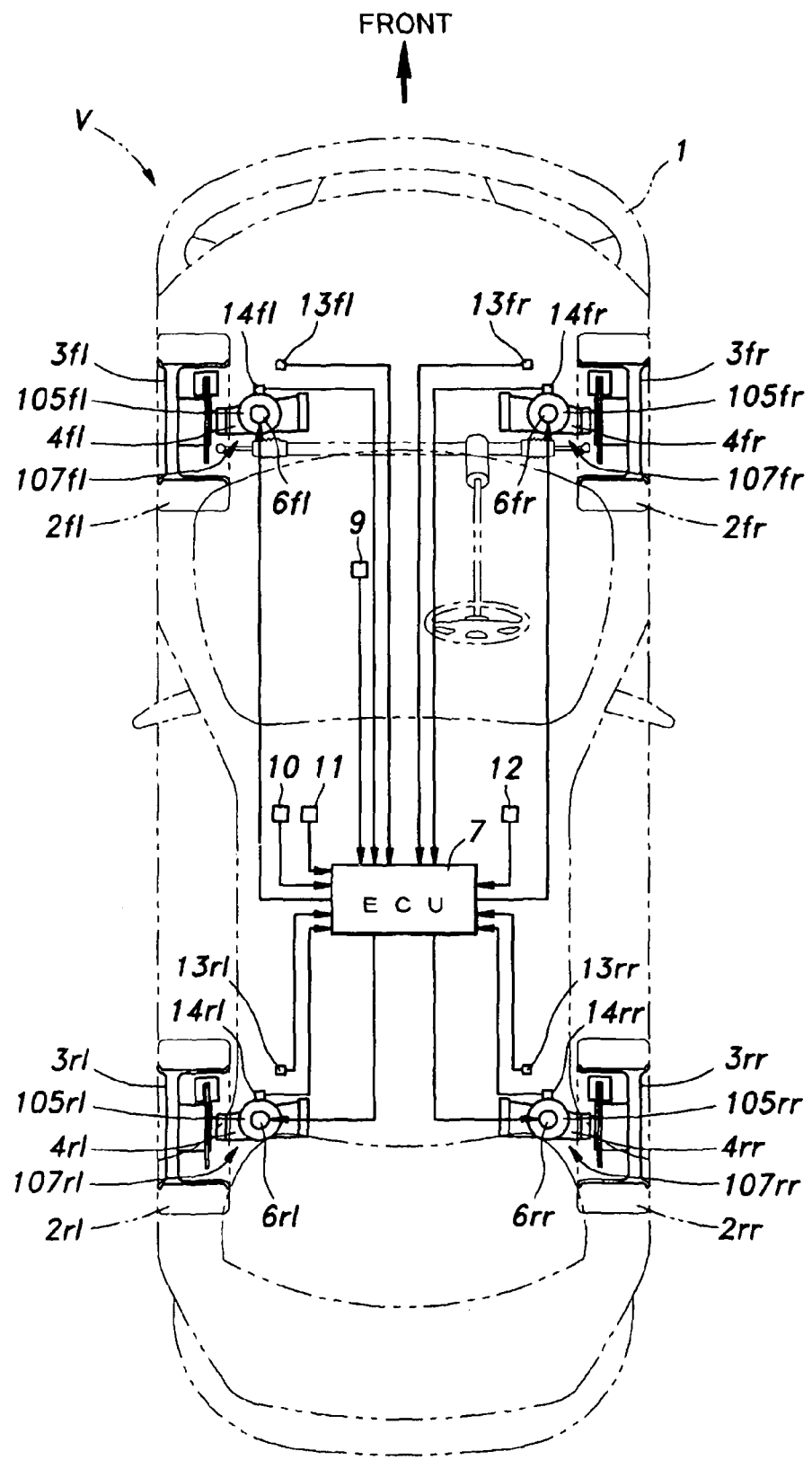
FIG. 42 is a block diagram similar to FIG. 1 showing a seventh embodiment of the present invention.

An eighth embodiment which is slightly modified from the second embodiment and seventh embodiment is described in the following with reference to FIGS. 42 and 47. Again, the parts corresponding to those of the previous embodiment are denoted with like numerals without repeating the description of such parts.

Figure 47:
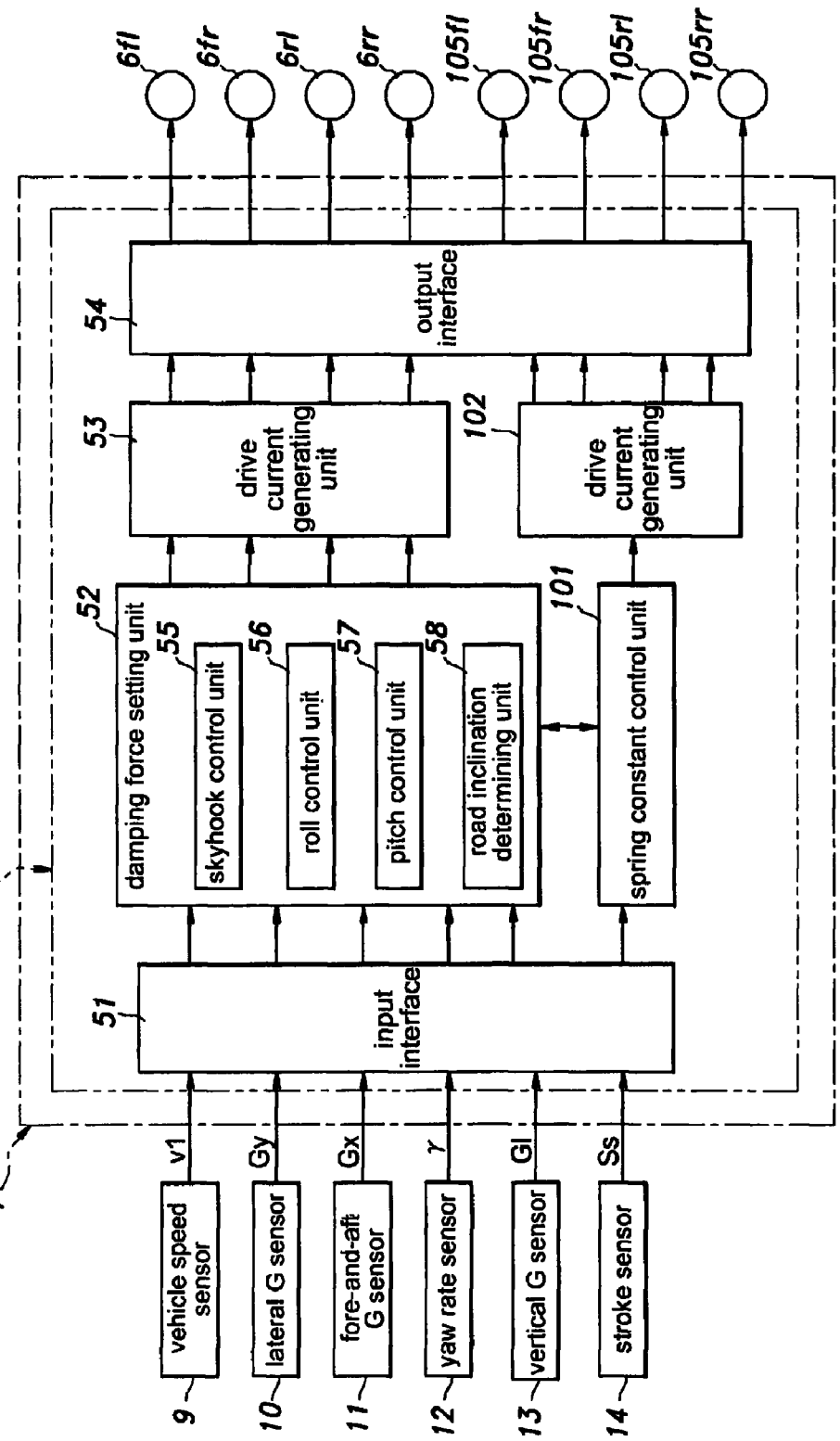
FIG. 47 is a block diagram of a damping force control unit of an eighth embodiment of the present invention.

Referring to FIG. 47 illustrating the damping force control unit of the eighth embodiment, the ECU 7 is incorporated with a suspension property control unit 150 for controlling each of the dampers 6. The suspension property control unit 150 comprises an input interface 51 to which the sensors 9 to 14 are connected, a damping force setting unit 52 for determining the target damping force of each damper 6 according to the detection signals obtained from the sensors 9 to 14, a spring constant control unit 101 for setting a spring constant control value Dsu of each sir spring according to the detection signals obtained from the sensors 9 to 14, a spring drive current generating unit 102 for generating a drive current for the air compressor or pressure control valve corresponding to each air spring 105 according to the spring constant control value Dsu received from the spring constant control unit 101, a damper drive current generating unit 53 for generating the drive current for each damper 6 (MLV coil 42) according the corresponding target damping force supplied by the damping force setting unit 52 and an output interface 54 for supplying the drive currents generated by the damper drive current generating unit 53 and spring drive current generating unit 102 to each damper 6 and each air spring 105, respectively.

The damping force setting unit 52 comprises a skyhook control unit 55 for performing a skyhook control, a roll control unit 56 for performing a roll control, a pitch control unit 57 for performing a pitch control, and a road inclination determining unit 58 for determining an inclination of a road surface or an inclination of the vehicle body.

The spring constant control unit 101 is controlled in connection with the damping force setting unit 52, and variably controls the spring constant of each air spring 105 so that the natural frequency Fn of each vehicle part which may have varied owing to the change in the corresponding wheel load Le to be close to the natural frequency Gn when the vehicle is traveling over a horizontal road surface, when such a slanting of the road surface is detected by the road inclination determining unit 58. The control process of this embodiment is similar to that disclosed in FIGS. 14 to 16 as the third embodiment, and differs therefrom in that the spring constant control unit 101 controls the spring constant of each suspension spring at the same time as controlling the damping force of each suspension spring.

Figure 48:
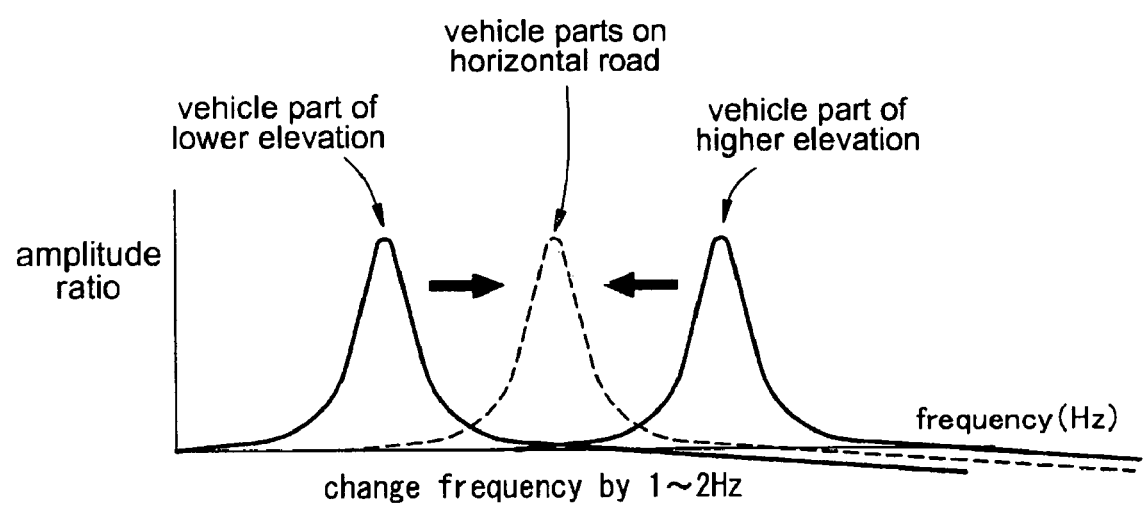
FIG. 48 is a graph comparing the natural frequencies of different wheels when the vehicle is traveling over a slanted road surface and showing how they may be made agree with each other by controlling an air spring of each suspension system.
Figure 49:
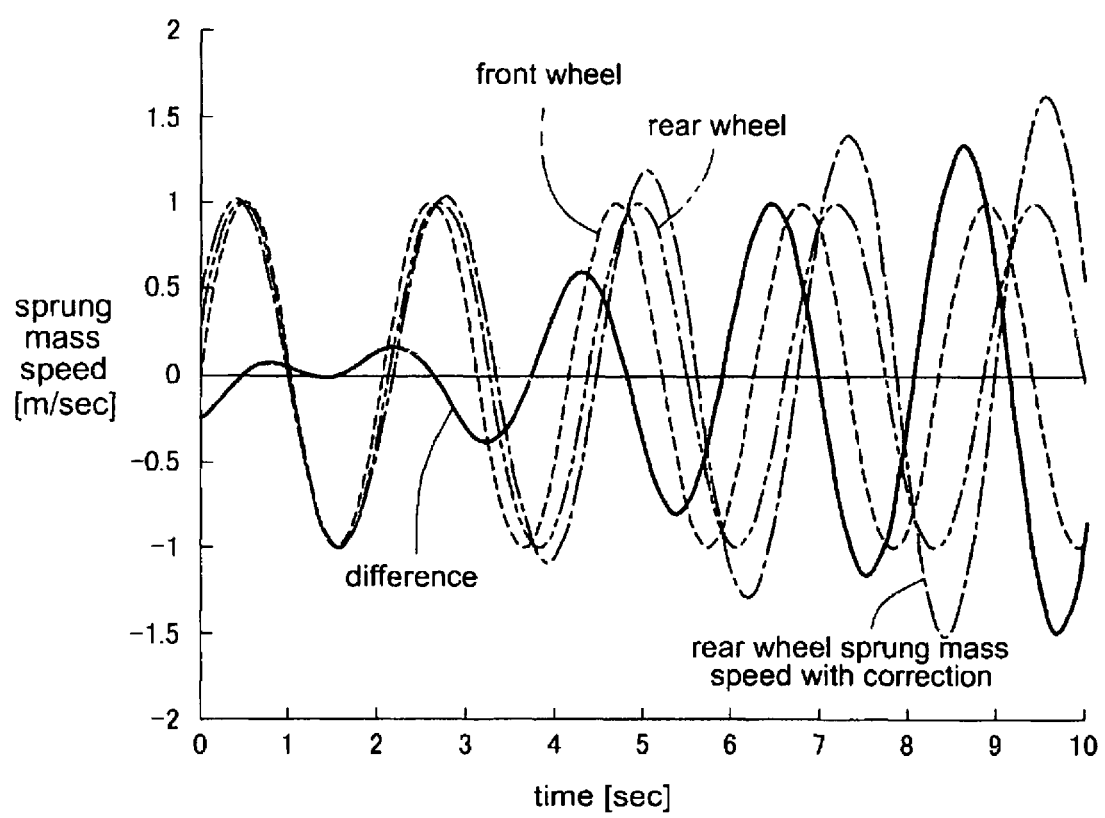
FIG. 49 is a graph showing the sprung mass speeds of a front and rear part of a vehicle body according to a conventional arrangement.

In the third embodiment of the present invention described above in connection with FIGS. 11 to 19, the ride quality was improved by changing the natural frequency amplitude or resonant frequency amplitude of each vehicle part by changing the damping force of the corresponding damper, but the natural frequency of each vehicle part could not be changed even when the distribution of wheel loads Le have changed owing to the inclination of the road surface on which the vehicle travels. However, in this embodiment, the natural frequency of each vehicle part can be changed by changing the spring constant of the corresponding air spring so that the natural frequency of each vehicle part can be varied in dependence on the wheel load distribution. By controlling each air spring so that the natural frequency of each vehicle body part may become close to the natural frequency of the same part when the vehicle is traveling over a horizontal road surface, the ride quality of the vehicle when traveling over a slanted road surface may be made as favorable as when the vehicle is traveling over a horizontal road surface as illustrated in FIG. 48.

Although the present invention has been described in terms of preferred embodiments thereof, it is obvious to a person skilled in the art that various alterations and modifications are possible without departing from the scope of the present invention which is set forth in the appended claims. For instance, the sprung mass speed and/or acceleration can be detected either by using a vertical G sensor or a stroke sensor.

The contents of the original Japanese patent applications on which the Paris Convention priority claim is made for the present application, as well as those of the prior art references mentioned in the present application are hereby incorporated in this application by reference. Also, one feature of a certain embodiment may be incorporated into another embodiment without departing from the spirit of the present invention.

The invention claimed is:

1. A control device for controlling a variable element of a wheel suspension system, comprising:
   a variable suspension element having a variable property interposed between each wheel and an associated part of a vehicle body;
   a sensor provided in a part of a vehicle body part adjacent to each wheel for detecting a corresponding dynamic state variable of the vehicle body;
   a control unit for controlling the variable suspension element associated with one of the wheels at least according to an output of the sensor associated with a different one of the wheels; and
   a base value computing unit that computes a target damping force base value and a correction value computing unit that computes a correction value for a vehicle part corresponding to one of the wheels according to a difference between a vertical speed of the vehicle part corresponding to the one wheel and a vertical speed of the vehicle part corresponding to a different one of the wheels, a target damping force for the vehicle part corresponding to the one wheel being determined from the target damping force base value and the correction value,
   wherein the dynamic state variable comprises a vertical movement variable of a vehicle body part associated with each wheel, and the control unit controls the variable suspension element in such a manner that a difference between the vertical movement variable of the vehicle body part associated with one of the wheels and the vertical movement variable of the vehicle body part associated with a different one of the wheels may be minimized, and
   wherein the variable suspension element provides a variable damping force.

2. The control device according to claim 1, further comprising a detector for detecting an inclination angle of the vehicle, wherein the sensor further comprises a wheel load sensor for detecting a load acting upon each wheel, and the control unit controls one of the variable suspension elements according to the wheel loads of the corresponding wheel and at least one other wheel.

3. The control device according to claim 2, wherein the control unit controls at least one of the variable suspension elements according to a control parameter based on a dynamic variable of the vehicle associated with the corresponding wheel, and corrects the control parameter according to the wheel loads of the corresponding wheel and at least one other wheel.

4. A control device for controlling a variable element of a wheel suspension system, comprising:
- a variable suspension element having a variable property interposed between each wheel and an associated part of a vehicle body;
- a sensor provided in a part of a vehicle body part adjacent to each wheel for detecting a corresponding dynamic state variable of the vehicle body;
- a control unit for controlling the variable suspension element associated with one of the wheels at least according to an output of the sensor associated with a different one of the wheels; and
- a detector for detecting an inclination angle of the vehicle, wherein the sensor further comprises a wheel load sensor for detecting a load acting upon each wheel, and the control unit controls one of the variable suspension elements according to the wheel loads of the corresponding wheel and at least one other wheel,
- wherein the control unit computes a natural frequency of a vehicle part associated with each variable suspension element by taking into account outputs of the wheel load sensors, and controls at least one of the suspension elements according to the computed natural frequencies of at least one other wheel.

5. The control device according to claim 4, wherein each variable suspension element comprises a variable damper, and upon detection of an inclination of the vehicle, the control unit controls the variable damper in such a manner that a natural frequency oscillation amplitude of a vehicle part located at a higher elevation than at least one of the remaining wheels is reduced.

6. The control device according to claim 4, wherein each suspension element comprises a variable damper, and upon detection of an inclination of the vehicle, the control unit controls the variable damper in such a manner that a natural frequency oscillation amplitude of a vertical movement of a vehicle part located at a lower elevation than at least one of the remaining wheels is increased.

7. The control device according to claim 4, wherein each suspension element comprises a variable spring, and upon detection of an inclination of the vehicle, the control unit controls the variable spring in such a manner that a natural frequency of a vertical movement of a vehicle part adjacent to one of the wheels is brought closer to a natural frequency of the vertical movement of the same vehicle part when the vehicle is oriented horizontally.

8. A control device for controlling a variable element of a wheel suspension system, comprising:
- a variable suspension element having a variable property interposed between each wheel and an associated part of a vehicle body;
- a sensor provided in a part of a vehicle body part adjacent to each wheel for detecting a corresponding dynamic state variable of the vehicle body;
- a control unit for controlling the variable suspension element associated with one of the wheels at least according to an output of the sensor associated with a different one of the wheels; and
- a detector for detecting an inclination angle of the vehicle, wherein the sensor further comprises a wheel load sensor for detecting a load acting upon each wheel, and the control unit controls one of the variable suspension elements according to the wheel loads of the corresponding wheel and at least one other wheel,
- wherein the control unit controls the suspension element in a different mode when the inclination angle detected by the inclination angle detector is greater than a prescribed value.

9. A control device for controlling a variable element of a wheel suspension system, comprising:
- a variable suspension element having a variable property interposed between each wheel and an associated part of a vehicle body;
- a sensor provided in a part of a vehicle body part adjacent to each wheel for detecting a corresponding dynamic state variable of the vehicle body;
- a control unit for controlling the variable suspension element associated with one of the wheels at least according to an output of the sensor associated with a different one of the wheels; and
- further comprising a detector for detecting a turning movement of the vehicle, wherein the control unit increases a damping force of the damper corresponding to an inner one of the wheels with a prescribed delay after increasing a damping force of the damper corresponding to an outer one of the wheels when a turning movement of the vehicle is detected by the detector.

10. The control device according to claim 1, wherein each suspension element comprises a variable damper, and the control unit comprises a target damping force setting unit for determining a target damping force of one of the dampers according to an output of the sensor associated with the subject damper, a correction value setting unit for determining a damping force correction value for the damper according to an output of the sensor associated with a damper different from the subject damper, and a target damping force correcting unit for correcting the target damping force with the damping force correction value.

11. The control device according to claim 10, wherein the dynamic state variable comprises a vertical speed of a vehicle part adjacent to each wheel, and the target damping force for the subject damper is corrected such that an absolute value of the target damping force is increased when a direction of a vertical movement of at least one of the vehicle parts corresponding to the remaining wheels is opposite to that of the vehicle part corresponding to the subject wheel.

12. The control device according to claim 11, wherein the target damping force for each subject damper is determined according the vertical speed of a vehicle part associated therewith, and the damping force correction value for the subject damper is determined according to the vertical speed of at least one of the vehicle parts corresponding to the remaining dampers.

13. A control method for controlling a variable element of a wheel suspension system, comprising:
- detecting a dynamic state variable of a vehicle part adjacent to each wheel; and
- controlling the variable element of the wheel suspension system associated with a subject wheel according to the dynamic variable of a vehicle part of a different one of the remaining wheels.

14. The control method according to claim 13, wherein the dynamic state variable comprises a vertical movement variable of a vehicle body part associated with each wheel, and the suspension element associated with one of the wheels is controlled in such a manner that a difference between the vertical movement variable of the vehicle body part associated with the one wheel and the vertical movement variable of the vehicle body part associated with a different one of the wheels may be minimized.

15. The control method according to claim 13, further comprising detecting an inclination angle of the vehicle, and detecting a load acting upon each wheel, each suspension element being controlled according to the wheel load of the corresponding wheel and at least one other wheel at least when an inclination of the vehicle is detected.

16. A control method for controlling a variable element of a wheel suspension system, comprising the steps of:
  detecting a dynamic state variable of a vehicle part adjacent to each wheel;
  controlling the variable element of the wheel suspension system associated with a subject wheel according to the dynamic variable of a vehicle part of a different one of the remaining wheels; and
  further comprising detecting a turning movement of the vehicle, wherein the variable suspension element comprises a variable damping force damper, and a damping force of the damper corresponds to an inner one of the wheels being increased with a prescribed delay after increasing a damping force of the damper corresponding to an outer one of the wheels when a turning movement of the vehicle is detected.

17. The control method according to claim 13, wherein the suspension element comprises a variable damping force damper, wherein the method further comprises:
  determining a target damping force of each damper according to the detected dynamic state variable associated with the corresponding damper;
  determining a damping force correction value for at least one of the dampers according to the detected dynamic variable associated with a different one of the dampers; and
  correcting the target damping force of the one damper with the damping force correction value.

\* \* \* \* \*